United States Patent
Ashihara et al.

(10) Patent No.: US 7,659,356 B2
(45) Date of Patent: Feb. 9, 2010

(54) POLYPROPYLENE TYPE AQUEOUS DISPERSION, POLYPROPYLENE TYPE COMPOSITE AQUEOUS EMULSION COMPOSITION AND ITS USE

(75) Inventors: Teruaki Ashihara, Mie (JP); Masato Onoe, Mie (JP); Kazuyuki Hata, Mie (JP); Fumihiko Shimizu, Kanagawa (JP); Naomasa Sato, Kanagawa (JP); Yukihito Zanka, Mie (JP); Kouichi Nakayama, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/185,225

(22) Filed: Aug. 4, 2008

(65) Prior Publication Data

US 2009/0018251 A1    Jan. 15, 2009

Related U.S. Application Data

(63) Continuation of application No. 10/972,914, filed on Oct. 26, 2004, now abandoned, which is a continuation of application No. PCT/JP03/05357, filed on Apr. 25, 2003.

(30) Foreign Application Priority Data

| Apr. 26, 2002 | (JP) | 2002-127539 |
| Sep. 19, 2002 | (JP) | 2002-273960 |
| Sep. 19, 2002 | (JP) | 2002-273972 |
| Sep. 27, 2002 | (JP) | 2002-283376 |

(51) Int. Cl.
*C08F 210/00* (2006.01)
*C08F 110/06* (2006.01)
*C08F 20/06* (2006.01)
*C08F 283/04* (2006.01)
*C08G 65/32* (2006.01)

(52) U.S. Cl. ............... 526/351; 526/347; 526/317.1; 525/403; 525/453

(58) Field of Classification Search ............ 526/348, 526/351, 317.1; 525/403, 453
See application file for complete search history.

(56) References Cited

U.S. PATENT DOCUMENTS

| 3,116,827 A | 1/1964  | Gilchrist |
| 3,853,969 A | 12/1974 | Kontos |
| 4,057,522 A | 11/1977 | Naruse et al. |
| 4,335,225 A | 6/1982  | Collete et al. |
| 4,522,982 A | 6/1985  | Ewen |
| 5,278,264 A | 1/1994  | Spaleck et al. |
| 5,362,788 A | 11/1994 | Kimura et al. |
| 5,416,228 A | 5/1995  | Ewen et al. |
| 5,665,820 A | 9/1997  | Leistner et al. |
| 5,695,838 A | 12/1997 | Tanaka et al. |
| 5,892,081 A | 4/1999  | Sueling et al. |
| 6,191,232 B1 | 2/2001 | Mitsutani et al. |
| 6,218,558 B1 | 4/2001 | Kato et al. |
| 6,380,349 B1 * | 4/2002 | Rajagopalan ............... 528/295 |
| 6,548,603 B1 | 4/2003 | Satou et al. |
| 6,635,733 B2 | 10/2003 | Yahata et al. |
| 6,906,155 B1 | 6/2005 | Minami et al. |
| 2003/0153686 A1 | 8/2003 | Onoe et al. |
| 2004/0162403 A1 | 8/2004 | Shimizu et al. |

FOREIGN PATENT DOCUMENTS

| EP | 0 537 130      | 4/1993 |
| EP | 0 767 186 A1 * | 4/1997 |
| EP | 0 963 996      | 12/1999 |
| JP | 62079270 A *   | 4/1987 |

(Continued)

OTHER PUBLICATIONS

U.S. Appl. No. 12/282,353, filed Sep. 10, 2008, Onoe, et al.

(Continued)

*Primary Examiner*—William K Cheung
(74) *Attorney, Agent, or Firm*—Oblon, Spivak, McClelland, Maier & Neustadt, L.L.P.

(57) ABSTRACT

A polypropylene type aqueous dispersion comprising the following components (a) to (c):

| (a) a polypropylene type polymer and/or a modified polypropylene type polymer | 100 parts by weight |
| (b) a surfactant | 1 to 100 parts by weight, and |
| (c) water | 100 to 1,000 parts by weight, | wherein the component (a) has a main chain having the following features (1) and (2) and dispersion particles in the dispersion have an average particle size of at most 0.5 μm, Feature (1) when observing a peak derived from a carbon atom of a methyl group in a propylene unit chain part comprising a head-to-tail bond by $^{13}$C-NMR and fixing a chemical shift of a peak top at a peak attributable to pentad expressed by mmmm to 21.8 ppm, a ratio ($S_1/S$) of an area $S_1$ of a peak of a peak top at 21.8 ppm to a total area S of peaks at from 19.8 ppm to 22.1 ppm is at least 10% and at most 60%, and when an area of a peak (mmmr) of a peak top at 21.5 to 21.6 ppm is expressed as $S_2$, $4+2S_1/S_2>5$, and Feature (2) a content ratio (mol ratio) of propylene unit (A): other olefin unit (B) is from 100:0 to 90:10.

20 Claims, No Drawings

FOREIGN PATENT DOCUMENTS

| | | |
|---|---|---|
| JP | 7-35479 B2 | 4/1995 |
| JP | 7-188318 | 7/1995 |
| JP | 8-176374 A | 7/1996 |
| JP | 08-217835 | 8/1996 |
| JP | 8-302092 A | 11/1996 |
| JP | 2610559 B2 | 2/1997 |
| JP | 2622804 B2 | 4/1997 |
| JP | 9-510745 | 10/1997 |
| JP | 2769958 B2 | 4/1998 |
| JP | 10-273507 | 10/1998 |
| JP | 10-273570 A | 10/1998 |
| JP | 2848584 B2 | 11/1998 |
| JP | 11-106392 | 4/1999 |
| JP | 11-269206 | 10/1999 |
| JP | 2002-47314 | 2/2002 |
| JP | 2003-2930 | 1/2003 |
| WO | 99/67303 | 12/1999 |
| WO | 00/69982 A1 | 11/2000 |
| WO | 02/24714 A1 | 3/2002 |

OTHER PUBLICATIONS

Uozumi et al, "Isospecific Propylene Polymerization Using the [ArN(Ch2)3NAr]TiCi2/Al(Bu)3/Ph3CH(CaF5)4 Catalyst System In the Presence of Cyclohexene", Macromol. Chem. Phys. 2001, 202, No. 17, pp. 3279-3283.

G. W. Coates, "Precise Control of Polyolefin Stereochemistry Using Single-Site Metal Catalysts" Chem. Rev., vol. 100, 2000. pp. 1223-1252.

J. A. Ewen, "Mechanisms of Stereochemical Control in Propylene Polymerizations with Soluble Group 4B Metallocene/Methylalumoxane Catalyst," J. Am. Chem. Soc., vol. 106, 1984, pp. 6355-6364.

J. W. Collette et al., "Elastomeric Polypropylenes from Alumina-Supported Tetraalkyl Group IVB Catalysts", Macromolecules, vol. 22, No. 10, 1989, pp. 3851-3858.

Burlant et al, Block and Graft Copolymers, Reinhold Publishing, N.Y., 1960, pp. 153-154.

Buscio et al, New Evidence on the Nature of the Active Sites in Heterogeneous Ziegler-Nata Catalysts for Propene Polymerization, Macromolecules 1997, 30, 4786-4790.

* cited by examiner

POLYPROPYLENE TYPE AQUEOUS DISPERSION, POLYPROPYLENE TYPE COMPOSITE AQUEOUS EMULSION COMPOSITION AND ITS USE

This is a continuation application of U.S. application Ser. No. 10/972,914, filed Oct. 26, 2004, which is a continuation of PCT/JP03/05357 filed on Apr. 25, 2003.

TECHNICAL FIELD

The present invention relates to a polypropylene type aqueous dispersion excellent in dispersion stability, which is capable of forming a coating film excellent in water resistance and adhesion to a polyolefin base material.

BACKGROUND ART

Heretofore, a molded product comprising polyolefin such as polypropylene was often coated on its surface or other resin layer was formed thereon to enhance its additional value. However, generally, since polyolefin does not have a polar group in a molecule, it is poor in adhesion to a paint or other resins. Therefore, heretofore, a polyolefin molded product was previously treated with a primer on its surface to improve adhesiveness and adhesion to a paint, and was coated with a paint. However, most of conventional primers or paints contain an organic solvent or dissolved in an organic solvent, and therefore there were problems that they degraded working environments during production and using.

Under these circumstances, various polyolefinic aqueous dispersions have been recently studied and proposed as a resin for a primer or a paint of a polyolefin molded product.

For example, there are disclosed an aqueous dispersion comprising water, a nonionic surfactant, a thermoplastic resin and a thermoplastic resin containing a carboxylic acid or its salt (JP-B-7-35479), an emulsified material having an adhesive film-formability after coating and drying, which contains an acid-modified amorphous polyolefin and a surfactant as essential components (JP-A-8-176374), an aqueous resin composition containing a modified polyolefin resin, a block isocyanate compound and a surfactant (U.S. Pat. No. 2,622,804), and an aqueous polyolefin resin composition comprising polyolefin and/or modified polyolefin, a surfactant having a polyalkylene oxide structure having a specific solubility parameter, a basic material and water (U.S. Pat. No. 2,769,958), and the like.

However, according to these conventional methods, there were problems that a satisfactory dispersion stability endurable for practical use could not be obtained since a particle size of dispersion particles in an aqueous dispersion was large, and smoothness of its coated film and adhesion to a polyolefin base material were lowered.

An object of the present invention is to provide a polypropylenic aqueous dispersion capable of forming a satisfactory water-resistant coating film having a satisfactory smoothness and a satisfactory adhesion to a polyolefin base material, the dispersion particles of which have a small particle size and a sufficient dispersion stability, and are prepared by using a polymer having appropriate crystallinity and solubility prepared from a starting propylenic polymer and/or a modified polyolefin (hereinafter generally referred to as "propylenic polymer").

DISCLOSURE OF THE INVENTION

The present inventors have variously studied the above-mentioned problems, and have discovered that the above problems can be solved by providing a polyolefinic aqueous dispersion obtainable by emulsifying a propylenic polymer, a surfactant, water, and if necessary, a polymer other than the propylenic polymer and modified propylenic polymer, and a basic material at a specific blending ratio, and the present invention has been accomplished on the basis of this discovery.

Thus, the present invention includes the following Embodiments 1 to 20.

Embodiment 1

A polypropylene type aqueous dispersion comprising the following components (a) to (c):

| | |
|---|---|
| (a) a polypropylene type polymer and/or a modified polypropylene type polymer | 100 parts by weight |
| (b) a surfactant | 1 to 100 parts by weight, and |
| (c) water | 100 to 1,000 parts by weight, | wherein the component (a) has a main chain having the following features (1) and (2) and dispersion particles in the dispersion have an average particle size of at most 0.5 μm, Feature (1) when observing a peak derived from a carbon atom of a methyl group in a propylene unit chain part comprising a head-to-tail bond by $^{13}$C-NMR and fixing a chemical shift of a peak top at a peak attributable to pentad expressed by mmmm to 21.8 ppm, a ratio ($S_1/S$) of an area $S_1$ of a peak of a peak top at 21.8 ppm to a total area S of peaks at from 19.8 ppm to 22.1 ppm is at least 10% and at most 60%, and when an area of a peak (mmmr) of a peak top at 21.5 to 21.6 ppm is expressed as $S_2$, $4+2S_1/S_2>5$, and Feature (2) a content ratio (mol ratio) of propylene unit (A): other olefin unit (B) is from 100:0 to 90:10.

Embodiment 2.

The polypropylene type aqueous dispersion according to Embodiment 1, wherein the surfactant of component (b) is at least one of anionic, cationic and amphoteric surfactants.

Embodiment 3

The polypropylene type aqueous dispersion according to Embodiment 1 or 2, wherein the surfactant of component (b) is a nonionic surfactant.

Embodiment 4

The polypropylene type aqueous dispersion according to any one of Embodiments 1 to 3, wherein the surfactant of component (b) comprises at least two kinds of surfactants.

Embodiment 5

The polypropylene type aqueous dispersion according to any one of Embodiments 1 to 4, which further contains a basic material as a component (d) in an amount of from 0.01 to 10 parts by weight to 100 parts by weight of the component (a).

Embodiment 6

The polypropylene type aqueous dispersion according to any one of Embodiments 1 to 5, wherein the other olefin unit (B) is an ethylene unit and/or a butene unit.

Embodiment 7

The polypropylene type aqueous dispersion according to any one of Embodiments 1 to 6, wherein the polypropylene type polymer and/or the modified polypropylene type polymer of component (a) are prepared by a single site catalyst.

Embodiment 8

The polypropylene type aqueous dispersion according to any one of Embodiments 1 to 7, wherein the polypropylene type polymer and/or the modified polypropylene type polymer of component (a) have a weight average molecular weight (Mw) of from 10,000 to 300,000 measured by GPC.

Embodiment 9

The polypropylene type aqueous dispersion according to any one of Embodiments 1 to 8, wherein the modified polypropylene type polymer of component (a) is a modified polypropylene type polymer modified by grafting with an unsaturated carboxylic acid and/or its derivative selected from the group consisting of a $C_3$-$C_{25}$ unsaturated carboxylic acid, its acid anhydride and its ester.

Embodiment 10

The polypropylene type aqueous dispersion according to any one of Embodiments 4 to 9, wherein the surfactant of component (b) comprises a nonionic surfactant (b1) having a hydrophile-lipophile balance (HLB) value in a range of from 13.5 to 14.5 and a nonionic surfactant (b2) having an HLB value in a range of from 16.0 to 17.0, and their blending ratio (b1/b2) is from 1/9 to 9/1.

Embodiment 11

The polypropylene type aqueous dispersion according to any one of Embodiments 1 to 10, which further contains a polymer as a component (e) other than a polypropylene type polymer and a modified polypropylene type polymer in addition to the above components (a), (b) and (c) in an amount of from 1 to 5,000 parts by weight to 100 parts by weight of the component (a).

Embodiment 12

The polypropylene type aqueous dispersion according to any one of Embodiments 2 to 11, wherein the polymer of component (e) other than a polypropylene type polymer and a modified polypropylene type polymer is at least one member selected from the group consisting of a (meth)acrylic polymer, a urethane type polymer and an epoxy type polymer.

Embodiment 13

A coating agent, a paint, an ink or an adhesive containing a polypropylene type aqueous dispersion as defined in any one of Embodiments 1 to 12.

Embodiment 14

A polypropylene type resin-coated product obtained by coating a substrate comprising a crystalline polypropylene molded product with a paint as defined in Embodiment 13.

Embodiment 15

The polypropylene type resin-coated molded product according to Embodiment 14, wherein the crystalline polypropylene constituting the substrate is a propylene homopolymer or a propylene.ethylene block copolymer comprising a propylene homopolymer part and a propylene.ethylene copolymer part.

Embodiment 16

The polypropylene type resin-coated molded product according to Embodiment 14 or 15, wherein the substrate is a molded product comprising a polypropylene type resin composition containing an elastomer component in an amount of from 1 to 90 parts by weight to 100 parts by weight of the crystalline polypropylene.

Embodiment 17

The polypropylene type resin-coated molded product according to any one of Embodiments 14 to 16, wherein the substrate is a molded product comprising a polypropylene type resin composition containing an inorganic filler in an amount of from 1 to 80 parts by weight to 100 parts by weight of the crystalline polypropylene.

Embodiment 18

The polypropylene type resin-coated molded product according to any one of Embodiments 14 to 17, wherein the substrate is a molded product having a surface glossiness (JIS-K7105, incident angle 60°) of at least 30%, which comprises an electroconductive polypropylene type resin composition containing an electroconductive carbon.

Embodiment 19

The polypropylene type resin-coated molded product according to Embodiment 18, wherein the electroconductive carbon has a particle size of from 10 to 100 nm, a DBP oil absorption number of from 50 to 900 ml/g and a specific surface area of from 100 to 1,500 $m^2$/100 g.

Embodiment 20

The polypropylene type resin-coated molded product according to Embodiment 18 or 19, wherein the electroconductive carbon is contained in an amount of from 0.1 to 25 parts by weight to 100 parts by weight of the crystalline polypropylene.

BEST MODE FOR CARRYING OUT THE INVENTION

A polypropylene type polymer as component (a) in the aqueous dispersion of the present invention is preferably a propylenic polymer comprising a propylene monomer as the main component. The propylenic polymer comprising the propylene monomer as the main component is a polymer having a propylene content of from 90 to 100 mol %. A polymer having a propylene content lower than 90 mol % is poor in adhesion to a polyolefin base material.

The propylenic polymer of the present invention may contain other copolymer component having an olefin unit, and examples of the olefin unit include a monomer unit having a suitable olefinic double bond selected from the group consisting of ethylene, butene, pentene, hexene, octene, decene, butadiene, hexadiene, octadiene, cyclobutene, cyclopentene, cyclohexene, norbornene, norbornadiene, styrene and their derivatives. Among them, a monoolefin unit such as ethylene, butene, pentene, hexene or octene is preferable, and ethylene or butene is particularly preferable.

Also, when the propylenic polymer is a copolymer of propylene and other olefin monomer, a content ratio (mol ratio) of propylene unit (A): other olefin unit (B) is selected from a range of from 100:0 to 90:10, preferably from 100:0 to 95:5.

The propylenic polymer suitably used in the present invention is produced preferably by a single site catalyst, and has a weight average molecular weight Mw measured by GPC (Gel Permeation chromatography) of preferably from 5,000 to 500,000, more preferably from 10,000 to 300,000. If Mw is less than 5,000, film-formability of a coated film becomes poor, and the film becomes sticky, and when Mw exceeds 500,000, it becomes difficult to prepare a satisfactory aqueous dispersion, and the aqueous dispersion thus obtained includes dispersion particles having a large particle size and its dispersion stability becomes poor.

The measurement of a molecular weight by GPC can be carried out by using o-dichlorobenzene or the like as a solvent and using polystyrene as a standard sample in accordance with a conventionally well known method using a commercially available apparatus.

A molecular weight distribution of the propylenic polymer is not specially limited, but an excessively wide molecular weight distribution is not preferable since a content of a low molecular weight component inevitably becomes large. Thus, when a ratio of weight average molecular weight Mw/number average molecular weight Mn (Mw/Mn) is employed as an index for the molecular weight distribution, this ratio is preferably Mw/Mn<20, more preferably Mw/Mn<10, most preferably Mw/Mn<5.

The above propylenic polymer is required to have such a feature as defined by $^{13}$C-NMR spectrum in the following manner. The feature of the propylenic polymer is to have a highly crystalline block and a highly amorphous block in the main chain in a good balance, and the highly crystalline block has a structure rich in an isotactic property. If the polymer contains a highly crystalline block in an excess amount, the polymer becomes poor in solubility to a solvent, and it is therefore important for the polymer to have a highly crystalline block and a highly amorphous block in a good balance, and such a requirement as defined by $^{13}$C-NMR spectrum is employed as a part of an index indicating this balance.

The measurement method by $^{13}$C-NMR spectrum in the present invention is illustrated below. From 350 to 500 mg of a sample is completely dissolved in about 2.2 ml of o-dichlorobenzene in an NMR sample tube having a diameter (ϕ) of 10 mm. Thereafter, about 0.2 ml of deuterated benzene as a lock solvent is added thereto and homogenized, and measurement is carried out by proton complete decoupling method at 130° C. The measurement conditions are a flip angle of 90° and a pulse distance of at least 5 $T_1$ ($T_1$ is a longest value of spin-lattice relaxation time of a methyl group). In a propylene polymer, restoring of magnetization of all of carbons is at least 99% under these measurement conditions since spin-lattice relaxation times of a methylene group and a methine group are shorter than that of a methyl group. Also, in order to raise a determination accuracy, an NMR apparatus having a resonance frequency of $^{13}$C nucleus of at least 125 MHz is used and accumulation of at least 20 hours is preferably carried out.

A chemical shift indicates that all of absolute configurations of methyl branches are the same among 10 kinds of pentads (mmmm, mmmr, rmmr, mmrr, mmrm, rmrr, rmrm, rrrr, rrrm, mrrm) in a propylene unit chain part comprising a head-to-tail bond, and a chemical shift of a peak based on the third unit methyl group in propylene unit 5 chains expressed by mmmm is set to be 21.8 ppm, and based on this, chemical shifts of other carbon peaks are determined. On this basis, in case of other propylene unit 5 chains, chemical shifts of peaks based on the third unit methyl group are illustrated to be mmmr: 21.5-21.7 ppm, rmmr: 21.3-21.5 ppm, mmrr: 21.0-21.1 ppm, mmrm and rmrr: 20.8-21.0 ppm, rmrm: 20.6-20.8 ppm, rrrr: 20.3-20.5 ppm, rrrm: 20.1-20.3 ppm, mrrm: 19.9-20.1 ppm. Chemical shifts of peaks derived from these pentads varies somewhat depending on the measurement conditions of NMR, and peaks are not always a single peak but often indicate complicated split patterns based on minute structures, and attribution is determined by taking this point into consideration.

In the propylenic polymer used in the present invention, when fixing a chemical shift of a peak top at a peak attributable to pentad expressed by the above mmmm as 21.8 ppm, a ratio ($S_1$/S) of an area $S_1$ of a peak of a peak top at 21.8 ppm to a total area S of peaks (attributable to the above pentad, i.e. all of pentads of mmmm, mmmr, rmmr, mmrr, mmrm+rmrr, rmrm, rrrr, rrrm, mrrm) at from 19.8 ppm to 22.2 ppm is at least 10% and at most 60%, and when an area of a peak (mmmr) of a peak top at 21.5 to 21.6 ppm is expressed as $S_2$, the propylenic polymer of the present invention is required to satisfy $4+2S_1/S_2>5$.

Further, the requirement of the above ratio ($S_1$/S) of $S_1$ to S is related to such a structure of the propylenic polymer of the present invention that a highly crystalline block and a highly amorphous block coexist in the main chain and that the highly crystalline block is rich in an isotactic property. Also, when the ratio of $S_1$ to S is less than 10%, crystallinity is too low and a satisfactory adhesiveness is not provided, and stickiness problem is easily caused, such being unpreferable. On the other hand, when the ratio of $S_1$ to S exceeds 60%, crystallinity becomes too high and solubility to a solvent is lowered, such being unpreferable. The ratio of $S_1$ to S as defined in the present invention is preferably in a range of at least 10% and at most 60%, more preferably from 20 to 50%, most preferably from 25 to 45%.

Further, the propylenic polymer used in the present invention preferably satisfies the relation of $4+2S_1/S_2>5$ as mentioned above. This relational formula is closely related to an index referred to as "isotactic block index (BI)" named by Waymouth (see JP-A-9-510745). BI is an index expressing a stereoblock property of a polymer, and is defined as BI=4+2 [mmmm]/[mmmr]. Concretely, BI indicates an average chain length of isotactic block having at least 4 propylene units (J. W. Collete et al., Macromol., 22, 3858 (1989); J. C. Randall, J. Polym. Sci. Polym. Phys. Ed., 14, 2083 (1976)). A statistically complete atactic polypropylene indicates BI=5. Accordingly, BI=4+2[mmmm]/[mmmr]>5 means that an average chain length of isotactic block contained in a polymer is longer than that of atactic polypropylene.

Since the requirement, $4+2S_1/S_2$, of the above propylenic polymer is not completely the same as the above-mentioned BI but almost corresponds to it, the requirement of $4+2S_1/S_2>5$ means that unlike atactic polypropylene, the propylenic polymer of the present invention contains an isotactic block having a crystallizable chain length. Also, the presence of isotactic block means that a block having a sequence of disordered stereospecificity is also present in the main chain. Thus, as mentioned above, the propylenic polymer of the present invention has both a crystalline block and an amorphous block in the main chain, and has a characteristic structure that the block having crystallinity is formed from an isotactic block having a relatively long average chain length and is rich in an isotactic property.

The present invention satisfies the requirement of $5<4+2S_1/S_2$, preferably $5<4+2S_1/S_2<25$, more preferably $7<4+2S_1/S_2<10$.

The above propylenic polymer is preferably obtained in accordance with the polymerization method by a single site catalyst. This is generally because the single site catalyst controls microtacticity by its design of ligand, can easily produce a relatively low molecular weight polymer, and provides a polymer having a narrow molecular weight distribution or a narrow stereoregularity distribution. If the molecular weight distribution or the stereoregularity distribution is heterogeneous, there is caused a difference in solubility, and there is a possibility of producing a partly insoluble material. Among the single site catalysts, a metallocene catalyst is preferable since microtacticity can be accurately controlled.

As the single site catalyst for producing the propylenic polymer, it is preferable to use a metallocene type catalyst comprising a metallocene compound ([α] component) and a cocatalyst ([β] component) as the essential components.

The metallocene compound ([α] component) is preferably a bridged $C_1$-symmetric ansa-metallocene containing a transition metal. Non-bridged metallocene is also usable for producing the propylenic polymer of the present invention, but ansa-metallocene having a bridging group is generally preferable from industrial viewpoints since it is excellent in thermostability.

The bridged ansa-metallocene containing a transition metal used in the present invention is a bridged $C_1$-symmetric metallocene of a Group IV transition metal compound having conjugated 5-membered ring ligands. Such a transition metal compound is well known, and it is known to use it as a catalyst component for α-olefin polymerization.

A metallocene of [α] component preferably used in the production of propylene polymer is expressed by the following formula (I), and has $C_1$-symmetry. Also, more than one metallocenes expressed by the following formula may be used in a mixture.

$$Q(C_5H_{4-a}R^2_a)(C_5H_{4-b}R^3_b)MXY \qquad (I)$$

Hereinafter, the metallocene having the formula (I) is fully described.

In the formula (I), Q is a bonding group bridging two conjugated 5-membered ring ligands; M is a transition metal of Group IV of the Periodic Table; and each of X and Y is independently hydrogen, a halogen, a hydrocarbon group having a carbon number of from 1 to 20, an oxygen-containing hydrocarbon group having a carbon number of from 1 to 20, a nitrogen-containing hydrocarbon group having a carbon number of from 1 to 20, a phosphorus-containing hydrocarbon group having a carbon number of from 1 to 20 or a silicon-containing hydrocarbon group having a carbon number of from 1 to 20. Each of $R^2$ and $R^3$ is independently a hydrocarbon group having a carbon number of from 1 to 20, a halogen, a halogen-containing hydrocarbon group having a carbon number of from 1 to 20, an alkoxy group, an aryloxy group, a silicon-containing hydrocarbon group, a phosphorus-containing hydrocarbon group, a nitrogen-containing hydrocarbon group or a boron-containing hydrocarbon group. Also, adjacent two $R^2$ and/or $R^3$ may be respectively bonded to form 4 to 10-membered rings. Each of a and b is independently an integer of $0 \leq a \leq 4$ and $0 \leq b \leq 4$.

Examples of a bonding group Q bridging two conjugated 5-membered ring ligands, include an alkylene group such as a methylene group or an ethylene group, an alkylidene group such as an ethylidene group, a propylidene group, an isopropylidene group, a phenylmethylidene group or a diphenylmethylidene group, a silicon-containing bridging group such as a dimethylsilylene group, a diethylsilylene group, a dipropylsilylene group, a diphenylsilylene group, a methylethylsilylene group, a methylphenylsilylene group, a methyl-t-butylsilylene group, a disilylene group or a tetramethyldisilylene group, a germanium-containing bridging group such as a dimethylgermylene group, a diethylgermylene group, a diphenylgermylene group or a methylphenylgermylene group, an alkylphosphine, an amine, and the like. Among them, an alkylene group, an alkylidene group, a silicon-containing bridging group and a germanium-containing bridging group are particularly preferable.

In the above formula, examples of $R^2$ and $R^3$ include a $C_1$-$C_{20}$ hydrocarbon group which may be substituted with a methyl group, an ethyl group, a n-propyl group, an isopropyl group, a n-butyl group, an isobutyl group, a t-butyl group, a n-pentyl group, an isopentyl group, a cyclopentyl group, a hexyl group, a cyclohexyl group, a heptyl group, an octyl group, a nonyl group, a decyl group, a phenyl group, a t-butylphenyl group or a naphthyl group, a $C_1$-$C_{20}$ hydrocarbon group which may contain a halogen, such as a fluoromethyl group, a fluoroethyl group, a fluorophenyl group, a fluoronaphthyl group, a fluorobiphenyl group, a chloromethyl group, a chloroethyl group, a chlorophenyl group, a chloronaphthyl group or a chlorobiphenyl group, a halogen such as fluorine, chlorine, bromine or iodine, an alkoxy group such as a methoxy group, an ethoxy group, a propoxy group or a butoxy group, an aryloxy group such as a phenoxy group, a methylphenoxy group or a pentamethylphenoxy group, a silicon-containing hydrocarbon group such as a trimethylsilyl group, a triethylsilyl group or a triphenylsilyl group, or a phosphorus-containing hydrocarbon group, a nitrogen-containing hydrocarbon group, a boron-containing hydrocarbon group, and the like. When a plurality of $R^2$ are present, they may be the same or different.

Also, when two $R^2$'s are present on adjacent carbon atoms of a cyclopentadienyl ring, they may be bonded to form 4 to 10-membered rings, such as an indenyl group, a tetrahydroindenyl group, a fluorenyl group, an octahydrofluorenyl group, an azulenyl group, a hexahydroazulenyl group and the like. In the same manner, when a plurality of $R^3$ are present, they may be the same or different. Also, when two $R^3$'s are present on adjacent carbon atoms of a cyclopentadienyl ring, they may be bonded to form 4 to 10-membered rings, such as an indenyl group, a tetrahydroindenyl group, a fluorenyl group, an octahydrofluorenyl group, an azulenyl group, a hexahydroazulenyl group, and the like.

In the present invention, the metallocene expressed by the above formula (I) has $C_1$-symmetry, and $R^2$ and $R^3$ may be the same or different so long as $C_1$-symmetry is maintained.

M is a transition metal of Group IV of the Periodic Table, examples of which include titanium, zirconium or hafnium, preferably zirconium or hafnium.

Each of X and Y is hydrogen, a halogen, a hydrocarbon group having a carbon number of from 1 to 20, preferably from 1 to 10, an alkoxy group having a carbon number of from 1 to 20, preferably from 1 to 10, an alkylamide group, a phosphorus-containing hydrocarbon group having a carbon number of from 1 to 20, preferably from 1 to 12, a silicon-containing hydrocarbon group having a carbon number of from 1 to 20, preferably from 1 to 12, and the like. X and Y may be the same or different. Among them, a halogen, a hydrocarbon group and an alkylamide group are preferable.

In the production of the propylenic polymer having the features (1) and (2) of the present invention, among metallocenes expressed by the above formula (I), dichloro[dimethylsilylene(cyclopentadienyl)(2,4-dimethyl-4H-1-azulenyl)] hafnium is most preferable, and dichloro[dimethylgermylene (cyclopentadienyl)(2,4-dimethyl-4H-1-azulenyl)]hafnium or dichloro[dimethylsilylene(2-methyl-1-indenyl)(2,4-dimethyl-4H-1-azulenyl)]hafnium is also a preferable catalyst.

Further, an [α] component metallocene compound may be a mixture of compounds having a plurality of different structures, and two kinds or more may be combined. Further, a well known solid catalyst comprising titanium trichloride as the main component, or a carrier-having type catalyst containing magnesium, titanium or halogen as an essential component, may be supplementary used. Further, new [α] component may be additionally used after finishing the first stage polymerization or before starting the second stage polymerization.

In the present invention, as a cocatalyst ([β] component) for an [α] component metallocene compound, at least one kind of material selected from the group consisting of (1) an organic aluminumoxy compound, (2) an ionic compound capable of exchanging an [α] component to a cation by reacting with a transition metal of [α] component, (3) Louis acid and (4) an inorganic silicate or an ion exchangeable layered compound excluding a silicate.

(1) Organic Aluminumoxy Compound:

Examples of this compound include compounds expressed by the following formula (II), (III) or (IV).

In each formula, $R^4$ is a hydrogen atom or a hydrocarbon residue, preferably a hydrocarbon residue having a carbon number of from 1 to 10, more preferably from 1 to 6. Also, a plurality of $R^4$ may be respectively the same or different. Further, p is an integer of from 0 to 40, preferably 2 to 30.

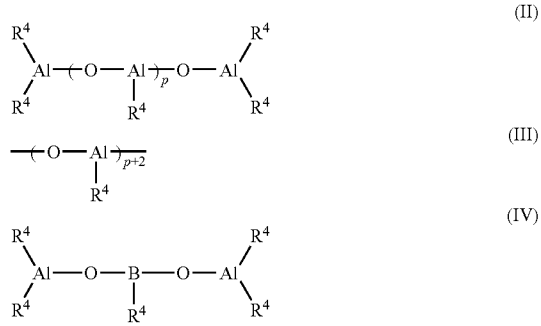

The compound of the formula (II) or (III) is a compound referred to as an aluminoxane, and is obtainable by reaction of water with one kind of trialkylaluminum or at least two kinds of trialkylaluminum. Examples include (a) methylaluminoxane, ethylaluminoxane, propylaluminoxane, butylaluminoxane or isobutylaluminoxane, which is obtainable from one kind of trialkylaluminum and water, and (b) methylethylaluminoxane, methylbutylaluminoxane or methylisobutylaluminoxane, which is obtainable from two kinds of trialkylaluminum and water. Among them, methylaluminoxane and methylisobutylaluminoxane are preferable. The above aluminoxanes may be used in combination of a plurality of kinds. Further, the above aluminoxanes may be prepared under well known various conditions.

The compound expressed by the formula (IV) is obtainable by reaction of one kind of trialkylaluminum or two or more kinds of trialkylaluminum with an alkyl boronic acid expressed by the following formula (V) in a mol ratio of from 10:1 to 1:1. $R^5$ in the formula (V) is a hydrocarbon residue having a carbon number of from 1 to 10, preferably from 1 to 6, or a halogenated hydrocarbon group.

$$R^5\text{—B(OH)}_2 \quad (V)$$

Examples include the following reaction products, such as (a) 2:1 reaction product of trimethylaluminum and methylboronic acid, (b) 2:1 reaction product of triisobutylaluminum and methylboronic acid, (c) 1:1:1 reaction product of trimethylaluminum, triisobutylaluminum and methylboronic acid, (d) 2:1 reaction product of trimethylaluminum and ethylboronic acid, (e) 2:1 reaction product of triethylaluminum and butylboronic acid, and the like.

(2) Ionic Compound Capable of Exchanging [α]Component into a Cation by Reacting with a Transition Metal of [α] Component:

This compound includes a compound expressed by the following formula (VI).

$$[K]^{n+}[Z]^{n-} \quad (VI)$$

In the above formula (VI), K is a cation component, such as carbonium cation, tropylium cation, ammonium cation, oxonium cation, sulfonium cation, phosphonium cation or the like, and further includes a metal cation or an organic metal cation, which is easily reducible by itself.

Examples of the above cations include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tris(dimethylphenyl)phosphonium, tris(methylphenyl)phosphonium, triphenylsulfonium, triphenylsulfonium, triphenyloxonium, triethyloxonium, pyrrilium, silver ion, gold ion, platinum ion, copper ion, palladium ion, mercury ion, ferrocenium ion, and the like.

In the above formula (VI), Z is an anion component, and is a component (generally a non-coordinated component) which becomes a pair anion to a cation exchanged from a transition metal of [α] component. Z includes an organic boron compound anion, an organic aluminum compound anion, an organic gallium compound anion, an organic arsenic compound anion, an organic antimony compound anion, or the like. Examples include (a) tetraphenylboron, tetrakis(3,4,5-trifluorophenyl)boron, tetrakis{3,5-bis(trifluoromethyl)phenyl}boron, tetrakis{3,5-di(t-butyl)phenyl}boron, tetrakis(pentafluorophenyl)boron or the like, (b) tetraphenylaluminum, tetrakis(3,4,5-trifluorophenyl)aluminum, tetrakis{3,5-bis(trifluoromethyl)phenyl}aluminum, tetrakis{3,5-di(t-butyl)phenyl}aluminum, tetrakis(pentafluorophenyl)aluminum, and the like.

Other examples include (c) tetraphenylgallium, tetrakis(3,4,5-trifluorophenyl)gallium, tetrakis{3,5-bis(trifluoromethyl)phenyl}gallium, tetrakis{3,5-di(t-butyl)phenyl}gallium, tetrakis(pentafluorophenyl)gallium, or the like, (d) tetraphenylphosphorus, tetrakis(pentafluorophenyl)phosphorus, or the like, (e) tetraphenylarsenic, tetrakis(pentafluorophenyl)arsenic, or the like, (f) tetraphenylantimony, tetrakis(pentafluorophenyl)antimony, or the like, (g) decaborate, undecaborate, carbadodecaborate, decachlorodecaborate, and the like.

(3) Louis Acid:

Particularly, Louis acid capable of exchanging a transition metal of [α] component into a cation, includes various organic boron compounds, metal halogenated compounds, solid acids, and the like. Examples include (a) organic boron compounds such as triphenylboron, tris(3,5-difluorophenyl)boron, tris(pentafluorophenyl)boron or the like, (b) metal halogenated compounds such as aluminum chloride, aluminum bromide, aluminum iodide, magnesium chloride, magnesium bromide, magnesium iodide, magnesium chloride bromide, magnesium chloride iodide, magnesium bromide iodide, magnesium chloride hydride, magnesium chloride hydroxide, magnesium bromide hydroxide, magnesium chloride alkoxide, magnesium bromide alkoxide, or the like, and (c) solid acids such as alumina, silica-alumina or the like.

(4) Inorganic Silicate or Ion-exchangeable Layered Compound Excluding Silicate:

The ion-exchangeable layered compound excluding a silicate is a compound having a crystal structure having layers laminated in parallel by a weak bonding force of each of planes constituted by an ionic bond, and an ion contained therein is exchangeable.

The ion-exchangeable layered compound excluding a silicate includes an ion crystalline compound having a layered crystal structure of hexagonal closest packing type, antimony type, $CdCl_2$ type, $CdI_2$ type or the like. Examples include a crystalline acidic salt of polyvalent metal such as α-Zr $(HAsO_4)_2 \cdot H_2O$, α-$Zr(HPO_4)_2$, α-$Zr(KPO_4)_2 \cdot 3H_2O$, α-Ti $(HPO_4)_2$, α-$Ti(HAsO_4)_2 \cdot H_2O$, α-$Sn(HPO_4)_2 \cdot H_2O$, γ-Zr $(HPO_4)_2$, γ-$Ti(HPO_4)_2$, γ-$Ti(NH_4PO_4)_2 \cdot H_2O$, and the like.

Also, the inorganic silicate includes clay, clay mineral, zeolite, diatomaceous earth and the like. They may be synthetic products or naturally occurring minerals.

Examples of clay and clay minerals include allophane group such as allophane or the like, kaolin group such as dickite, nacrite, kaolinite, anauxite or the like, halloysite group such as metahalloysite, halloysite or the like, serpentine group such as chrysotile, lizardite, antigorite or the like, smectite group such as montmorillonite, zaukonite, viderite, nontronite, sapponite, hectorite or the like, vermiculite minerals such as vermiculite or the like, mica minerals such as illite, sericite, glauconite or the like, attapulgite, sepiolite, pigolskite, bentonite, kibushi clay, gairome clay, hisingerite, pyrophyllite, chlorite, and the like. They may form a mixed layer.

Examples of synthetic materials include synthetic mica, synthetic hectolite, synthetic sapponite, synthetic taeniolite, and the like.

Among these examples, preferable examples include kaolin group such as dickite, nacrite, kaolinite, anauxite or the like, halloysite group such as metahalloysite, halloysite or the like, serpentine group such as chrysotile, lizardite, antigorite or the like, smectite group such as montmorillonitem, zaukonite, viderite, nontronite, sapponite, hectorite or the like, vermiculite minerals such as vermiculite or the like, mica minerals such as illite, sericite, glauconite or the like, synthetic mica, synthetic hectorite, synthetic sapponite, synthetic taeniolite, and the like, and particularly preferable examples include smectite group such as montmorillonitem, zaukonite, viderite, nontronite, sapponite, hectorite or the like, vermiculite minerals such as vermiculite, synthetic mica, synthetic hectorite, synthetic sapponite, synthetic taeniolite and the like.

These inorganic silicates or ion-exchangeable layered compounds excluding silicates may be used as they are, but they are preferably subjected to acid treatment with hydrochloric acid, nitric acid or sulfuric acid and/or salt treatment with Li, NaCl, KCl, $CaCl_2$, $MgCl_2$, $Li_2SO_4$, $MgSO_4$, $ZnSO_4$, $Ti(SO_4)_2$, $Zr(SO_4)_2$ or $Al_2(SO_4)_3$. In the treatment, corresponding acid and base may be mixed in the reaction system to form a salt for the treatment. Also, they may be pulverized or granulated for controlling the shapes, and it is preferable to granulate for obtaining a solid catalyst component excellent in particle fluidity. Further, the above component is used generally after dehydrating and drying. As the essential component for [β] component, it is preferable to use (4) an inorganic silicate or an ion-exchangeable layered compound excluding a silicate in respect of catalyst performance such as polymerization activity.

In the production of the propylenic polymer used in the present invention, in addition to the cocatalyst [β] component, an organic aluminum compound may be used as an optional component [γ]. Such an organic aluminum compound is a compound expressed by the formula, $AlR^1{}_mZ_{3-m}$ (wherein $R^1$ is a hydrocarbon group having a carbon number of from 1 to 20, Z is hydrogen, a halogen, an alkoxy group or an aryloxy group, and m is a number of $0<m\leq3$). Examples of the organic aluminum compound include a trialkylaluminum such as trimethylaluminum, triethylaluminum, tripropylaluminum or triisobutylaluminum, a halogen or alkoxy-containing alkylaluminum such as diethylaluminum monochloride or diethylaluminum ethoxide, or a hydrogen-containing organic aluminum compound such as diethylaluminum hydride or diisobutylaluminum hydride. Also, in addition to these materials, an aluminoxane such as methylaluminoxane may be used. Among them, a trialkylaluminum is particularly preferable. These optional components may be used in a mixture of two or more. Also, after initiating polymerization, a new optional component [γ] may be added.

The catalyst for propylene polymerization is obtainable by contacting [α] component, [β] component and optional [γ] component, but their contacting method is not specially limited. They may be contacted at the time of preparing a catalyst, or may be contacted at the time of prepolymerization or polymerization of propylene. At the time of contacting or after contacting each catalyst component, a propylene polymer, or an inorganic oxide solid such as silica or alumina may coexist or may be contacted therewith.

The contacting may be carried out in an inert gas such as nitrogen, or may be carried out in an inert hydrocarbon solvent such as n-pentane, n-hexane, n-heptane, toluene, xylene or the like. It is preferable to use these solvents after treated for removing a poisoning material such as water or a sulfur compound. A contacting temperature is from −20° C. to a boiling point of a solvent used, preferably from room temperature to a boiling point of a solvent used.

An amount of each catalyst component used is not specially limited, but when using an inorganic silicate or an ion-exchangeable layered compound excluding a silicate as [β] component, [α] component is from 0.0001 to 10 mmol, preferably from 0.001 to 5 mmol, per 1 g of [β] component, and [γ] component is from 0 to 10.000 mmol, preferably from 0.01 to 100 mmol, per 1 g of [β] component. Also, an atomic ratio of a transition metal of [α] component and aluminum of [γ] component is preferably controlled to be 1:0-1,000,000, preferably 1:0.1-100,000, in respect of polymerization activity.

The catalyst thus obtained may be used by washing with an inert hydrocarbon solvent such as n-pentane, n-hexane, n-heptane, toluene, xylene or the like, or may be used without washing.

At the time of washing, [γ] component may be newly used in combination therewith, if necessary. As an amount of [γ] component used at this time, an atomic ratio of aluminum of [γ] component to a transition metal of [α] component is preferably controlled to be 1:0-10,000.

A catalyst may be used after preliminarily polymerizing propylene, and washing the catalyst, if necessary. This prepolymerization may be carried out in an inert gas such as nitrogen or in an inert hydrocarbon solvent such as pentane, hexane, heptane, toluene or xylene. The polymerization reaction of propylene is carried out in the presence or absence of an inert hydrocarbon such as propane, n-butane, n-hexane, n-heptane, toluene, xylene, cyclohexane or methylcyclohexane, or liquefied propylene. Among them, it is preferable to carry out the polymerization in the presence of the above-mentioned inert hydrocarbon.

For example, the propylene polymer is prepared in the presence of (α) component and (β) component, or (α) component, (β) component and (γ) component. A polymerization temperature, a polymerization pressure and a polymerization time are not specially limited, but they are optimumly selected within the following ranges by considering productivity and process performance into consideration. Thus, the polymerization temperature is usually from −20 to 150° C., preferably from 0 to 100° C., the polymerization pressure is from 0.1 MPa to 100 MPa, preferably from 0.3 MPa to 10 MPa, more preferably from 0.5 MPa to 4 MPa, and the polymerization time is from 0.1 hour to 10 hours, preferably from 0.3 hour to 7 hours, more preferably from 0.5 hour to 6 hours.

As mentioned above, the propylenic polymer used in the present invention is preferably controlled to have a weight average molecular weight Mw of from 5,000 to 500,000. The molecular weight of the polymer can be controlled in accordance with a conventional known method. That is, examples of the method include a method for controlling a molecular weight by adjusting a polymerization temperature, a method for controlling a molecular weight by adjusting a monomer concentration, and a method for controlling a molecular weight by using a chain transfer agent. When using the chain transfer agent, it is preferable to use hydrogen.

Also, a method for controlling stereoselectivity of a propylenic polymer for imparting the feature (1) concerning $^{13}C$-NMR required for the propylenic polymer used in the present invention, is not specially limited. Generally, examples of the method include a controlling method by structure of a catalyst and a controlling method by controlling polymerization conditions. When controlling stereoselectivity by controlling polymerization conditions, it is possible to obtain a propylene polymer having a desired stereoregularity by controlling a polymerization temperature or a monomer concentration or also by controlling the structure of the above-mentioned catalyst, if necessary.

The propylenic polymer of the present invention can be solved in a solvent. Examples of the solvent include an aromatic hydrocarbon such as benzene, toluene or xylene; an aliphatic hydrocarbon such as n-pentane, n-hexane, n-heptane, n-octane or n-decane; a cycloaliphatic hydrocarbon such as cyclohexane, methylcyclohexane or dimethylcyclohexane, a halogenated hydrocarbon such as methylene chloride, carbon tetrachloride, trichloroethylene, perchloroethylene, chlorobenzene or o-dichlorobenzene; esters such as n-ethyl acetate or n-butyl acetate; ketones such as methyl isobutyl ketone or cyclohexanone; polar solvents such as tetrahydrofuran or dimethylsulfoxide; and the like. Among them, an aromatic hydrocarbon or a halogenated hydrocarbon is preferable, and toluene, xylene or chlorobenzene is particularly preferable.

A modified propylene type polymer of component (a) in the aqueous dispersion of the present invention is a propylenic polymer modified by grafting with an unsaturated carboxylic acid and/or its derivative selected from an unsaturated carboxylic acid having a carbon number of preferably from 3 to 25, its acid anhydride and its ester. The modified propylenic polymer is obtained by radical-adding the above propylenic polymer with the unsaturated carboxylic acid and/or its derivative by usual method.

Examples of the unsaturated carboxylic acid and its acid anhydride to be grafted include (meth)acrylic acid, maleic acid, fumaric acid, itaconic acid, tetrahydrophtharic acid, citraconic acid, crotonic acid, allyl succinic acid, mesaconic acid, aconitic acid or their anhydrides, preferably (meth) acrylic acid, maleic acid and their anhydrides. In the present description, the term "(meth)acrylic" means "acrylic or methacrylic".

Examples of the unsaturated carboxylic acid derivatives include an esterified material having one of a carboxyl group or an acid anhydride group of the above unsaturated carboxylic acid esterified, such as an unsaturated monocarboxylic acid monoester or an unsaturated dicarboxylic acid monoester. Examples of the unsaturated monocarboxylic acid monoester include (meth)acrylic acid esters, such as a (meth)acrylic acid ester type monomer having an alkyl group having a carbon number of from 1 to 12, for example, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl hexyl(meth)acrylate, nonyl (meth)acrylate, decyl (meth)acrylate, dodecyl (meth)acrylate, and the like; and a (meth)acrylic acid ester monomer having a $C_6$-$C_{12}$ aryl or arylalkyl group, for example, phenyl (meth)acrylate, toluoyl (meth)acrylate, benzyl (meth)acrylate, and the like.

Further, examples of other (meth)acrylic acid derivatives include a (meth)acrylic acid ester monomer having a hetero atom-containing $C_1$-$C_{20}$ alkyl group, for example, dimethylaminoethyl (meth)acrylate, diethylaminoethyl (meth)acrylate, 2-aminoethyl (meth)acrylate, 2-hydroxyethyl (meth)acrylate, hydroxypropyl (meth)acrylate, 2-methoxyethyl (meth)acrylate, 3-methoxypropyl (meth)acrylate, glycidyl (meth)acrylate, an adduct of ethylene oxide (meth)acrylate, and the like; and a (meth)acrylic acid ester monomer having a fluorine-containing $C_1$-$C_{20}$ alkyl group, for example, trifluoromethylmethyl (meth)acrylate, 2-trifluoromethylethyl (meth)acrylate, 2-perfluoroethylethyl (meth)acrylate, and the like; and a (meth)acrylamide type monomer, for example, (meth)acrylamide, (meth)acryldimethylamide, and the like.

Examples of the unsaturated dicarboxylic acid monoester include an esterified material having the above acid anhydride esterified with an alkyl alcohol, and examples of the alkyl group include a $C_1$-$C_8$ alkyl group such as a methyl group, an ethyl group, a n-propyl group, a n-butyl group or an isopropyl group.

An esterification rate (complete esterification rate=200%) of the unsaturated dicarboxylic acid monoester is preferably from 45 to 100%, more preferably from 80 to 100%. If the esterification rate is within the above range, the aqueous dispersion thus obtained has a satisfactory dispersion stability and its coated film has a satisfactory water resistance.

An addition rate of an unsaturated carboxylic acid or an unsaturated carboxylic acid derivative of the modified propylenic polymer of the present invention is from 0.01 to 20 wt %, preferably from 0.1 to 5 wt %. If the addition rate is less than 0.01 wt %, the aqueous dispersion thus obtained has dispersion particles having a large particle size, and its dispersion stability becomes poor, and if the addition rate exceeds 20 wt %, its coated film has a poor water resistance. This addition rate can be measured by comparing an absorption intensity of a carbonyl group by infrared spectrum analysis with a calibration curve based on a sample having a known content.

Examples of a method for radical-adding an unsaturated carboxylic acid or an unsaturated carboxylic acid derivative include a method for carrying out radical-addition by dissolving polypropylene in an organic solvent, adding an unsaturated carboxylic acid or an unsaturated carboxylic acid derivative and a radical polymerization initiator thereto, and heat-stirring; a method for carrying out radical-polymerization by charging each component into an extruder and heat-kneading; and a method for carrying out radical-polymerization by impregnating polypropylene powder with a solution having an unsaturated carboxylic acid or an unsaturated carboxylic acid derivative and a radical polymerization initiator dissolved in an organic solvent, and then heating to such a temperature as not to melt the powder.

A mol ratio of a radical polymerization initiator and an unsaturated carboxylic acid or an unsaturated carboxylic acid derivative (radical polymerization initiator/unsaturated carboxylic acid or unsaturated carboxylic acid derivative) is generally from 1/100 to 3/5, preferably from 1/20 to 1/2. A reaction temperature is not specially limited, but is usually at least 50° C., preferably from 80 to 200° C. A reaction time is usually from 2 to 10 hours.

Also, in the present invention, a modified propylenic polymer of component (a) may be a chlorinated material of the above propylenic polymer or modified propylenic polymer obtained by grafting an unsaturated carboxylic acid and/or its derivative thereto. In this case, a preferable chlorine content is from 5 to 40 wt %, and it is possible to improve a solution fluidity at a low temperature in this manner. A method for chlorination may be a well known method, such as a method for chlorination which comprises dissolving the above propylenic polymer or modified propylenic polymer obtained by grafting an unsaturated carboxylic acid and/or its derivative thereto in a chlorine-containing solvent such as chloroform, tetrachloroethylene, chlorobenzene or the like, and heating in the absence of a catalyst or in the presence of a radical-generating agent (which may be the same radical polymerization initiator as described below) at a temperature of from 50 to 130° C. to contact with chlorine.

Among these chlorinated propylenic polymers, a chlorinated propylenic polymer obtained by chlorinating a modified propylenic polymer obtained by grafting an unsaturated carboxylic acid and/or its derivative to the propylenic polymer is preferable since it provides a satisfactory adhesion to a coated film.

The radical polymerization initiator used in the above radical-addition reaction may be optionally selected from ordinary radical initiators, examples of which include an organic peroxide, azonitrile and the like. Examples of the organic peroxide include diisopropyl peroxide, di(t-butyl)peroxide, t-butyl hydroperoxide, benzoyl peroxide, dicumyl peroxide, cumyl hydroperoxide, dilauroyl peroxide, dibenzoyl peroxide, methyl ethyl ketone peroxide, cyclohexanone peroxide, cumene hydroperoxide, diisopropyl peroxycarbonate, dicyclohexyl peroxycarbonate, and the like. Examples of the azonitrile include azobisisobutyronitrile, azobisisopropylnitrile, and the like. Among them, benzoyl peroxide and dicumyl peroxide are preferable.

Examples of the organic solvent used in the radical-addition reaction include an aromatic hydrocarbon such as benzene, toluene or xylene; an aliphatic hydrocarbon such as hexane, heptane, octane or decane; and a halogenated hydrocarbon such as trichloroethylene, perchloroethylene, chlorobenzene or o-dichlorobenzene. Among them, an aromatic hydrocarbon and a halogenated hydrocarbon are preferable, and particularly, toluene, xylene or chlorobenzene is preferable.

Examples of a method for preparing a modified polyolefin having an unsaturated dicarboxylic acid monoester as a modifier include a method for radical-adding an unsaturated dicarboxylic acid monoalkyl ester to a polyolefin as described above, or a method which comprises radical-adding an unsaturated dicarboxylic acid or its anhydride to a polyolefin and then esterifying one carboxyl group with an alkyl alcohol.

A surfactant usable as component (b) in the polypropylenic aqueous dispersion of the present invention is at least one kind selected from the group consisting of an anionic surfactant, a cationic surfactant, a nonionic surfactant and an amphoteric surfactant. Examples of the anionic surfactant include an aliphatic acid salt, an alkyl sulfuric acid ester salt, a polyoxyethylene alkyl ether sulfuric acid ester salt, a sodium alkylbenzene sulfonate, a sodium alkylnaphthalene sulfonate, an alkylsulfosuccinic acid salt, an alkyldiphenyl ether disulfonic acid salt, an alkylphosphoric acid salt, a naphthalene sulfonic acid formalin condensate, and the like. Examples of the cationic surfactant include an alkylamine salt such as coconut amine acetate, stearylamine acetate or the like, and a quaternary ammonium salt such as lauryltrimethylammonium chloride, stearyltrimethylammonium chloride, cetyltrimethylammonium chloride, distearyldimethylammonium chloride, alkylbenzyldimethylammonium chloride or the like. Examples of the nonionic surfactant include polyoxyethylene alkyl ether, polyoxyethylene alkyl phenyl ether, polyoxyethylene aliphatic acid ester, polyoxyethylene sorbitan aliphatic acid ester, polyoxyethylene sorbitol aliphatic acid ester, polyoxyethylene polyoxypropylene block polymer, sorbitan aliphatic acid ester, polyoxyalkylene alkyl ether, glycerin aliphatic acid ester, polyoxyethylene alkylamine, alkylalkanolamide, and the like. Examples of the amphoteric surfactant include laurylbetaine, stearyl betaine, and the like.

Among them, the nonionic surfactant is preferably used in the present invention. When the nonionic surfactant is used, water resistance of a material having a low HLB value and a low water solubility is improved. Also, the surfactant of component (b) preferably comprises at least two kinds of surfactants in order not only to reduce a particle size of emulsion particles but also to improve coated film performances such as water resistance or solvent resistance. At least two kinds of surfactants may be optionally selected from an anionic surfactant, a cationic surfactant, a nonionic surfactant and an amphoteric surfactant. Among them, at least two surfactants containing a nonionic surfactant are preferably used in the present invention. A surfactant usable together with a nonionic surfactant may be any of an anionic surfactant, a cationic surfactant or an amphoteric surfactant, but it is preferable to use an anionic surfactant in view of a particle size of dispersion particles in the aqueous dispersion thus obtained and water resistance of its coated film. Further, in the present invention, it is preferable to use at least two kinds of nonionic surfactants, particularly at least two kinds of nonionic surfactants having respectively different HLB values in view of a particle size of dispersion particles in the aqueous dispersion thus obtained and water resistance of its coated film.

When using at least two kinds of nonionic surfactants, it is preferable to use a combination of at least one kind of nonionic surfactant (b1) having an HLB value in a range of from 13.5 to 14.5 and at least one kind of nonionic surfactant (b2) having an HLB value in a range of from 16.0 to 17.0. It is particularly preferable to use at least two kinds of nonionic surfactants at a blending ratio in a range of (b1)/(b2)=from 1/9 to 9/1 in respect of a particle size of dispersion particles in the aqueous dispersion obtained and water resistance of its coated film.

Examples of the nonionic surfactant (b1) having an HLB value in a range of from 13.5 to 14.5 include one kind or a mixture of at least two kinds selected from polyoxyethylene cetyl ether, polyoxyethylene stearyl ether and polyoxyethylene nonyl phenyl ether, which have an HLB value in a range of from 13.5 to 14.5. Particularly, it is preferable to employ one kind or a mixture of at least two kinds selected from polyoxyethylene cetyl ether (ethylene oxide addition mol number in a range of from 10 to 14 mols), polyoxyethylene stearyl ether (ethylene oxide addition mol number in a range of from 11 to 14 mols) and polyoxyethylene nonyl phenyl ether (ethylene oxide addition mol number in a range of from 10 to 14 mols), and it is more preferable to employ polyoxyethylene cetyl ether (ethylene oxide addition mol number in a range of from 10 to 14 mols).

Examples of the nonionic surfactant (b2) having an HLB value in a range of from 16.0 to 17.0 include one kind or a mixture of at least two kinds selected from polyoxyethylene lauryl ether, polyoxyethylene oleyl ether and polyoxyethylene propylene alkyl ether, which have an HLB value in a range of from 16.0 to 17.0. Particularly, it is preferable to employ one kind or a mixture of at least two kinds selected from polyoxyethylene lauryl ether (ethylene oxide addition mol number in a range of from 18 to 22 mols), polyoxyethylene oleyl ether (ethylene oxide addition mol number in a range of from 33 to 39 mols), and polyoxyethylene propylene alkyl ether (ethylene oxide addition mol number in a range of from 12 to 19 mols and propylene oxide addition mol number in a range of from 1 to 5 mols), and it is more preferable to employ polyoxyethylene lauryl ether (ethylene oxide addition mol number in a range of from 18 to 22 mols).

In the present invention, HLB value-number system by Griffin is employed as a calculation formula for calculating an HLB value of a surfactant component.

(1) In Case of Polyhydric Alcohol Aliphatic Acid Ester $HLB\ value = 20(1-S/A)$

S: Ester saponification value, A: neutralization value of aliphatic acid (2) In Case of Tall Oil, Rosin, Bee Wax and Laurine Polyhydric Alcohol Derivative $HLB\ value = (E+P)/5$ E: Oxyethylene content (%)
P: Polyhydric alcohol content (%)

(3) In Case of having a Hydrophilic Group of Oxyethylene Group Only $HLB\ value = E/5$ When using at least two kinds of surfactants b1 and b2 in the present invention, their blending ratio (b1)/(b2) is preferably from 1/9 to 9/1, more preferably from 3/7 to 7/3. When the blending ratio is less than 1/9, water resistance of its coated film becomes somewhat poor, and if the blending ratio exceeds 9/1, a particle size of dispersion particles in the aqueous dispersion obtained becomes large and its dispersion stability becomes somewhat poor.

A basic material as component (d) in the propylenic aqueous dispersion of the present invention is to improve dispersion stability of the above component (a) when it is contained in an aqueous solvent. Examples of the basic material include inorganic basic materials, ammonia or amines, and among them, amines are preferable. Examples of the inorganic basic materials include sodium hydroxide, potassium hydroxide, sodium carbonate, potassium carbonate, ammonium carbonate and the like, examples of the ammonia and amines include ammonia, alkylamines such as methylamine, dimethylamine, trimethylamine, ethylamine, diethylamine, triethylamine, propylamine, butylamine, hexylamine or octylamine; alkanolamines such as ethanolamine, diethanolamine, triethanolamine, propanolamine, N-methyldiethanolamine, N,N-dimethylethanolamine, 2-amino-2-methyl-1-propanol or 2-dimethylamino-2-methyl-1-propanol; morpholine, and the like, and 2-amino-2-methyl-1-propanol is preferable.

In the polypropylenic aqueous dispersion of the present invention, a polymer other than a propylenic polymer and a modified propylenic polymer may be included as an additional component, and examples of the additional component include a (meth)acrylic polymer, a urethane type polymer, or an epoxy type polymer. Among them, a (meth)acrylic polymer or a urethane type polymer is preferably used to improve weather resistance, heat resistance and water resistance.

The aqueous dispersion of the present invention comprises 100 parts by weight of a propylenic polymer and/or a modified propylenic polymer as (a) component, from 1 to 100 parts by weight, preferably from 51 to 100 parts by weight, of a surfactant as (b) component, and from 100 to 1000 parts by weight, preferably from 200 to 800 parts by weight, of water as (c) component. If the surfactant is less than 1 part by weight, a particle size of dispersion particles in the aqueous dispersion obtained becomes large and dispersion stability becomes poor, and if the surfactant component exceeds 100 parts by weight, water resistance of a coated film becomes poor. If the water component is less than 100 parts by weight, a solid content concentration of the aqueous dispersion obtained becomes too high, and dispersion stability becomes poor, and if the water content exceeds 1000 parts by weight, an effective component concentration of the aqueous dispersion obtained becomes too low and raises a practical problem.

Also, when using a basic material as (d) component for improving dispersion stability of (a) component, it is preferable to use (d) component in an amount of from 0.01 to 10 parts by weight, preferably from 0.1 to 5 parts by weight, to 100 parts by weight of (a) component. If the basic component is less than 0.01 part by weight, an effect of improving dispersion stability becomes insufficient, and if the basic material component exceeds 10 parts by weight, the effect of improving dispersion stability becomes saturated, and the dispersion stability is not improved any further even when adding in any further exceeding amount.

The polypropylenic aqueous dispersion of the present invention is prepared by dispersing the above propylenic polymer in an aqueous dispersion optionally containing a basic material if desired. The dispersing method is not specially limited, and examples of the dispersing method include a pulverizing method which comprises charging a propylenic polymer, together with a surfactant and water, into water to be dispersed; a method which comprises mixing a propylenic polymer dissolved in an organic solvent with a surfactant and water and then removing the organic solvent; a homomixer method which comprises using a homomixer to carry out dispersion; a method which comprises using a mixer to carry out emulsification by internal shear force; and a phase inversion method. Any of these methods can be used, and is optionally selected depending on physical properties of a propylenic polymer to be dispersed. Particularly, a method of using a mixer for carrying out emulsification by internal shear force is preferably used since it can more finely disperse a propylenic polymer and improves dispersion stability.

Since an average particle size of dispersion particles in the polypropylenic aqueous dispersion of the present invention is at most 0.5 μm, it is excellent in smoothness and adhesion to a polyolefinic base material and the phase separation is hardly caused and storage stability is improved, such being preferable. The lower limit of an average particle size is not specially limited, but is generally at least 0.01 μm.

When the polypropylenic aqueous dispersion of the present invention is used as a primer or a paint, a hydrophilic organic solvent other than water may be blended in order to raise a drying speed or to provide a satisfactory finished surface. Examples of the hydrophilic organic solvent include alcohols such as methanol, ethanol or the like; ketones such as acetone, methyl ethyl ketone or the like; glycols such as ethylene glycol, propylene glycol or the like; and their ethers.

If necessary, the propylenic aqueous dispersion of the present invention may be blended with other aqueous resins such as aqueous acrylic resin, aqueous urethane resin, aqueous epoxy resin, aqueous alkyd resin, aqueous phenol resin, aqueous amino resin, aqueous polybutadiene resin, aqueous silicone resin or the like. In addition thereto, a thickening agent, a defoaming agent, an antioxidant, a weather-proofing agent, a heat-proofing agent or other stabilizers, titanium oxide, an organic pigment or other coloring agents, carbon black, ferrite or other electricity-imparting agents, an antiseptic agent, a mildew-proofing agent, a rust-proofing agent or other various additives may be blended therewith. Further, in order to improve a wetting property of a base material to be coated, a small amount of an organic solvent may be added thereto, if necessary.

Examples of the thickening agent include an alginic acid type thickening agent such as ammonium alginate or sodium alginate; a mineral type thickening agent such as bentonite clay; an acrylic acid type thickening agent such as sodium polyacrylate, ammonium polyacrylate, acrylic emulsion copolymer or crosslinking acrylic emulsion copolymer; fiber derivatives such as carboxyl methyl cellulose, methyl cellulose, hydroxypropyl methyl cellulose or hydroxyethyl cellulose; and the like.

Examples of the defoaming agent include vegetable oils such as castor oil, soybean oil or linseed oil; mineral oils such as spindle oil or liquid paraffin; aliphatic acids such as stearic acid or oleic acid; alcohols such as oleyl alcohol, polyoxyalkylene glycol or octyl alcohol; aliphatic acid esters such as ethylene glycol distearate or polyoxyethylene sorbitan monolaurate; phosphoric acid esters such as tributyl phosphate or sodium octylphosphate; amides such as polyoxyalkylamides; metal soaps such as aluminum stearate, potassium oleate or calcium stearate; silicones such as dimethyl silicone or polyether modified silicone; amines such as dimethylamine or polyoxypropylalkylamine; and the like.

Examples of the stabilizer include a phenolic stabilizer such as 2,6-di-t-butyl-4-methylphenol, tetrakis[methylene(3,5-di-4-hydroxyhydrocinnamate)]methane, methoctadecyl-3-(4-hydroxy-3,5-di-t-butylphenyl)propionate, 2,2'-methylenebis(4-methyl-6-t-butylphenol), 4,4'-butylidenebis(3-methyl-6-t-butylphenol), 2,2-thiobis(4-methyl-6-t-butylphenol), 1,3,5-trimethyl-2,4,6-tris(3,5-di-t-butyl-4-hydroxybenzyl)benzene or 1,3,5-tris(2-methyl-4-hydroxy-5-t-butylphenol)butane; a sulfur type stabilizer such as dilaurylthiodipropionate or distearylthiodipropionate; a phosphorus type stabilizer such as tridecylphosphite or trinonylphenylphosphite; and the like. Also, examples of the ultraviolet ray absorber used include 2-hydroxy-4-octoxybenzophenone, 2-ethylhexyl-2-cyano-3,3-diphenyl acrylate, paraoctylphenyl salicylate or the like.

In a composite aqueous emulsion composition as another embodiment of the present invention, in addition to the above components (a) to (c), a polymer other than component (a) is added as component (e) in an amount of from 1 to 5000 parts by weight, preferably from 50 to 1000 parts by weight, per 100 parts by weight of component (a).

This polymer as component (e) is not specially limited so long as the object or the effect of the present invention is not damaged, and examples of component (e) include a styrenic polymer, a polyester type polymer, a phenol resin type polymer, a (meth)acrylic polymer, a urethane type polymer and an epoxy type polymer, and among them, at least one kind selected from a (meth)acrylic polymer, a urethane type polymer and an epoxy type polymer is preferable in view of water resistance and adhesion to a base material.

The above (meth)acrylic polymer means (i) a homopolymer or a copolymer of acrylic acid, methacrylic acid and/or its ester, and (ii) an acryl-modified alkyd resin.

Examples of the above (i) (meth)acrylate include a (meth)acrylate type monomer having an alkyl group having a carbon number of from 1 to 12 such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate and the like, or a (meth)acrylate having an aryl or aralkyl group having a carbon number of from 6 to 12 such as phenyl (meth)acrylate, toluoyl (meth)acrylate, benzyl (meth)acrylate, and the like.

Other examples of a (meth)acrylate include (meth)acrylates having a hetero atom-containing alkyl group having a carbon number of from 1 to 20 such as dimethylaminoethyl (meth)acrylate, diethylaminoethyl (meth)acrylate, 2-aminoethyl (meth)acrylate, 2-hydroxyethyl (meth)acrylate, hydroxypropyl (meth)acrylate, 2-methoxyethyl (meth)acrylate, 3-methoxypropyl (meth)acrylate, glycidyl (meth)acrylate, an adduct of (meth)acrylic acid and polyethyleneoxide, and the like, (meth)acrylates having a fluorine atom-containing alkyl group having a carbon number of from 1 to 20 such as trifluoromethylmethyl (meth)acrylate, 2-trifluoromethylethyl (meth)acrylate, 2-perfluoroethylethyl (meth)acrylate, and the like, and a (meth)acrylamide type monomer such as (meth)acrylamide, (meth)acryldimethylamide, and the like.

In addition to the above (meth)acrylic acid and/or its esters, (meth)acrylic oligomers alone or a combination with the above monomers may be used. (Meth)acrylic oligomer means a material having a certain repeating unit in a molecule and having at least one double bond of (meth)acryl structure in a molecule. This oligomer includes a material having a double bond at the terminal of a molecule which is referred to as a macromonomer. These (meth)acrylic oligomers have a weight average molecular weight in a range of from several hundreds to 50,000, and it is possible to vary physical properties of its obtained copolymer depending on a molecular weight and a kind of (meth)acrylic oligomers used. Such a (meth)acrylic oligomer is used usually in an amount in a range of from 1 to 80 parts by weight per 100 parts by weight of the above (meth)acrylic acid and/or its esters.

Examples of the (meth)acrylic oligomers include, in addition to the above macromonomer, a caprolactam-modified (meth)acrylic oligomer, a terminal hydroxyl group-containing (meth)acrylic oligomer, an oligoester (meth)acrylic oligomer, a urethane (meth)acrylate, an epoxy (meth)acrylate and the like.

The above (ii) acryl-modified alkyl resin means a material obtainable by graft-reacting (meth)acrylic acid and/or its esters with an alkyd resin prepared by esterification reaction of polyol and polybasic acid.

Examples of the polybasic acid used in the preparation of alkyd resin include adipic acid, azelaic acid, chlorendic acid, fumaric acid, isophthalic acid, maleic acid, phthalic acid, succinic acid, terephthalic acid, trimellitic acid, sebacic acid and the like. Also, these polybasic acids may be combined or a polybasic acid may be combined with a monobasic acid.

Examples of the monobasic acid include eleostearic acid, linolenic acid, linoleic acid, oleic acid, ricinolic acid, benzoic acid, lauric acid, myristic acid, palmitic acid, beralgonic acid, stearic acid, toluic acid and the like. Further, examples of the polyol used in the preparation of alkyd resin include α-methyl glucoxide, dipentaerythritol, glycerol, glycolic acid, pentaerythritol, trimethylolethane, trimethylolpropane, tripentaerythritol, sorbitol or the like, and alkyd resin can be prepared by using these starting materials in accordance with aliphatic acid method, ester-interchange method or the like.

The alkyl-modified alkyd resin used in the present invention can be obtained by graft-reacting the above monomers to these alkyd resins, for example, by such a method as described in the above modification of polypropylene main chain.

In the graft-reaction of alkyd resin, it is preferable to use a resin liquid-like at room temperature or in a solution. In order to make a solution, it is preferable to use a (meth)acrylic monomer as a solvent.

Examples of a polymerization method for preparing the above (meth)acrylic polymer include solution polymerization, bulk polymerization, emulsion polymerization or suspension polymerization, but are not specially limited.

In order to prepare an aqueous emulsion of (meth)acrylic polymer obtained by solution polymerization or bulk polymerization, emulsification or dispersion is carried out by mechanical force such as a colloid mill in the presence or absence of a solution, and a remaining solvent is then distilled off under a reduced pressure or atmospheric pressure, if desired. When employing emulsion polymerization or suspension polymerization, a polymer is obtained as an aqueous emulsion, but may be further concentrated to raise a resin solid content concentration if necessary.

The (meth)acrylic polymer thus obtained has a number average molecular weight of from 1,000 to 1,000,000, preferably from 20,000 to 500,000, and its aqueous emulsion has preferably a particle size of from 0.0001 to 0.5 µm, a resin solid content of from 15 to 70 wt %, and a liquid viscosity of from 0.05 to 50,000 mPa·s.

In the present invention, examples of a urethane type polymer used as component (e) include a urethane polymer obtainable by reacting (1) a component containing averagely at least 2 active hydrogen atoms in one molecule and (2) a polyhydric isocyanate component, or a urethane polymer obtainable by reacting a chain extender such as diol with an isocyanate group-containing prepolymer obtained by reacting the above (1) component and (2) component in the presence of an excess amount of isocyanate groups. These urethane type polymers may have an acid component (acid residue) contained therein.

The chain-extending method of isocyanate group-containing prepolymer may be a well known method, and examples of the chain extender include water, a water-soluble polyamine, glycols or the like, and the isocyanate group-containing prepolymer and the chain extender component may be reacted in the presence of a catalyst if necessary.

Examples of the component (1) containing averagely at least 2 active hydrogen atoms in one molecules are not specially limited, but a compound having active hydrogen of hydroxyl group is preferable.

Examples of such a compound are illustrated below.

i) Diol compound: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol or the like.

ii) Polyether diol: an alkylene oxide adduct of the above dial compound, or a ring-opening (co)polymer of alkylene oxide or cyclic ether (such as tetrahydrofuran), such as polyethylene glycol, polypropylene glycol, ethylene glycol-propylene glycol (block or random) copolymer, glycol, polytetramethylene glycol, polyhexamethylene glycol, polyoctamethylene glycol or the like.

iii) Polyester dial: a material obtainable by polycondensation of a dicarboxylic acid (anhydride) such as adipic acid, succinic acid, sebacic acid, glutaric acid, maleic acid, fumaric acid or phthalic acid with the above illustrated dial compound i) such as ethylene glycol, propylene glycol, 1,4-butanediol, 1,6-hexanediol, 1,8-octamethylenediol, neopentyl glycol, bis(hydroxymethyl)cyclohexane, bis(hydroxyethyl)benzene, alkyldialkanolamine, m-xylylene glycol, 1,4-bis(2-hydroxyethoxy)benzene or 4,4'-bis(2-hydroxyethoxy)diphenylpropane in the presence of an excess amount of hydroxyl groups. Concrete examples include ethylene glycol-adipic acid condensate, butanediol-adipic acid condensate, hexamethyleneglycol-adipic acid condensate, ethylene glycol-propylene glycol-adipic acid condensate, a polycondensate of bis(hydroxymethyl)cyclohexane with $C_4$-$C_8$ straight chain dicarboxylic acid mixture, or polylactonediol obtained by ring-opening polymerization of lactone in the presence of glycol as an initiator.

iv) Polyether ester dial: a material obtainable by reacting an alkylene oxide with a dicarboxylic acid (anhydride) as illustrated in the above iii) and an ether group-containing diol (such as polyetherdiol or diethylene glycol of the above ii)) or a mixture with other glycol, for example, polytetramethylene glycol-adipic acid condensate, and the like.

V) Polycarbonate diol: A compound expressed by the formula HO—R—(O—C(O)—O—R)$_x$—OH (wherein R is a saturated aliphatic acid diol residue having a carbon number of from 1 to 12, and x is an integer of usually from 5 to 50 indicating the number of a repeating unit of molecule). They are obtainable by a method of ester-interchange reaction of a saturated aliphatic diol with a substituted carbonate (such as diethyl carbonate or diphenyl carbonate) in the presence of an excess amount of hydroxyl groups, or a method of reaction of the above saturated aliphatic diol with phosgene, or if necessary, further by reacting a saturated aliphatic diol.

One or two or more kinds of the above-illustrated compounds i) to v) may be used in combination.

Examples of the polyhydric isocyanate component (2) reacted with the above component (1) include an aliphatic, alicyclic or aromatic compound having averagely at least 2 isocyanate groups in one molecule.

Examples of the aliphatic diisocyanate compound include an aliphatic diisocyanate having a carbon number of from 1 to 12, such as hexamethylene diisocyanate, 2,2,4-trimethylhexane diisocyanate or the like, examples of the alicyclic diisocyanate compound include an alicyclic diisocyanate having a carbon number of from 4 to 18, such as 1,4-cyclohexane diisocyanate, methylcyclohexylene diisocyanate or the like, and examples of the aromatic isocyanate include tolylene diisocyanate, 4,4'-diphenylmethane diisocyanate, xylylene diisocyanate or the like.

Also, it is expected that a urethane type polymer containing an acid residue can be dispersible in water without using a surfactant or in the presence of a small amount of surfactant, and consequently that the coated film is expected to have a satisfactory water resistance. A content of the acid residue is preferably in a range of from 25 to 150 (mgKOH/g), preferably from 30 to 100 (mgKOH/g), as an acid value of the urethane type polymer. When the acid value is less than 25, water-dispersibility becomes insufficient, and it is often necessary to employ a surfactant. On the other hand, if the acid value is higher than 150, water resistance of a coated film tends to become poor.

A method for introducing an acid group into the urethane type polymer is not specially limited and may be a conventionally known method. For example, by substituting a dimethylol alkanoic acid with a part or all part of a glycol component as illustrated in the above ii) to iv), a carboxyl group may be previously introduced into polyether diol, polyester diol, polyether ester diol or the like, or an acid group may be preferably introduced by mixing a dimethylol alkanoic acid with the diol component as illustrated in the above i) or v). Examples of the dimethylol alkanoic acid used herein include dimethylol acetic acid, dimethylol propionic acid, dimethylol butyric acid or the like.

The urethane type polymer used in the present invention has a number average molecular weight of from 1000 to 1,000,000, preferably from 20,000 to 200,000.

The above urethane type polymer is obtained as an aqueous emulsion or is water-dispersible. The aqueous emulsion of the urethane type polymer usually has a particle size of from 0.001 to 0.5 μm, a resin solid content of from 15 to 70 wt % and a liquid viscosity of from 0.05 to 10,000 mPa·s.

In the present invention, the epoxy type polymer usable as component (e) is a polymer having at least one epoxy group in one molecule, such as polyhydric glycidyl ether of phenol, which is obtainable by reacting a polyhydric phenol with epichlorohydrin in the presence of an alkali, or an epoxy group-containing polymer obtainable by reacting the above phenol-polyhydric glycidyl ether with the above polyhydric phenol.

Examples of the polyhydric phenol used herein include bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, and the like.

A hydrogenated compound obtained by adding hydrogen to a part or all part of double bonds of its phenyl nucleus can be used in place of these polyhydric phenols.

Also, as the epoxy type polymer, polyglycidyl ether of phenolic novolac resin and polyglycidyl ether of polyhydric alcohol may be used. Examples of the above polyhydric alcohol include ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane, sorbitol, and the like.

Also, in the present invention, as the epoxy type polymer, it is possible to employ an epoxy group-containing acrylic polymer obtained by copolymerizing an epoxy group-containing monomer such as glycidyl (meth)acrylate with other polymerizable unsaturated monomer such as methyl (meth)acrylate, ethyl (meth)acrylate, butyl (meth)acrylate, (meth)acrylamide, (meth)acrylonitrile, styrene or the like. Further, an epoxylated polybutadiene, an epoxylated polycycloalkene or the like is usable.

A molecular weight and an epoxy equivalent of the epoxy type polymer used as component (b) in the present invention are not specially limited, but the epoxy type polymer preferably has a number average molecular weight in a range of from 300 to 100,000, preferably 320 to 50,000, and an epoxy equivalent in a range of from 100 to 4000 (eq/g), preferably from 150 to 2000 (eq/g).

Also, an aqueous emulsion of the epoxy type polymer can be prepared in the same manner as described with regard to the above acrylic polymer and urethane type polymer, and the epoxy type polymer aqueous emulsion thus obtained usually has a particle size of from 0.0001 to 1 μm, a resin solid content of from 15 to 70 wt % and a liquid viscosity of from 0.05 to 50,000 mPa·s.

If the polymer content of component (e) is less than 1 part by weight, a coated film obtained from such a composite aqueous emulsion provides unsatisfactory physical properties in respect of coated film strength, water resistance, weather resistance, abrasion resistance, solvent resistance or the like. On the other hand, if the polymer content exceeds 5000 parts by weight, adhesion or adhesiveness to a polyolefinic base material tends to become unsatisfactory.

Also, as a method for adding component (e) to the composition, component (e) may be added to component (a) before dispersing and then the above-mentioned dispersion treatment may be carried out, or previously water-dispersed component (a) may be added to a dispersion containing components (a) to (c) (and component (d) if necessary).

Also, when using a polymer having a reactive group such as a hydroxyl group or an epoxy group as component (e) and a carboxylic acid-modified propylenic polymer as component (a), a chemical bond may be formed between the two components, and such a case is further preferable since uniformity of a coated film formed is improved.

The polypropylenic aqueous dispersion of the present invention is coated on a surface of a molded product comprising an α-olefin (co)polymer or other polymer as a main component of a base material, or can be used as a primer for improving coated film performances such as gasoline resistance, water resistance or adhesiveness of an ink and a paint to the surface. Particularly, the polyolefinic aqueous dispersion of the present invention is suitably usable to a molded product comprising α-olefin polymer such as high pressure polyethylene, middle low pressure polyethylene, polypropylene, poly-4-methyl-1-pentene, poly-1-butene, polystyrene or the like; and α-olefin copolymer such as ethylene.propylene copolymer, ethylene.butene copolymer, propylene.butene copolymer or the like.

Among them, it is particularly preferable to use crystalline polypropylene as a base material.

(II) Base Material (B)

Base material (B) used in the present invention is a molded product of crystalline polypropylene. The crystalline polypropylene is a molded product comprising propylene homopolymer, and/or propylene.ethylene block copolymer comprising a propylene homopolymer part and a propylene-.ethylene copolymer part.

(II-1) Crystalline Polypropylene

Propylene homopolymer and propylene.ethylene block copolymer have an MFR value of preferably at least 2 g/10 minutes, more preferably from 10 to 300 g/10 minutes, particularly preferably from 25 to 200 g/10 minutes.

If the above propylene.ethylene block copolymer and propylene homopolymer have an MFR value of less than 2 g/10 minutes, flow property tends to become unsatisfactory. On the other hand, if the MFR value is extremely high, mechanical properties become unpreferably poor.

MFR of the above propylene.ethylene block copolymer may be adjusted at the time of polymerization or may be adjusted with an organic peroxide such as diacyl peroxide or dialkyl peroxide after polymerization.

The propylene.ethylene block copolymer is a propylene-.ethylene block copolymer containing a crystalline polypropylene part ((a) unit part) and an ethylene.propylene random copolymer part ((b) unit part).

The (a) unit part is usually obtained by homopolymerization of propylene or copolymerization of propylene with a small amount of other α-olefin.

The polypropylene homopolymer of the (a) unit part has MFR of preferably at least 10 g/10 minutes, more preferably 15 to 500 g/10 minutes, further preferably from 20 to 400 g/10 minutes, particularly preferably from 40 to 300 g/10 minutes.

If the propylene homopolymer part ((a) unit part) of the above propylene.ethylene block copolymer has MFR of less than 10 g/10 minutes, flow property tends to become unsatisfactory. On the contrary, if MFR is remarkably high, mechanical properties tend to become poor.

On the other hand, the above (b) unit part is a rubbery component obtained by random copolymerization of propylene and ethylene.

The above propylene.ethylene copolymer part ((b) unit part) has a propylene content of preferably from 30 to 85 wt %, more preferably from 40 to 80 wt %, most preferably from 50 to 75 wt %. If the copolymer part has a propylene content outside the above range, its dispersibility becomes poor, and a glass transition temperature rises and impact property tends to become lower.

The propylene content of propylene.ethylene copolymer part can be adjusted by controlling a concentration ratio of propylene and ethylene at the time of polymerization of propylene.ethylene copolymer part.

Also, a molecular weight of the above propylene.ethylene copolymer part is not specially limited, but its weight average molecular weight (Mw) is preferably from 200,000 to 3,000,000, more preferably from 300,000 to 2,500,000, most preferably from 400,000 to 2,000,000, in view of dispersibility and impact resistance.

Amounts of (a) unit part and (b) unit part are not specially limited, but generally (a) unit part is preferably at most 95 wt %, more preferably from 50 to 95 wt %, most preferably from 60 to 90 wt %, to the total polymer amount, and (b) unit part is preferably at least 5 wt %, more preferably from 5 to 50 wt %, most preferably from 10 to 40 wt %, to the total polymer amount.

If the amount of (b) unit part is less than the above range, impact resistance property expected for a block copolymer tends to become unsatisfactory, and if the amount of (b) unit part exceeds the above range, stiffness, strength and heat resistance tend to become unpreferably low.

In the present invention, the amount of the copolymer part is measured by using temperature rise elution fractionation method. That is, (a) unit part is not eluted at a temperature of not higher than 100° C. in the extraction with o-dichlorobenzene, but (b) unit part is easily eluted. Thus, after production, the polymer is evaluated by the above extraction analysis with o-dichlorobenzene with respect to the composition of propylene.ethylene block copolymer.

The amount of propylene.ethylene copolymer part can be adjusted by controlling a ratio of a polymerization amount of propylene homopolymer part and a polymerization amount of propylene.ethylene copolymer part by a polymerization time.

A method for producing a propylene homopolymer and/or a propylene.ethylene block copolymer comprising a propylene homopolymer part and a propylene.ethylene copolymer part is not specially limited, but may be optionally selected from known methods and conditions.

Usually, a stereoregularity catalyst is used as a polymerization catalyst of propylene. Their examples include a catalyst obtained by reducing titanium tetrachloride with an organic aluminum compound, and combining a titanium trichloride composition obtained by treating with various electron donors and electron receptors, with an organic aluminum compound and an aromatic carboxylic acid ester (see JP-A-56-100806, JP-A-56-120712 and JP-A-58-104907), and a carrier type catalyst obtained by contacting various electron donors and titanium tetrachloride with magnesium halide (see JP-A-57-63310, JP-A-63-43915 and JP-A-63-83116). Further, a metallocene type catalyst as illustrated in WO-91/04257 may be included. Generally, a metallocene type catalyst may not contain alumoxane, but a preferable catalyst comprises a combination of a metallocene compound and alumoxane, so to speak a Kaminski type catalyst.

The propylene.ethylene block copolymer can be obtained by homopolymerization of propylene in a production process such as gas phase polymerization method, liquid phase bulk polymerization method or slurry polymerization method in the presence of the above catalyst, and then by random polymerization of propylene and ethylene. In order to obtain a propylene.ethylene block copolymer having the above-mentioned melting property (MFR), it is preferable to employ multi-stage polymerization by slurry method or gas phase fluidized bed method. It is possible to carry out homopolymerization of propylene by multi-stage polymerization and then to carry out random polymerization of propylene and ethylene. In the production of a propylene.ethylene block copolymer having a large amount of (b) unit part, it is particularly preferable to employ gas phase fluidized bed method.

The propylene homopolymer is obtained by homopolymerization of propylene in a production process of gas phase polymerization method, liquid phase bulk polymerization method or slurry polymerization method in the presence of the above catalyst. In order to obtain a propylene homopolymer having the above melting property (MFR), it is preferable to employ multi-stage polymerization by slurry method or gas phase fluidized bed method.

The propylene.ethylene block copolymer and the propylene homopolymer of the present invention have satisfactory mechanical properties such as a bending modulus of preferably at least 300 MPa, more preferably from 500 to 3000 MPa, most preferably from 1000 to 2000 MPa. If the bending modulus is outside the above range, stiffness becomes poor, and it is not suitable as a structural material.

IZOD impact strength is preferably at least 1 kJ/m$^2$, more preferably from 2 to 100 kJ/m$^2$, most preferably from 5 to 80 kJ/m$^2$, particularly preferably from 8 to 60 kJ/m$^2$. If the IZOD impact strength is less than the above range, impact resistance property becomes poor, and it is not suitable as a structural material.

(II-2) Inorganic Filler Component

The base material (B) used in the present invention may contain an inorganic filler component. It is possible to improve mechanical properties such as bending modulus and stiffness of a molded product by blending an inorganic filler with crystalline polypropylene. Examples of the inorganic filler include a plate-like filler such as talc, mica, montmorillonite or the like, a fibrous filler such as short fiber glass fiber, long fiber glass fiber, carbon fiber, aramid fiber, alumina fiber, boron fiber, zonolite or the like, a needle-like (whisker) filler such as potassium titanate, magnesium oxysulfate, silicon nitride, aluminum borate, basic magnesium sulfate, zinc oxide, wallastonite, calcium carbonate, silicon carbide or the like, a particulate filler such as precipitated calcium carbonate, heavy calcium carbonate, magnesium carbonate or the like, a balloon-like filler such as glass balloon, and the like. An inorganic filler and a pigment such as zinc white, titanium white, magnesium sulfate or the like are also usable. Among them, talc, mica, glass fiber and whisker are preferable in respect of physical properties and costs. Hereinafter, particularly preferable fillers such as talc, glass fibers and mica are described in more details.

(1) Talc

Talc has an average particle size of usually at most 10 μm, preferably from 0.5 to 8 μm, more preferably from 1 to 7 μm.

The above average particle size can be measured from particle size values of accumulation amount 50 wt % determined from a particle size accumulation distribution curve measured by laser diffraction method (such as LA920W manufactured by HORIBA, Ltd.) or liquid layer precipitation system light transmittance method (such as CP type manufactured by Shimadzu Corporation). In the present invention, the average particle size is an average particle size measured by the former method.

The talc is obtained by mechanically finely pulverizing naturally occurring talc and further precisely classifying the pulverized talc. Also, it may be roughly classified and then further precisely classified.

Examples of the mechanically pulverizing method include a method of using a pulverizing machine such as a jaw crusher, a hummer crusher, a roll crusher, a screen mill, a jet pulverizing machine, a colloid mill, a roller mill, a vibrating mill or the like.

In order to adjust an average particle size as defined in the present invention, the talc thus pulverized is subjected one time or repeatedly to wet type or dry type classification by an apparatus such as a cyclone, a cyclone air separator, a microseparator, a cyclone air separator, a sharp cut separator or the like. When producing the talc of the present invention, it is preferable to pulverize into a specific particle size and then to carry out classification operation by a sharp cut separator.

In order to improve adhesiveness or dispersibility to a polymer, the talc may be surface-treated with various agents such as an organic titanate type coupling agent, an organic silane coupling agent, an unsaturated carboxylic acid or its anhydride-grafted modified polyolefin, an aliphatic acid, an aliphatic metal salt, an aliphatic ester or the like.

(2) Glass Fiber

It is general to employ a glass chopped strand as a glass fiber, and the chopped strand has a length of usually from 3 to 50 mm and a diameter of fiber of from 3 to 25 μm, preferably from 8 to 14 μm. The glass chopped strand to be used is preferably surface-modified with a silane type compound and surface-treated with greige goods such as polyvinyl alcohol, polyvinyl acetate, polyurethane, epoxy resin or a olefinic component.

Examples of the silane type compound include vinyltriethoxysilane, vinyl-tris(β-methoxyethoxy)silane, γ-methacryloxypropyltrimethoxysilane, β-(2,4-epoxycyclohexyl) ethoxymethoxysilane, γ-glycidoxypropyltrimethoxysilane, γ-aminopropyltriethoxysilane, γ-(2-aminoethyl)aminopropyltrimethoxysilane, N-β-(aminoethyl)-γ-aminopropyltrimethoxysilane, and the like.

On the other hand, examples of the olefinic component as greige goods include an unsaturated carboxylic acid-modified polyolefin or a polyolefin low molecular material. Examples of the unsaturated carboxylic acid include the above illustrated materials, and examples of the polyolefin low molecular material include low molecular materials of polyethylene resin, polypropylene resin, propylene.ethylene block copolymer, ethylene.butylene copolymer, ethylene-.pentene copolymer or the like.

In the present invention, if necessary, in order to improve mechanical strength, an unsaturated carboxylic acid and/or its derivative may be blended for effecting interface adhesion between glass fiber and polypropylene resin. This blending is necessary for further improving mechanical strength although it does not impart dispersibility of glass fibers in the present invention. Examples of the unsaturated carboxylic acid and/or its derivative include maleic acid, maleic anhydride, acrylic acid, methacrylic acid, itaconic acid, itaconic anhydride, crotonic acid, citraconic acid, angelic acid, sorbic acid, or metal salts, amides, imides or esters of these unsaturated carboxylic acids. It is preferable to use a polyolefinic resin modified with the above unsaturated carboxylic acid alone or its derivative, and it is particularly preferable to have polypropylene resin as a matrix modified, and its modification rate is preferably from 0.1 to 10 wt %.

(3) Mica

It is preferable that mica has an average particle size of from 2 to 100 μm and an average aspect ratio of at least 10, particularly an average particle size of from 2 to 80 μm and an average aspect ratio of at least 15. If the average particle size of mica is larger than the above range, a molded product becomes poor in scuff resistance, outer appearance and impact strength, and the average particle size is smaller than the above range, dispersibility becomes rather poor, and scuff resistance, outer appearance and impact strength of a molded product are lowered. The mica may be any of muscovite, phlogopite and biotite, but among them, phlogopite and muscovite are preferable, and particularly muscovite is preferable.

A method for producing mica is not specially limited, and is produced in accordance with the above-mentioned method for producing talc. However, among them, it is preferable to employ a production method of dry type pulverization.wet type classification or a production method of wet type pulverization.wet type classification, and particularly it is preferable to employ a production method of wet type pulverization.wet type classification system. These fillers may be surface-treated with a surfactant, a coupling agent or the like. The surface-treated filler has an effect of improving strength or heat resistant stiffness of a molded product.

An amount of using an inorganic filler component is selected within a wide range depending on an object or use of a molded product, but is preferably from 1 to 80 parts by weight, more preferably from 2 to 75 parts by weight, most preferably from 5 to 60 parts by weight, to 100 parts by weight of a crystalline propylene polymer. By incorporating an inorganic filler component in such an amount, a bending modulus can be improved so as to have at least 1000 MPa, preferably from 1500 to 10000 MPa, more preferably from 2000 to 8000 MPa. Also, an IZOD impact strength is improved so as to have at least 1 $kJ/m^2$, preferably from 2 to 80 $kJ/m^2$, more preferably from 4 to 60 $kJ/m^2$.

(II-3) Elastomer Component

Also, an elastomer component may be incorporated into a base material (B) used in the present invention. By blending an elastomer component with a crystalline polypropylene, an impact strength of a molded product can be improved.

Examples of the elastomer component include ethylene.α-olefin random copolymer rubber, ethylene.α-olefin.non-conjugated diene copolymer rubber, styrene-containing thermoplastic elastomer, and the like. Concrete examples include an ethylene.α-olefin copolymer rubber such as ethylene.propylene copolymer rubber, ethylene.1-butene copolymer rubber, ethylene.1-hexene copolymer rubber, ethylene.1-octene copolymer rubber or the like, an ethylene.α-olefin-non-conjugated diene copolymer rubber such as ethylene.propylene-.ethylidene norbornane copolymer rubber (EPDM) or the like, a styrene-containing thermoplastic elastomer such as hydrogenated styrene-butadiene-styrene triblock copolymer (SEBS), hydrogenated styrene-isoprene-styrene triblock copolymer (SEPS) or the like. These elastomers are prepared in the following manner.

These elastomer components have a melt flow rate (230° C., 2.16 kg load) in a range of preferably from 0.5 to 150 g/10 minutes, more preferably from 0.7 to 100 g/10 minutes, most preferably from 0.7 to 80 g/10 minutes, when taking the main use of the present invention for exterior materials of automobiles into consideration. The above elastomer component may be used alone or in a mixture of two or more.

(Ethylene.α-olefin Random Copolymer Rubber)

A content of α-olefin unit in ethylene.α-olefin random copolymer rubber is usually from 15 to 70 wt %, preferably from 20 to 55 wt %. If the content of α-olefin unit is lower than the above range, impact strength becomes poor, and if the content of α-olefin unit exceeds the above range, stiffness is lowered and it is difficult to maintain a pellet-like elastomer shape so that production handling in the production of resin composition is remarkably lowered, such being unpreferable.

α-olefin has a carbon number of from 3 to 20, and its examples include propylene, 1-butene, 1-pentene, 1-hexene, 1-heptene, 1-octene, 1-nonene, 1-decene, 1-undecene, 1-dodecene, and the like. Among them, propylene, 1-butene, 1-pentene, 1-hexene, 1-heptene and 1-octene are preferable.

The above ethylene.α-olefin random copolymer rubber has an MFR value (230° C., load 21.18 N) of usually from 0.01 to 100 g/10 minutes, preferably from 0.1 to 100 g/10 minutes. Further, its density is usually from 0.85 to 0.90 g/cm$^3$, preferably from 0.86 to 0.89 g/cm$^3$.

If the MFR value is less than 0.01 g/10 minutes, a satisfactory dispersion cannot be obtained at the time of kneading when forming a resin composition, and impact strength is lowered. On the other hand, an MFR value exceeds 100 g/10 minutes, copolymer rubber itself is poor in tenacity and impact strength is lowered. Also, if the density exceeds 0.90 g/cm$^3$, impact strength is poor, and if the density is lower than 0.85 g/cm$^3$, it becomes difficult to carry out pelletization. Further, it is preferable to produce the ethylene.α-olefin random copolymer rubber by using such a metallocene type catalyst as disclosed in WO-91/04257 or the following vanadium compound type catalyst.

In the present invention, α-olefin content is measured in accordance with a usual method such as infrared spectrum analysis method, $^{13}$C-NMR method or the like. The density is measured in accordance with JIS K7112.

Examples of a polymerization method for ethylene.α-olefin random copolymer rubber include gas phase fluidized bed method, solution method, slurry method, high pressure polymerization method, and the like, and a small amount of such a diene component as dicyclopentadiene, ethylidenenorbornane or the like may be copolymerized therewith.

Examples of the polymerization catalyst include a Ziegler type catalyst comprising a combination of an organic metal compound such as alkyl aluminum or alkyl aluminum chloride, an organic aluminum-magnesium complex such as alkylaluminum-magnesium complex or alkylalkoxy aluminum-magnesium complex, a vanadium compound, a titanium compound such as titanium halide, and the like, or a metallocene type catalyst as disclosed in WO-91/04257. A catalyst referred to as the metallocene type catalyst may not contain alumoxane, but is preferably a catalyst comprising a combination of a metallocene compound and alumoxane, so to speak a Kaminski type catalyst.

Polymerization is carried out in accordance with such a production process as gas phase fluidized bed method, solution method, slurry method or the like.

Such an ethylene.α-olefin random copolymer rubber is variously commercially available. Commercially available examples include JSR EP02P, EP07P, EP912P, EP57P or the like (manufactured by JSR CORPORATION), Toughmer P0180, P0480, P0680 or the like (manufactured by Mitsui Chemicals, Inc.) for ethylene.propylene rubber; JSR EBM2041P, EBM2011P, EBM3021P or the like (manufactured by JSR CORPORATION), Toughmer A4085, A4090, A20090 or the like (manufactured by Mitsui Chemicals, Inc.) for ethylene.butene rubber; and EG8150, EG8100, EG8200 or the like (manufactured by DuPont Dow Elastomers, tradename "Engage") for ethylene.1-octene rubber.

(Styrene-containing Thermoplastic Elastomer)

The styrene-containing thermoplastic elastomer used in the present invention contains a polystyrene part in an amount of from 5 to 60 wt %, preferably from 10 to 30 wt %. If the polystyrene content is outside the above range, impact strength becomes insufficient. Its MFR value (230° C., load 21.18 N) is from 0.01 to 100 g/10 minutes, preferably from 0.1 to 50 g/10 minutes. If the MFR value is outside the above range, impact resistance becomes unsatisfactory.

Examples of the styrene-containing thermoplastic elastomer include styrene ethylene/butylene.styrene block copolymer (SEBS). This is a thermoplastic elastomer comprising a polystyrene block unit and a polyethylene/butylene rubber block unit. The SEBS contains a polystyrene block unit as a hard segment, which forms a physical crosslinkage (domain) for crosslinking rubber block units, and a rubber block unit present between polystyrene block units is a soft segment having a rubber elasticity.

As a segment ratio of SEBS, it is preferable to contain a polystyrene unit in an amount of from 10 to 40 mol %. A content of a unit derived from styrene is measured in accordance with a usual method such as infrared spectrum analysis method, 13C-NMR method or the like.

SEBS can be obtained by a well known method disclosed in JP-B-60-57463.

These styrene-containing thermoplastic elastomers can be produced generally by anion living polymerization method. Examples of this production method include a method of successively polymerizing styrene, butadiene and styrene to form a triblock body and then hydrogenating (production method of SEBS) and a method of preparing a diblock copolymer of styrene-butadiene, then preparing a triblock body by using a coupling agent and then hydrogenating. Also, it is possible to produce hydrogenated styrene-isoprene-styrene triblock body (SEPS) by using isoprene in place of butadiene.

It is possible to use a commercially available product as SEBS, examples of which include Kraton G1650, G1652, G1657 or the like (manufactured by Kraton polymers Company), Tuftec (manufactured by Asahi Kasei Corporation) and the like.

SEBS used in the present invention is generally known to be a hydrogenated material of SBS (styrene.butadiene.styrene block copolymer) which is a styrene-butadiene type block copolymer. In the present invention, in addition to SEBS, SBS and other styrene.conjugated diene type copolymer or their complete or incomplete hydrogenated materials may be used.

Examples of such a styrene.conjugated type copolymer include SBR (styrene.butadiene random copolymer), SBS, PS-polyisobutylene block copolymer, SIS (styrene.isobutylene.styrene block copolymer) and SIS hydrogenated material (SEPS). More particular examples include Kraton (Kraton: manufactured by Kraton Polymers), Cariblex TR (manufactured by Kraton Polymers), Sorbrene (manufactured by Phillips Petroleum International, Ltd.), Eurobrene SOLT (manufactured by Anich Company), TUFBRENE (manufactured by Asahi Kasei Corporation), Sorbrene-T (manufactured by Nihon Elastomer K.K.), JSRTR (manufactured by JSR CORPORATION), Denka STR (manufactured by Denki Kagaku Kogyo K.K.), Kuintac (manufactured by Nippon Zeon Co., Ltd.), Kraton G (manufactured by Kraton Polymers Company), Tuftec (manufactured by Asahi Kasei Corporation), and the like.

In the present invention, as an elastomer component, the above-mentioned ethylene.α-olefin random copolymer rubber and styrene-containing thermoplastic elastomer may be used respectively alone or in combination of them. Amount of the elastomer component used is selected from a wide range depending on an object or use of a molded product, but it is preferably from 1 to 90 parts by weight, more preferably from 2 to 75 parts by weight, most preferably from 5 to 60 parts by weight, to 100 parts by weight of a crystalline propylene polymer. By incorporating such an elastomer component, an IZOD impact strength is improved to be preferably at least 5 kJ/m$^2$, more preferably from 10 to 100 kJ/m$^2$, most preferably from 15 to 80 kJ/m$^2$.

(II-4) Other Components

Also, in addition to the above materials, the base material (B) of the present invention may contain optionally an additive or other blending components so long as the effect of the present invention is not remarkably damaged. Examples of other components include a pigment for coloring, a phenol type, sulfur type or phosphorus type antioxidant, an antistatic agent, a light stabilizer such as hindered amine, a UV ray absorber, various nucleating agents such as an organic aluminum, talc or the like, a dispersant, a neutralizing agent, a foaming agent, a copper poison-preventing agent, a lubricant, a flame-retardant, and various resins other than the above propylenic block copolymer, such as polyethylene resin as blending materials.

More particular examples include a phenolic antioxidant such as pentaerythtyl-tetrakis[3-(3,5-di-t-butyl-4-hydroxylphenyl)propionate], octadecyl-3-(3,5-di-t-butyl-4-hydroxyphenyl)propionate, tris(3,5-di-t-butyl-4-hydroxybenzyl)-isocyanurate, triethylene glycol-bis[3-(3-t-butyl-5-methyl-4-hydroxyphenyl)propionate] or the like, a phosphorus type antioxidant such as tris(2,4-di-t-butylphenyl)phosphite, bis (2,4-di-t-butylphenyl)pentaerythritol diphosphite, tetrakis(2, 4-di-t-butylphenyl)4,4'-biphenylene diphosphonite or the like, a UV ray absorber such as dimyristyl-3,3'-thiodipropionate, distearylthiodipropionate, 2-(3-t-butyl-5-methyl-2-hydroxyphenyl)-5-chlorobenzotriazole, 2-(3,5-di-t-butyl-2-hydroxyphenyl)benzotriazole, 2-hydroxy-4-n-octyloxybenzophenone or the like, a weather-resistant stabilizer such as bis(2,2,6,6-tetramethyl-4-piperidyl)sebacate, bis(1,2,2,6,6-pentamethyl-4-piperidyl)sebacate, poly [{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], bis(1-octyl-2,2,6,6-tetramethyl-4-piperidyl) sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, 2,4-di-t-butylphenyl-3,5-di-t-butyl-4-hydroxybenzoate or the like, and an antistatic agent such as glyceryl monostearate, and the like.

(II-5) Preparation Method of Polypropylene Resin Composition

A preparation method of a propylenic resin composition constituting a base material (B) of the present invention is not specially limited, and the propylenic resin composition can be prepared by optionally blending the above blending components with a propylenic resin, mixing and melt-kneading in accordance with a conventionally well known method.

In the present invention, a propylenic resin composition constituting a base material (B) can be obtained by blending the above-mentioned essential component, i.e. crystalline polypropylene with optional components used as required, in the above-mentioned blending ratio, and kneading and granulating by an ordinary kneader such as a mono-axial extruder, a biaxial extruder, a banbury mixer, a roll mixer, a brabender plastograph, a kneader or the like.

In this case, it is preferable to employ such a kneading and granulating method as to make a satisfactory dispersion of respective components, and a biaxial extruder is usually used. At the time of kneading and granulating, the above respective components may be kneaded at the same time, or each component may be divided and kneaded in order to improve aimed properties.

(II-6) Production of Polypropylene Molded Product and its Use

As a base material (B) of the present invention, the above polypropylene resin composition is used, and can be is molded in accordance with well known various methods. For example, various molded products can be obtained by injection molding (including gas injection molding), press molding, press injection molding, extrusion molding, blow molding, rotation molding, calendar molding, inflation molding, monoaxially oriented film molding, biaxially oriented film molding or the like. Among them, a molded product by injection molding, press molding or injection press molding is preferable, and injection molding is particularly preferable in view of productivity.

In the present invention, a molded product of an electroconductive polypropylenic resin composition containing electroconductive carbon may be used as a base material, and in such a case, it is preferable to use a molded product having a surface glossiness of at least 30% (JIS-K7105, incident angle 60°).

(II-7) Electroconductive Carbon

Electroconductive carbon used in a base material (B) of the present invention is blended with a polypropylenic resin composition to provide an electroconductive polypropylenic resin composition, and it is necessary to make a glossiness of its molded product surface at least 30% in view of surface quality of coated surface. If the glossiness is less than 30%, it is necessary to increase a film thickness of coated film in order to impart gloss feeling to a coated film surface after coating, and it is not preferable in view of coating efficiency. In case of a polypropylenic resin molded product not containing an inorganic filler component, the glossiness is preferably at least 50%, more preferably at least 60%. In case of a polypropylenic resin molded product containing an organic filler and/or an elastomer, the glossiness is preferably at least 32%, more preferably at least 35%.

By blending electroconductive carbon with a polypropylenic resin composition, a glossiness of a molded product surface is lowered, and it is therefore preferable that the blending ratio of electroconductive carbon is low in view of glossiness. On the other hand, in order to carry out electrostatic coating, it is desired that a base material should have a high electroconductivity. Under these circumstances, in order to raise a good balance between electroconductivity and glossiness of a base material, it is preferable that a high electroconductivity can be achieved by blending electroconductive carbon in a small amount, i.e. at a high electroconductivity-imparting efficiency. Thus, an amount of electroconductive carbon blended with a base material is adjusted in such a manner as to provide a volume specific resistance of preferably at most $10^{11}$ Ωcm, more preferably from $10^5$ to $10^{10}$ Ωcm.

A structure of carbon black necessary for providing a high electroconductivity-imparting efficiency is to have a particle size of preferably from 10 to 100 nm, more preferably from 10 to 50 nm, a DBP absorption amount of preferably from 50 to 900 ml/100 g, more preferably from 100 to 600 ml/100 g, a specific surface area of preferably from 100 to 1500 m$^2$/100 g, more preferably from 500 to 1500 m$^2$/100 g. When the respective particle size, DBP absorption amount and specific surface area are respectively outside the above-mentioned ranges, a satisfactory structure is not developed, and electroconductivity of carbon itself is lowered, and interaction among carbon particles increases. As this result, dispersibility of electroconductive carbon is lowered, and electroconductivity or fluidity of the resin composition tend to be lowered, such being unpreferable.

Here, a particle size is measured by using a transmission electron microscope. A DBP absorption amount is measured by a dibutylpthalate absorbed meter in accordance with JIS-K6221. A specific surface area is measured in accordance with liquid nitrogen absorption method (ASTM D3037).

Commercially available carbon black may be used so long as they satisfy the above-mentioned structural conditions, examples of which include "Ketjen EC" and "EC600JD" manufactured by Ketjenblack International Company. Only one kind of carbon black may be used, but if necessary, two or more kinds of carbon black may be used in combination. An amount of electroconductive carbon black to be blended is not specially limited so long as a molded product surface having a glossiness of at least 30% can be provided, but is usually from 0.1 to 25 parts by weight, preferably from 0.5 to 20 parts by weight, more preferably from 1 to 18 parts by weight, 100 parts by weight of crystalline polypropylene.

Such a molded product of composition can be obtained in the same manner as mentioned above.

The propylenic resin-coated molded product of the present invention does not contain a halogen such as chlorine, and is therefore satisfactory in respect of environmental load, and is excellent in coated film adhesion and has well balanced excellent physical properties such as stiffness and impact resistance.

The propylenic resin-coated molded product of the present invention is suitably usable for various industrial parts fields, e.g. particularly various molded products required to be thin, to have high functions, and to be largely scaled, such as automobile parts including a bumper, an instrument panel, a trim, a garnish or the like, home electrical appliances including a television case, a washing machine, refrigerator parts, air conditioner parts, cleaning machine parts or the like, toiletry goods including a toilet seat, a cover of toilet seat, a water tank or the like, bathroom parts including a bathtub, wall and ceiling of bathroom, a waste water pan or the like, and other various molding materials for industrial parts.

Also, molded products to which the polyolefinic aqueous dispersion of the present invention is applicable, may be any of molded products produced by molding the above various polymers by a well known molding method such as injection molding, press molding, blow molding, extrusion molding, rotation molding or the like.

Spray coating is suitable as a method for applying the polypropylenic aqueous dispersion of the present invention on the surface of a molded product, and for instance, the surface of the molded product may be sprayed by a spray gun. Coating on a molded product can be carried out at normal temperature, and after coating, a coated film can be formed by drying appropriately in accordance with a method of natural drying or heat-drying.

As mentioned above, after coating the aqueous dispersion of the present invention on the surface of a molded product and drying, the surface of the molded product may be coated with a paint in accordance with a method of electrostatic coating, spray coating or brush-coating. The coating of paint may be carried out by undercoating and then final coating. After coating a paint, a paint-coated film is cured in accordance with a usual method of heating by electric heating wire, infrared ray or high frequency, to produce a molded product having a desired paint-coated film on the surface. A method for curing a paint-coated film is optionally selected depending on a material or a shape of a molded product or a quality of a paint used.

Further, since the polypropylenic aqueous dispersion of the present invention is excellent in adhesion, peeling strength and water resistance, it can be widely used in addition to use as the above primer, and for example, it can be used also for various molded products comprising polyolefin as a base material, and an ink, a paint or an adhesive resin for a film or sheet.

Hereinafter, the present invention is further illustrated with reference to Examples in more details, but should not be limited to the following Examples as far as they do not exceed the features of the present invention.

Now, the present invention will be described in further detail with reference to typical Examples. However, it should be understood that the present invention is by no means restricted to such specific Examples.

EXAMPLES

Example 1

1. Preparation of Polypropylene

Preparation Example 1

(1) Preparation of dichloro[dimethylsilylene(cyclopentadienyl)(2,4-dimethyl-4H-1-azulenyl)]hafnium (1)-1 Preparation of Ligand After dissolving 2-methylazulene (4.01 g) in tetrahydrofuran (56 ml) and cooling in an ice bath at 0° C., 24.8 ml of a diethyl ether solution of methyl lithium (1.14 mol/l) was dropwise added thereto at the same temperature. After finishing the dropwise addition, the ice bath was taken out, and the resultant mixture was stirred for 2 hours. This solution was slowly dropwise added to a tetrahydrofuran solution (140 ml) of dimethylsilyl dichloride (34.0 ml, 0.280 mol) cooled to 0° C. by an ice bath. After finishing the dropwise addition, the ice bath was taken out, and the resultant mixture was stirred for 3 hours, and the solvent and unreacted dimethylsilyl dichloride were distilled off under a reduced pressure. Thereafter, tetrahydrofuran (80 ml) was added thereto, and the mixture was cooled to 0° C., and cyclopentadienyl sodium (2.1 mol/l, 26.9 ml, 56.5 mmol) was gradually dropwise added thereto, and after finishing the dropwise addition, the mixture was stirred at room temperature for 12 hours. After finishing the stirring, water is added and an aimed compound was extracted with diethyl ether. The extracted solution was dehydrated with magnesium sulfate and was dried to solid to obtain an aimed ligand as an unpurified product. By a silica gel column chromatography using n-hexane as an eluting solvent, the unpurified product was purified to obtain an aimed ligand (6.29 g) at a yield of 79%.

(1)-2 Preparation of Complex

The ligand (6.29 g) obtained in the above step (1)-1 was dissolved in tetrahydrofuran (100 ml), and was cooled to 0° C. in an ice bath. An n-hexane solution of n-butyl lithium (1.56 mol/l, 28.4 ml) was slowly dropwise added thereto at the same temperature. After finishing the dropwise addition, the ice bath was taken out, and the mixture was stirred for 3 hours, and the solvent was distilled off under a reduced pressure. To a residue obtained after distilling off the solvent, was added toluene (60 ml), and the mixture was cooled to −78° C. A toluene (140 ml) suspension of hafnium tetrachloride (7.17 g) cooled to −78° C. was then slowly added thereto. Thereafter, the cooling bath was taken out, and the mixture was stirred overnight. After finishing the stirring, the reaction liquid was filtrated by G3 frit. A solid on the frit was further washed with toluene, and the filtrate was concentrated to obtain a brown powder. An aimed complex was extracted from this brown powder with hot n-hexane (180 ml×3 times). After drying the extracted solution to solid, the solid thus obtained was suspension-washed with n-hexane (20 ml×5 times), and was dried under a reduced pressure to obtain aimed dichloro[dimethylsilylene(cyclopentadienyl)(2,4-dimethyl-4H-1-azulenyl)]hafnium (2.90 g) (yield 25%).

The complex thus obtained had the following $^1$H-NMR data.

$^1$H-NMR (CDCl$_3$): δ0.85 (s, 3H), 0.86 (s, 3H), 1.47 (d, J=7.1 Hz, 3H), 2.25 (s, 3H), 3.42-3.52 (m, 1H), 5.42 (dd, J=4.7, 10.1 Hz, 1H), 5.80-5.85 (m, 2H), 5.90-5.95 (m, 1H), 6.16-6.20 (m, 2H), 6.65 (d, J=11.4H), 6.80-6.85 (m, 1H), 6.98-7.02 (m, 1H).

(2) Chemical Treatment of Clay Mineral

Desalted water (110 ml), magnesium sulfate-7 hydrate (22.2 g) and sulfuric acid (18.2 g) were placed in a 1,000 ml round flask, and the content was dissolved under stirring. Commercially available granulated montmorillonite (Benclay SL manufactured by Mizusawa Industrial Chemicals, Ltd., 16.7 g) was dispersed in this solution, and the mixture was heated to 100° C. over 2 hours and was stirred at 100° C. for 2 hours. Thereafter, the mixture was cooled to room temperature over 1 hour, and a slurry obtained was filtrated to recover a wet cake. The cake thus recovered was slurried again with desalted water (500 ml) in a 1,000 ml round flask, and was filtrated. This operation was repeated twice. The cake finally obtained was dried overnight in a nitrogen atmosphere at 110° C. to obtain chemically treated montmorillonite (13.3 g).

(3) Polymerization

To the chemically treated montmorillonite (0.44 g) obtained in the above Preparation Example 1 (2), was added a toluene solution of triethyl aluminum (0.4 mmol/ml, 2.0 ml), and the mixture was stirred at room temperature for 1 hour. Toluene (8 ml) was added to this suspension, and after stirring, a supernatant liquid was removed. This operation was repeated twice, and toluene was added thereto to obtain a clay slurry (slurry concentration=99 mg clay/ml).

Triisobutyl aluminum (0.114 mmol, manufactured by Tosoh•Akzo Company) was placed in another flask, and the above obtained clay slurry (3.8 ml) and a toluene-diluted liquid of the complex obtained in the above Preparation Example 1 (1)-2 (6.02 mg, 11.4 μmol) were added thereto, and the mixture was stirred at room temperature for 10 minutes to obtain a catalyst slurry.

Thereafter, toluene (11.24 liter), triisobutyl aluminum (28.5 mmol) and liquid propylene (2.7 liter) were introduced in an induction stirring type autoclave having an inner volume of 2 liter. All the amount of the above catalyst slurry was added thereto at room temperature, and the resultant mixture was heated to 60° C. and was continuously stirred at the same temperature for 1 hour while maintaining the total pressure of polymerization constantly at 0.7 MPa. After finishing the stirring, unreacted propylene was purged to stop the polymerization. The autoclave was opened and the total amount of the toluene solution of polymer was recovered, and the solvent and the clay residue were removed to obtained 348.0 g of propylene polymer.

The polymer thus obtained was analyzed, and the following results were obtained. Mw by GPC: 160,000. When observing a peak derived from a carbon atom of a methyl group in a propylene unit chain part comprising a head-to-tail bond by $^{13}$C-NMR and fixing a chemical shift of a peak top at a peak attributable to pentad expressed by mmmm to 21.8 ppm, a ratio ($S_1/S$) of an area $S_1$ of a peak of a peak top at 21.8 ppm to a total area S of peaks at from 19.8 ppm to 22.1 ppm was 42.1%, and a ratio ($S_2/S$) of an area $S_2$ (mmmm) of a peak top at 21.5 to 21.6 ppm to S was 16.0%. Thus, 4+2 ($S_1/S_2$)=9.26. When measuring DSC, a clear melting point peak was not observed.

2. Preparation of Aqueous Dispersion 300 g of polypropylene prepared in the above Preparation Example 1 and 900 g of toluene were charged in a glass flask equipped with a thermometer, a cooling tube, a stirrer and a dropping funnel, and it was dissolved in a nitrogen atmosphere by raising a temperature to 85° C. Thereafter, a solution having 15 g of maleic anhydride and 5 g of benzoyl peroxide dissolved in 300 g of toluene was dropwise added thereto at the same temperature for 1 hour, and aging reaction was carried out for 5 hours. After finishing the reaction, a reaction liquid was cooled to room temperature and was charged into 4.5 kg of acetone to precipitate a maleic anhydride-modified polypropylene which was then separated by filtration. The modified resin thus obtained was charged again into 4.5 kg of acetone to be purified, and the purified product was separated by filtration and was dried under vacuum. A white powder-like modified resin thus obtained was subjected to infrared ray absorption spectrum measurement, and as this result, a maleic anhydride group content was 0.5 wt %.

100 g of the above obtained maleic anhydride-modified polypropylene and 400 g of toluene were placed in a glass flask equipped with a thermometer, a cooling tube and a stirrer, and the mixture was dissolved by heating to 100° C. and was then cooled to 70° C. To this solution, were added 30 g of polyoxyethylene cetyl ether (mol number of ethylene oxide added: 13 mols) [Emulgen 220 manufactured by Kao Corporation; HLB=14.2] as a nonionic surfactant (b1) and 30 g of polyoxyethylene lauryl ether (mol number of ethylene oxide added: 19 mols) [Emulgen 147 manufactured by Kao Corporation; HLB=16.3] as a nonionic surfactant (b2), and the mixture was dissolved and was then cooled to room temperature. The content was placed in a beaker, and was fully stirred by adding 700 g of water little by little thereto, and the resultant mixture was emulsified at 21,000 rpm for 1.5 minutes by using an internal shearing type emulsifier [Clear Mix CLM-0.8S manufactured by M Technique Company]. Thereafter, 2.1 g of an aqueous solution having 2-amino-2-methyl-1-propanol diluted to 10 wt % with water was added to the system as a basic material to have the content adjusted to PH 8. From the crude emulsified material, toluene was distilled off by an evaporator to obtain a maleic anhydride-modified polypropylene type aqueous dispersion. Particle sizes of dispersed particles of the aqueous dispersion thus obtained were measured by a laser diffraction type particle size distribution meter (Microtruck UPA: manufactured by Nikkiso Co., Ltd.), and the average particle size thus measured was 0.25 μm.

3. Dispersion Stability Test of Aqueous Dispersion

The aqueous dispersion (80 ml) obtained in the above paragraph 2 having a solid content adjusted to 20 wt % was placed in a sealed container having a capacity of 100 ml, and was stored in a thermostat at 5° C. and 40° C. for 3 months, and its particle size was measured and its dispersion state was visually evaluated. As this result, an average particle size was 0.25 μm and the dispersion state was satisfactory.

4. Adhesiveness Test of Aqueous Dispersion

Preparation of Test Piece 0.1 part by weight of tetrakis[methylene-3-(3',5'-di-t-butyl-4'-hydroxyphenyl)propionate]methane (IRGANOX 1010 manufactured by Ciba Geigy Company) as an antioxidant was blended with a mixture of 60 parts by weight of a polypropylene type copolymer (manufactured by Japan Polychem Corporation), 30 parts by weight of an ethylene.propylene random copolymer rubber (JSR K.K.) and 10 parts by weight of talc (manufactured by Fuji Talc Industrial Co., Ltd.), and the mixture was mixed by a Henschel mixer for 5 minutes. Thereafter, the mixture was kneaded and granulated at 210° C. by a biaxial kneader (KCM50) manufactured by Kobe Steel, Ltd. to obtain a thermoplastic resin composition. Further, this composition was injection-molded at a molding temperature of 220° C. by an injection-molding machine (Toshiba IS 170) manufactured by Toshiba Kikai K.K. to obtain a test piece of 150 mm×70 mm×2 mm.

Adhesiveness Test

The surface of the above prepared test piece was washed with isopropanol, and was spray-coated with an aqueous dispersion having a solid content concentration of 20 wt % to provide a coated amount of 3 to 5 g/m². The test piece thus coated (coated plate) was allowed to stand at 25° C. for 1 hour, and was dried in a safeben drier at 100° C. for 30 minutes. The dried test piece was further allowed to stand at 25° C. for 1 hour, and the coated surface of the test piece was spray-coated with an acryl polyol urethane paint [Rethane PG80III manufactured by Kansai Paint Co., Ltd.] having a predetermined amount of a curing agent and having a viscosity adjusted with a thinner to provide a coated amount of 50 to 60 g/m², and the test piece thus coated was baked in a safeben drier at 100° C. for 30 minutes. Thereafter, the test piece was allowed to stand at 25° C. for 10 days.

The coated plate thus obtained was cross-cut and attached with a cellotape [tradename: manufactured by Nichiban Co., Ltd.] in accordance with a cross cut test method of JIS K5400, and the cellotape was rapidly pulled in the direction of 90° and was peeled off. As this result, a number of cross cuts which were not peeled off were 100 among 100 cross cuts.

5. Water Resistance Test

A coated plate prepared in the same manner as in the above adhesiveness test was dipped in hot water at 40° C. for 10 days, and an outer appearance of the coated surface was visually observed, but there was observed no abnormal part. Also, in the same manner as in the above adhesiveness test, a cross cut peeling test was carried out, but a number of cross cuts which were not peeled off was 100 among 100 cross cuts.

6. Gasohol Resistance Test

A coated plate prepared in the same manner as in the above adhesiveness test was dipped in a mixture solution of regular gasoline and ethanol (weight ratio: regular gasoline/ethanol=9/1) maintained at 20° C., and a time required until the coated film was peeled was 110 minutes.

Example 2

300 g of polypropylene prepared in the above Preparation Example 1, 100 g of maleic anhydride and 900 g of chlorobenzene were placed in a glass flask equipped with a thermometer, a cooling tube, a stirrer and a dropping funnel, and it was dissolved in a nitrogen atmosphere by raising a temperature in the system to 130° C. Thereafter, a solution having 25 g of dicumyl peroxide dissolved in 300 g of chlorobenzene was dropwise added thereto at the same temperature for 5 hours, and aging reaction was carried out for 3 hours. After finishing the reaction, the reaction liquid was cooled to room temperature and was charged into 4.5 kg of acetone to precipitate a maleic anhydride-modified polypropylene which was then separated by filtration. The modified resin was introduced again into 4.5 kg of acetone to be purified, and was separated by filtration and was dried under vacuum. A white powder-like modified resin thus obtained was subjected to infrared ray absorption spectrum measurement, and as this result, a maleic anhydride group content was 4.1 wt %.

An aqueous dispersion was prepared by using the above obtained maleic anhydride-modified polypropylene in the same manner as in Example 1, and its dispersion particles had an average particle size of 0.10 μm.

Further, the above obtained aqueous dispersion was subjected to a dispersion stability test, an adhesiveness test, a water resistance test and a gasohol resistance test in the same manner as in Example 1. The results are shown in the following Table 1.

Example 3

1. Preparation of Polypropylene

Preparation Example 2

(1) Chemical Treatment of Clay Mineral

Desalted water (72 ml), lithium sulfate.1 hydrate (11.1 g) and sulfuric acid (17.1 g) were placed in a 1,000 ml round flask, and the content was dissolved under stirring. Commercially available granulated montmorillonite (Benclay SL manufactured by Mizusawa Industrial Chemicals, Ltd., 16.7 g) was dispersed in this solution, and the mixture was heated to 100° C. over 2 hours and was stirred at 100° C. for 5 hours. Thereafter, the mixture was cooled to room temperature over 1 hour, and a slurry obtained was filtrated to recover a wet cake. The cake thus recovered was slurried again with desalted water (500 ml) in a 1,000 ml round flask, and was filtrated. This operation was repeated twice. The cake finally obtained was dried under a reduced pressure at 200° C. for 1 hour to obtain chemically treated montmorillonite (15.0 g).

(2) Polymerization

To the chemically treated montmorillonite (1.0 g) obtained in the above Preparation Example 2 (1), was added a toluene solution of triisobutyl aluminum (4.0 mmol/ml, 4.0 ml), and the mixture was stirred at room temperature for 0.5 hour. Toluene (25 ml) was added to this suspension, and after stirring, a supernatant liquid was removed. This operation was repeated twice, and is toluene was added thereto to obtain a clay slurry (slurry concentration=99 mg clay/ml).

Triisobutyl aluminum (0.0060 mmol) was placed in another flask, and the above obtained clay slurry (3.8 ml) and a toluene-diluted liquid of the complex obtained in the above Preparation Example 1 (1)-2 (15.6 mg, 0.0030 mmol) were added thereto, and the mixture was stirred at room temperature for 0.5 hour to obtain a catalyst slurry.

Thereafter, toluene (13.0 liter), triisobutyl aluminum (1.5 mmol) and liquid propylene (3.2 liter) were introduced in an induction stirring type autoclave having an inner volume of 2 liter. All the amount of the above catalyst slurry was added thereto at room temperature, and the resultant mixture was heated to 50° C. The mixture was then continuously stirred at the same temperature for 2 hours while maintaining the total pressure of polymerization constantly at 0.65 MPa by optionally introducing liquid propylene. After finishing the stirring, unreacted propylene was purged to stop the polymerization. The autoclave was opened and the total amount of the toluene solution of polymer was recovered, and the solvent and the clay residue were removed to obtained 1354 g of propylene polymer.

The polymer thus obtained was analyzed, and the following results were obtained. Mw by GPC: 240,000 and Mn: 93,000. When observing a peak derived from a carbon atom of a methyl group in a propylene unit chain part comprising a head-to-tail bond by $^{13}$C-NMR in the same manner as in the above Example 1, a ratio $(S_1/S)$ was 52.2%, and a ratio $(S_2/S)$ was 14.2%. Thus, 4+2 $(S_1/S_2)$=11.35. When measuring DSC, a clear melting point peak was not observed.

2. Preparation of Aqueous Dispersion and its Test

An aqueous dispersion was prepared in the same manner as in Example 1, except that the polypropylene prepared in the above Preparation Example 2 was used.

The maleic anhydride-modified propylene polymer thus obtained had a maleic anhydride group content of 0.4 wt %, and the aqueous dispersion prepared by using the same contained dispersion particles having an average particle size of 0.30 µm.

Example 4

1. Preparation of Propylene-ethylene Copolymer

Preparation Example 3

(1) Polymerization

To the chemically treated montmorillonite (1.0 g) obtained in the above Preparation Example 2 (1), was added a toluene solution of triisobutyl aluminum manufactured by Nihon Alkyl Aluminum K.K. (2.0 mmol/ml, 4.0 ml), and the mixture was stirred at room temperature for 0.5 hour. Toluene (25 ml) was added to this suspension, and after stirring, a supernatant liquid was removed. This operation was repeated twice, and toluene was added thereto to obtain a clay slurry (slurry concentration=99 mg clay/ml).

Triisobutyl aluminum (1.5 mmol) was placed in another flask, and the above obtained clay slurry (3.8 ml) and a toluene-diluted liquid of the complex obtained in the above Preparation Example 1 (1)-2 (15.6 mg, 0.0030 mmol) were added thereto, and the mixture was stirred at room temperature for 0.5 hour to obtain a catalyst slurry.

Thereafter, toluene (13 liter), triisobutyl aluminum (1.5 mmol), ethylene gas (0.05 MPa) and liquid propylene (3.2 liter) were introduced in an induction stirring type autoclave having an inner volume of 24 liter. All the amount of the catalyst slurry was added thereto at room temperature, and the resultant mixture was heated to 60° C. The mixture was then continuously stirred at the same temperature for 2 hours while maintaining the total pressure of polymerization constantly at 0.75 MPa by introducing an ethylene gas at a rate of 6.5 mmol/min from a reserver tank to the reactor and optionally introducing liquid propane. After finishing the stirring, unreacted monomer was purged to stop the polymerization. The autoclave was opened and the total amount of the toluene solution of polymer was recovered, and the solvent and the clay residue were removed to obtained 1360 g of ethylene/propylene copolymer.

The polymer thus obtained was analyzed, and the following results were obtained. Mw by GPC: 200,000 and Mn: 75,000. When observing a peak derived from a carbon atom of a methyl group in a propylene unit chain part comprising a head-to-tail bond by $^{13}$C-NMR in the same manner as in the above Example 1, a ratio $(S_1/S)$ was 47.6%, and a ratio $(S_2/S)$ was 16.5%. Thus, 4+2 $(S_1/S_2)$=9.77. Ethylene content: 1.49 (mol %). When measuring DSC, a clear melting point peak was not observed.

2. Preparation of Aqueous Dispersion and its Test

An aqueous dispersion was prepared in the same manner as in Example 1, except that the polypropylene-ethylene copolymer prepared in the above Preparation Example 3 was used.

The maleic anhydride-modified propylene polymer had a maleic anhydride group content of 0.5 wt %, and the aqueous dispersion prepared by using the same contained dispersion particles having an average particle size of 0.30 µm.

Example 5

An aqueous dispersion was prepared in the same manner as in Example 1, except that polyoxyethylene stearyl ether was used as a nonionic surfactant (b1) and polyoxyethylene oleyl ether was used as a nonionic surfactant (b2). The aqueous dispersion thus obtained contained dispersion particles having an average particle size of 0.25 µm.

The aqueous dispersion thus obtained was subjected to the same dispersion stability test, adhesiveness test, water resistance test and gasohol resistance test as in Example 1. The results are shown in the following Table 1.

Example 6

An aqueous dispersion was prepared in the same manner as in Example 1, except that polyoxyethylene cetyl ether was used in an amount of 18 g as a nonionic surfactant (b1) and polyoxyethylene lauryl ether was used in an amount of 42 g as a nonionic surfactant (b2). The aqueous dispersion thus obtained contained dispersion particles having an average particle size of 0.15 µm.

The aqueous dispersion thus obtained was subjected to the same dispersion stability test, adhesiveness test, water resistance test and gasohol resistance test as in Example 1. The results are shown in the following Table 1.

Example 7

An aqueous dispersion was prepared in the same manner as in Example 1, except that polyoxyethylene cetyl ether was used in an amount of 42 g as a nonionic surfactant (b1) and polyoxyethylene lauryl ether was used in an amount of 18 g as a nonionic surfactant (b2). The aqueous dispersion thus obtained contained dispersion particles having an average particle size of 0.35 µm.

The aqueous dispersion thus obtained was subjected to the same dispersion stability test, adhesiveness test, water resistance test and gasohol resistance test as in Example 1. The results are shown in the following Table 1.

Example 8

An aqueous dispersion was prepared in the same manner as in Example 1, except that polyoxyethylene cetyl ether in an amount of 10 g was used as a nonionic surfactant (b1) and polyoxyethylene lauryl ether was used in an amount of 10 g as a nonionic surfactant (b2). The aqueous dispersion thus obtained contained dispersion particles having an average particle size of 0.35 μm.

The aqueous dispersion thus obtained was subjected to the same dispersion stability test, adhesiveness test, water resistance test and gasohol resistance test as in Example 1. The results are shown in the following Table 1.

Example 9

An aqueous dispersion was prepared in the same manner as in Example 1, except that polyoxyethylene cetyl ether was used in an amount of 45 g as a nonionic surfactant (b1) and polyoxyethylene lauryl ether was used in an amount of 45 g as a nonionic surfactant (b2). The aqueous dispersion thus obtained contained dispersion particles having an average particle size of 0.10 μm.

The aqueous dispersion thus obtained was subjected to the same dispersion stability test, adhesiveness test, water resistance test and gasohol resistance test as in Example 1. The results are shown in the following Table 1.

Example 10

An aqueous dispersion was prepared in the same manner as in Example 1, except that 2-hydroxyethyl methacrylate was used in place of maleic anhydride, and the 2-hydroxyethyl methacrylate-modified polypropylene thus obtained had a 2-hydroxyethyl methacrylate content of 0.6 wt %. Further, the aqueous dispersion prepared in the same manner as in Example 1 contained dispersion particles having an average particle size of 0.30 μm.

The aqueous dispersion thus obtained was subjected to the same dispersion stability test, adhesiveness test, water resistance test and gasohol resistance test as in Example 1. The results are shown in the following Table 1.

Comparative Example 1

An aqueous dispersion was prepared in the same manner as in Example 1, except that polyoxyethylene cetyl ether as a nonionic surfactant (b1) was charged in an amount of 60 g and a nonionic surfactant (b2) was not used. The aqueous dispersion thus obtained contained dispersion particles having an average particle size of 1.1 μm, and a phase separation was caused after one week.

Example 11

An aqueous dispersion was prepared in the same manner as in Example 1, except that a nonionic surfactant (b1) was not used and polyoxyethylene lauryl ether as a nonionic surfactant (b2) was used in an amount of 60 g. The aqueous dispersion thus obtained contained dispersion particles having an average particle size of 0.10 μm.

The aqueous dispersion was then subjected to the same dispersion stability test, adhesiveness test and water resistance test as in Example 1. The results are shown in the following Table 1.

Comparative Example 2

1. Preparation of Polypropylene

Preparation Example 4

Highly stereospecific isotactic polypropylene (31.1 g), heptane (180 ml) and Pd/C (Aldrich Company: 10 wt % Pd/C) (7.87 g) were placed in an induction stirring type microautoclave having an internal volume of 50 ml, and the system was sealed and substituted with nitrogen. Thereafter, hydrogen was introduced in an amount corresponding to 8.0 MPa, and the system was heated to 275° C., and the contents were continuously stirred for 6 hours. After cooling, hydrogen was purged to stop the reaction. The autoclave was opened to recover all the amount of a heptane solution of polymer, and the solvent and the Pd/C residue were removed to obtain 30.6 g of a polypropylene polymer.

Physical properties of the highly stereospecific isotactic polypropylene used are as follows:

MFR: 15,000 (unit g/10 min, measuring condition 230° C., 21.18 N load);

Tm (melting point): 154.9° C.;

MW: 37,000; Mn: 18,000; MW/Mn: 2.1;

[mmmm]: 98.4%; [mmmr]: 0.0%; [rmrm]: 0.1%; [rrrr]: 0.2%.

Thus, the measurement was carried out in the same manner as in Example 1, and the results are $S_1/S=98.4\%$, $S_2/S=0.0\%$ and $4+2(S_1/S_2)$ became infinite on calculation.

2. Preparation of Aqueous Dispersion

An aqueous dispersion was prepared in the same manner as in Example 1, except that the polypropylene prepared in the above Preparation Example 4 was used.

The maleic anhydride-modified propylene polymer thus obtained had a maleic anhydride group content of 0.6 wt %, and the aqueous dispersion prepared by using the same contained dispersion particles having an average particle size of 1.2 μm. A phase separation was caused after one week.

Comparative Example 3

The same procedure as in Example 1 was repeated, except that non-crystalline polyolefin (Ubetac UT-2115 (softening point 152° C.) manufactured by Ube Rexen K.K.) was used as a polypropylene to be used, and the polypropylene thus obtained had a maleic anhydride group content of 0.6 wt %. Again, the procedure as in Example 1 was repeated to give an aqueous dispersion having an average particle size of 0.38 μm.

The aqueous dispersion thus obtained was subjected to the same dispersion stability test, adhesiveness test, water resistance test and gasohol resistance test as in Example 1. The results are shown in the following Table 1.

Comparative Example 4

The same procedure as in Example 1 was repeated, except that 90 g of polyoxyethylene cetyl ether [Emulgen 220 manufactured by Kao Corporation; HLB=14.2] as a nonionic surfactant (b1) was used as an emulsifier, and the aqueous dispersion thus obtained had an average particle size of 1.8 μm.

The aqueous dispersion was thus subjected to the same dispersion stability test, adhesiveness test, water resistance test and gasohol resistance test as in Example 1. The results are shown in the following Table 1.

Comparative Example 5

The same procedure as in Example 1 was repeated, except that maleic anhydride-modified atactic polypropylene (softening point: 82° C., weight average molecular weight: 50,000, $4+2S_1/S_2<5$) was used in place of the maleic anhydride-modified polypropylene, and the polymer thus obtained had a maleic anhydride group content of 2.5 wt %. Also, the aqueous dispersion thus obtained had an average particle size of 0.63 μm.

The aqueous dispersion was then subjected to the same dispersion stability test, adhesiveness test, water resistance test and gasohol resistance test as in Example 1. The results are shown in the following Table 1.

Example 12

100 g of a maleic anhydride-modified polypropylene obtained in the same manner as in the above Example 1 and 400 g of toluene were placed in a glass flask equipped with a cooling tube and a stirrer, and the contents were heated to 100° C. to be dissolved, and 9.6 g of morpholine was added thereto. Thereafter, 30 g of alkylpropenylphenol ethylene oxide 20 mol-added product (Aqualon RN-20 manufactured by Daiichi Kogyo Seiyaku Co., Ltd.) as a reactive nonionic surfactant was added thereto, and the resultant mixture was cooled to 100° C. and water of 90° C. was gradually added thereto to prepare an aqueous reaction solution. 10 g of potassium persulfate as a radical reaction initiator was added thereto, and the reaction mixture was stirred at 80° C. for 4 hours to carry out polymerization reaction.

After the reaction, 4 g of 2-methyl-2-amino-1-propanol was added thereto to obtain an aqueous reaction solution (solid content 25%). The aqueous reaction solution thus obtained was treated by an ultrafiltration membrane having a fraction molecular weight of 5000 for 72 hours to concentrate and to obtain an aqueous dispersion having a solid content of 30%. The aqueous dispersion thus obtained had an average particle size of 0.019 μm.

The aqueous dispersion was then subjected to the same dispersion stability test, adhesiveness test, water resistance test and gasohol resistance test as in Example 1. The results are shown in the following Table 1.

Example 13

An aqueous dispersion was prepared in the same manner as in Example 1, except that the nonionic surfactant (b2) was replaced by sodium dodecylbenzenesulfonate of an anionic surfactant. The aqueous dispersion thus obtained contained dispersion particles having an average particle size of 0.13 μm.

The aqueous dispersion was then subjected to the same dispersion stability test, adhesiveness test, water resistance test and gasohol resistance test as in Example 1. The results are shown in the following Table 1.

Example 14

An aqueous dispersion was prepared in the same manner as in Example 1, except that sodium dodecylbenzenesulfonate of an anionic surfactant was used in place of the polyoxyethylene cetyl ether as a nonionic surfactant (b1) and sodium dialkylsulfosuccinate of an anionic surfactant was used in place of the polyoxyethylene lauryl ether as a nonionic surfactant (b2). The aqueous dispersion thus obtained contained dispersion particles having an average particle size of 0.11 μm.

The aqueous dispersion was then subjected to the same dispersion stability test, adhesiveness test, water resistance test and gasohol resistance test as in Example 1. The results are shown in the following Table 1.

TABLE 1

| | Dispersion stability test | | Adhesiveness test Number of peeled cross-cuts/100 | Water resistance test | | Gasohol resistance (min) |
| --- | --- | --- | --- | --- | --- | --- |
| | Dispersion state | Average particle size (μm) | | | Outer appearance of coated film | |
| Ex. 2 | Good | 0.10 | 100/100 | 100/100 | Normal | 120 |
| Ex. 3 | Good | 0.30 | 100/100 | 100/100 | Normal | 120 |
| Ex. 4 | Good | 0.30 | 95/100 | 95/100 | Normal | 100 |
| Ex. 5 | Good | 0.25 | 100/100 | 100/100 | Normal | 110 |
| Ex. 6 | Good | 0.15 | 100/100 | 90/100 | Substantially normal | 100 |
| Ex. 7 | Good | 0.35 | 100/100 | 100/100 | Normal | 90 |
| Ex. 8 | Good | 0.35 | 100/100 | 100/100 | Normal | 110 |
| Ex. 9 | Good | 0.10 | 90/100 | 80/100 | Substantially normal | 80 |
| Ex. 10 | Good | 0.30 | 80/100 | 80/100 | Normal | 70 |
| Ex. 11 | Good | 0.10 | 65/100 | 5/100 | Occurrence of blister | 100 |
| Ex. 12 | Good | 0.019 | 100/100 | 100/100 | Normal | 120 |
| Ex. 13 | Good | 0.13 | 100/100 | 95/100 | Substantially normal | 75 |
| Ex. 14 | Good | 0.11 | 100/100 | 91/100 | Substantially normal | 61 |
| Comp. Ex. 3 | Good | 0.38 | 80/100 | 30/100 | Occurrence of blister | 30 |
| Comp. Ex. 4 | No good | 1.8 | 29/100 | 0/100 | Occurrence of blister | 25 |
| Comp. Ex. 5 | Somewhat no good | 0.63 | 90/100 | 25/100 | Occurrence of blister | 7 |

As mentioned above, the present invention provides a polypropylene type aqueous dispersion having a good dispersion stability due to small dispersion particles, which is capable of forming a satisfactory coated film, a good smoothness, a good adhesiveness to a polyolefin substrate, and a good water resistance.

Examples 1a to 30a, 1b to 30b and Comparative Examples 1a to 3a and 1b to 5b

In the following Examples and Comparative Examples, measurement of physical properties and performances of a polymer was carried out in the following manner. In each Example, a catalyst preparation step and a polymerization step were carried out in a purified nitrogen atmosphere, and a solvent was used after dehydrating with a molecular sieve (MS-4A) and after deaerating by bubbling with purified nitrogen.

(1) Molecular Weight

A chromatography analysis apparatus ("GPC150CV type" manufactured by Waters Company) was used. Ortho-dichlorobenzene was used as a solvent, and a measuring temperature was 135° C. Molecular weight calculation was carried out by using commercially available monodisperse polystyrene as a standard sample, preparing a calibration curve concerning a retention time and a molecular weight from a viscosity formula of polypropylene and the polystyrene standard sample and calculating a molecular weight therefrom.

(2) Pentad of Propylene Unit Chain Part 350 to 500 mg of a sample was completely dissolved by about 2.2 ml of ortho-dichlorobenzene in a sample tube of 10 mm φ for NMR. Thereafter, about 0.2 ml of deuterated benzene was added thereto as a lock solvent, and the mixture was homogenized, and measurement was carried out at 130° C. in accordance with proton complete decoupling method. Measurement conditions were a flip angle of 90° and a pulse distance of at least 5 T1 (T1 is the longest value among spin-lattice relaxation time of a methyl group). In a propylene polymer, spin-lattice relaxation times of a methylene group and a methine group are shorter than that of a methyl group, and consequently recovery of magnetization of all carbons is at least 99% under these measuring conditions. In order to raise an accuracy of quantitative determination, it is preferable to use an NMR apparatus having a resonance frequency of $^{13}$C nucleus of at least 125 MHz and to integrate for at least 20 hours.

(3) Crystallinity

Crystallinity was measured by wide angle X-ray crystal diffraction, and was determined by multi-peak separation method (symmetric transmission method (2θ/θ=5 to 60° C., 0.1°/step)).

(4) Bending Modulus of Elasticity

A test piece of 90 mm×10 mm×3 mm was molded by injection molding of using an injection molding machine under a clamp pressure of 100 tons at a mold temperature of 40° C. and a cylinder temperature of 220° C., and the injection molded piece thus obtained was subjected to JIS-K7203 test at a test speed of 2 mm/min at 23° C. to measure a bending modulus of elasticity (unit: MPa).

(5) Izod (IZOD) Impact Strength

The same test piece as above was subjected to JIS-K7110 test at 23° C. to measure an izod impact strength (Unit: kJ/m$^2$).

(6) Dispersion Stability Test

The dispersion stability test was carried out in the same manner as in Example 1.

(7) Particle Size of Dispersion Particles

The particle size of dispersion particles was measured in the same manner as in Example 1.

(8) Test for Adhesiveness Between Layers

In the same manner as in Example 1, a cross cut test method as defined in JIS-K5400 was carried out by preparing a test piece having cross-cuts, attaching an adhesive tape ("cellotape" registered tradename manufactured by Nichiban Co., Ltd.) onto the cross cuts of the test piece, rapidly peeling off the adhesive tape in the vertical direction and counting the number of cross cuts remained without peeling off among 100 cross-cuts (number of remaining cross cuts/100).

(9) Water Resistance Test

A test piece was prepared by coating a paint component (A) or other polymer as a primer on a substrate to form a coated film, coating a base coat on the above coated film, baking the coated material, aging at room temperature and dipping the aged coated material in hot water maintained at 40° C. for 10 days. Thereafter, the test piece thus obtained was dried to remove a water content on the surface, and was subjected to the same test for adhesiveness between layers as mentioned above in accordance with the cross cut test (JIS-K5400).

(10) Gasohol Resistance Test

A test piece was prepared by coating a paint component (A) or other polymer as a primer on a substrate material to form a coated film, coating a base coat on the above coated film, baking the coated film and aging at room temperature, and the test piece thus prepared was subjected to the same gasohol resistance test as in Example 1 by dipping the test piece in a mixture solution of regular gasoline: ethanol=9:1 maintained at 20° C. and measuring a time (minute) required until the coated film is clearly peeled off.

(11) External Evaluation of Coated Surface

After dipping treatment of the above water resistance test, external appearance of a coated surface of a coated material was visually observed in accordance with JIS-K5600-4-7.1.1 and was evaluated on the basis of the following evaluation standards.

⊚: Outer appearance is very good.

○: Outer appearance is good.

X: Outer appearance is no good.

(12) Electroconductivity (Volume Resistivity)

A flat plate sheet (340 mm×100 mm) having a thickness of 3 mm was molded by injection molding, and was cut so as to have a width of 20 mm in the longitudinal direction. A silver paste previously dissolved in butyl acetate was coated by a brush on the central part of the cut sheet so as to make an electrode distance 90 mm. The strip-shaped test piece thus coated with the silver paste was measured in respect of a volume resistivity (unit: Ωcm) by a resistance meter (4329A High resistance meter manufactured by Yokokawa Hewlett Packard Company) under an applied voltage of 10 V.

(13) Glossiness

A flat plate sheet test sample (80 mm×120 mm) having a thickness of 2 mm was molded by an injection molding mirror mold, and a glossiness (unit: %) of the test sample thus molded was measured by a gloss meter (manufactured by Suga Test Instruments Co., Ltd.) at an incident angle of 60° in accordance with JIS-K7150.

Dispersion Preparation Example 1

Preparation of polypropylene, modification of polypropylene and preparation of aqueous dispersion were carried out in the same manner as in Preparation Example 1 of the above Example 1.

Preparation method and physical properties of the aqueous dispersion thus obtained are summarized in the following Table 2a, together with those of the following other aqueous dispersions.

Dispersion Preparation Example 2

An aqueous dispersion was prepared in the same manner as in the above Dispersion Preparation Example 1, except that a maleic anhydride-modified polypropylene prepared in the same manner as in the above Example 2 was used.

Dispersion Preparation Example 3

An aqueous dispersion was prepared in the same manner as in the above Dispersion Preparation Example 1, except that a modified polypropylene prepared in the same manner as in the above Example 3 was used.

Dispersion Preparation Example 4

An aqueous dispersion was prepared in the same manner as in the above Dispersion Preparation Example 1, except that a modified propylene.ethylene copolymer prepared in the same manner as in the above Example 4 was used.

Dispersion Preparation Example 5

An aqueous dispersion was prepared in the same manner as in the above Dispersion Preparation Example 1, except that polyoxyethylene oleyl ether (ethylene oxide added mol number: 13 mols) [Emulgen 420, HLB=13.6, manufactured by Kao Corporation] was used as a nonionic surfactant (b1). The aqueous dispersion thus obtained contained dispersion particles having an average particle size of 0.25 μm.

Dispersion Preparation Example 6

An aqueous dispersion was prepared in the same manner as in the above Dispersion Preparation Example 1, except that 18 g of polyoxyethylene cetyl ether was used as a nonionic surfactant (b1) and 42 g of polyoxyethylene lauryl ether was used as a nonionic surfactant (b2). The aqueous dispersion thus obtained contained dispersion particles having an average particle size of 0.15 μm.

Dispersion Preparation Example 7

An aqueous dispersion was prepared in the same manner as in the above Dispersion Preparation Example 1, except that 42 g of polyoxyethylene cetyl ether was used as a nonionic surfactant (b1) and 18 g of polyoxyethylene lauryl ether was used as a nonionic surfactant (b2). The aqueous dispersion thus obtained contained dispersion particles having an average particle size of 0.35 μm.

Dispersion Preparation Example 8

An aqueous dispersion was prepared in the same manner as in the above Dispersion Preparation Example 1, except that 10 g of polyoxyethylene cetyl ether was used as a nonionic surfactant (b1) and 10 g of polyoxyethylene lauryl ether was used as a nonionic surfactant (b2). The aqueous dispersion thus obtained contained dispersion particles having an average particle size of 0.35 μm.

Dispersion Preparation Example 9

An aqueous dispersion was prepared in the same manner as in the above Dispersion Preparation Example 1, except that 45 g of polyoxyethylene cetyl ether was used as a nonionic surfactant (b1) and 45 g of polyoxyethylene lauryl ether was used as a nonionic surfactant (b2). The aqueous dispersion thus obtained contained dispersion particles having an average particle size of 0.10 μm.

Dispersion Preparation Example 10

The modification of polypropylene was carried out in the same manner as in the above Dispersion Preparation Example 1, except that 2-hydroxyethyl methacrylate was used in place of maleic anhydride, and the modified polypropylene thus obtained had a 2-hydroxyethyl methacrylate content of 0.6 wt %. Thereafter, an aqueous dispersion was prepared in the same manner as in the above Dispersion Preparation Example 1 by using the above obtained modified polypropylene, and the aqueous dispersion thus obtained contained dispersion particles having an average particle size of 0.30 μm.

Dispersion Preparation Example 11

An aqueous dispersion was prepared in the same manner as in the above Dispersion Preparation Example 1, except that 60 g of polyoxyethylene cetyl ether was used as a nonionic surfactant (b1) but a nonionic surfactant (b2) was not used. The aqueous dispersion thus obtained contained dispersion particles having an average particle size of 1.1 μm, and its dispersion stability was poor since a layer separation was caused after one week. Accordingly, its coating test was not carried out.

Dispersion Preparation Example 12

An aqueous dispersion was prepared in the same manner as in the above Dispersion Preparation Example 1, except that 60 g of polyoxyethylene lauryl ether was used as a nonionic surfactant (b2) but a nonionic surfactant (b1) was not used. The aqueous dispersion thus obtained contained dispersion particles having an average particle size of 0.10 μm.

Dispersion Preparation Example 13

An aqueous dispersion was prepared in the same manner as in the above Dispersion Preparation Example 1, except that a modified polypropylene prepared in the same manner as in the above Comparative Example 2 was used. The aqueous dispersion thus obtained contained dispersion particles having an average particle size of 1.2 μm, and its dispersion stability was poor since a phase separation was caused after one week.

TABLE 2a

| Dispersion Preparation Examples | (a) Modified PP polymer | | | | | | (b) Emulsifier | | (d) Base | Average particle size of dispersed particles μm |
|---|---|---|---|---|---|---|---|---|---|---|
| | PP polymer main chain | | | | PP polymer side chain | | | | | |
| | Composition | mmmm $S_1/S$ % | mmmr % | $4 + 2S_1/S_2$ | Modifier | Graft amount wt % | (b1) g | (b2) g | | |
| 1 | PP homopolymer | 42.1 | 16.0 | 9.3 | MA | 0.5 | POCeE 30 | POLaE 30 | AMPrOH | 0.25 |
| 2 | PP homopolymer | 42.1 | 16.0 | 9.3 | MA | 4.1 | POCeE 30 | POLaE 30 | AMPrOH | 0.10 |
| 3 | PP homopolymer | 52.2 | 14.2 | 11.4 | MA | 0.4 | POCeE 30 | POLaE 30 | AMPrOH | 0.30 |
| 4 | E.P copolymer (E 1.49%) | 47.6 | 16.5 | 9.8 | MA | 0.5 | POCeE 30 | POLaE 30 | AMPrOH | 0.30 |
| 5 | PP homopolymer | 42.1 | 16.0 | 9.3 | MA | 0.5 | POOlE 30 | POLaE 30 | AMPrOH | 0.25 |
| 6 | PP homopolymer | 42.1 | 16.0 | 9.3 | MA | 0.5 | POCeE 18 | POLaE 42 | AMPrOH | 0.15 |
| 7 | PP homopolymer | 42.1 | 16.0 | 9.3 | MA | 0.5 | POCeE 42 | POLaE 18 | AMPrOH | 0.35 |
| 8 | PP homopolymer | 42.1 | 16.0 | 9.3 | MA | 0.5 | POCeE 10 | POLaE 10 | AMPrOK | 0.35 |
| 9 | PP homopolymer | 42.1 | 16.0 | 9.3 | MA | 0.5 | POCeE 45 | POLaE 45 | AMPrOH | 0.10 |
| 10 | PP homopolymer | 42.1 | 16.0 | 9.3 | 2HEMAc | 0.6 | POCeE 30 | POLaE 30 | AMPrOH | 0.30 |
| 11 | PP homopolymer | 42.1 | 16.0 | 9.3 | MA | 0.5 | POCeE 60 | — | AMPrOH | 1.1 |
| 12 | PP homopolymer | 42.1 | 16.0 | 9.3 | MA | 0.5 | — | POLaE 60 | AMPrOH | 0.10 |
| 13 | PP homopolymer | 10.7 | 12.7 | 5.7 | MA | 0.6 | POCeE 30 | POLaE 30 | AMPrOH | 1.2 |

In the above Table 2a, the meanings of reference marks are illustrated below.

MA: maleic anhydride
2HEMAc: 2-hydroxyethyl methacrylate
POCeE: polyoxyethylene cetyl ether
POLaE: polyoxyethylene lauryl ether
PoolE: polyoxyethylene oleyl ether
AMPrOH: 2-amino-2-methyl-1-propanol Grade names and physical properties of various crystal polypropylenes (base pp) constituting substrate materials (B) used in the following Examples are illustrated in the following Table 3a. All of grade names of PP-1 to PP-11 are tradenames of Japan Polychem Corporation. In the following Table 3a, pentad fraction means mmmm pentad.

TABLE 3a

| Base PP | Grade name | Type | MFR (homo part) g/10 min | Q value of homo part | Pentad fraction of homo part % | Copolymer part wt % | Ethylene content of copolymer wt % | MFR (total) g/10 min | Bending modulus of elasticity MPa | IZOD impact strength kJ/m² |
|---|---|---|---|---|---|---|---|---|---|---|
| PP-1 | MA06 | Homopolymer | 60 | 2.3 | 98 | 0 | 0 | 60 | 1750 | 1.6 |
| PP-2 | MA1 | Homopolymer | 22 | 3.1 | 97 | 0 | 0 | 22 | 1700 | 1.9 |
| PP-3 | MA4U | Homopolymer | 5 | 3.0 | 97 | 0 | 0 | 5 | 1510 | 2.0 |
| PP-4 | BC03B | Block polymer | 70 | 2.8 | 99 | 14 | 60 | 30 | 1290 | 7.2 |
| PP-5 | BC03C | Block polymer | 48 | 2.8 | 99 | 7 | 60 | 30 | 1500 | 5.9 |
| PP-6 | BC03GS | Block polymer | 85 | 2.9 | 98 | 18 | 40 | 30 | 1110 | 11.6 |
| PP-7 | BC08G | Block polymer | 180 | 2.3 | 97 | 18 | 40 | 80 | 1060 | 8.3 |
| PP-8 | BC3B | Block polymer | 25 | 2.8 | 98 | 12 | 60 | 10 | 1300 | 8.9 |
| PP-9 | BPP-1 | Block polymer | 160 | 2.8 | 99 | 7 | 41 | 65 | Unmeasured | Unmeasured |
| PP-10 | MA3 | Homopolymer | 10 | 3 | 97 | 0 | 0 | 10 | 1510 | 2 |
| PP-11 | BC10BH | Block polymer | 200 | 3.1 | 98 | 8 | 62 | 100 | 1600 | 5 |

Also, grade names and physical properties of commercially available products used as carbon black in the following Examples are illustrated in the following Table 4b, grade names and physical properties of commercially available various fillers used as inorganic filler components are illustrated in the following Table 5b, and tradenames and physical properties of commercially available various elastomer materials used as elastomer components are illustrated in the following Table 6b.

TABLE 4b

| | Grade name | Company name | Particle size nm | DBP absorption amount ml/100 g | Specific surface area m$^2$/100 g |
|---|---|---|---|---|---|
| CB-1 | Ketjen EC300J | Ketjen Black International Co. | 40 | 355 | 800 |
| CB-2 | Ketjen EC600JD | Ketjen Black International Co. | 34 | 495 | 1270 |
| CB-3 | Thermal Black | Degusa | 300 | 45 | 8 |

TABLE 5b

| | Kind | Grade name | Company name | Average particle size μm | Diameter μm |
|---|---|---|---|---|---|
| Filler 1 | Talc | MT5D | Fuji Talc | 4.3 | — |
| Filler 2 | Talc | PKP80 | Fuji Talc | 9.5 | — |
| Filler 3 | Talc | PKP02 | Fuji Talc | 12.8 | — |
| Filler 4 | Glass fiber | MA411J | Asahi Fiber | — | 13 |
| Filler 5 | Mica | Mica 200HK | Kuraray Co., Ltd. | 89.8 | — |
| Filler 6 | Calcium carbonate | Snow light 3S | Maruo Calcium Co., Ltd. | 5 | — |
| Filler 7 | Whisker | Tismo D | Otsuka Chemical Co., Ltd. | 10 to 20 | — |

Further, various composite PP materials and PP substrates (B) were prepared by blending various carbon blacks illustrated in Table 4b and/or various inorganic fillers illustrated in Table 5b and various elastomers illustrated in Table 6b with various crystalline polypropylenes illustrated in Table 3a. Blending ratios and physical properties of the composite PP materials and PP substrates (B) thus obtained are illustrated in the following Tables 6a to 7a and Tables 7b to 9b. Preparation methods and evaluation methods of these composite PP materials and PP substrates (B) are illustrated below.

These blending components were blended in such blending ratios (wt %) as illustrated in the following Tables 6a to 7a and Tables 7b to 9b, and were mixed with 0.1 part by weight of a phenol type antioxidant (IRGANOX1010 manufactured by Chiba Specialty Chemicals K.K.), 0.05 part by weight of a phosphor type antioxidant (IRGAFOS168 manufactured by Chiba Specialty Chemicals K.K.) and 0.2 part by weight of calcium stearate. Each of these blends was melt-kneaded by a bi-axial extruding machine (TEX300α manufactured by The Japan Works, Ltd.) at a screw rotation number of 300 rpm and at an extruding rate of 15 kg/hr to obtain pellets of a resin composition. The pellets thus obtained were injection-molded at a mold temperature of 40° C. and a cylinder temperature of 230° C. to obtain each test piece of a resin composition. Various physical properties of the test piece thus obtained were evaluated in accordance with the above-mentioned methods.

Further, various resin compositions illustrated in Tables 6a to 7a and Tables 7b to 9b were injection-molded by an injection-molding machine (IS170 manufactured by Toshiba Kikai K.K.) at a molding temperature of 220° C. to obtain a test piece of 150 mm×70 mm×2 mm, and this is used as a substrate for evaluating paint properties.

TABLE 6b

| | Type | Grade name | Company name | Comonomer | MFR g/10 min | Density g/cm$^3$ |
|---|---|---|---|---|---|---|
| Elastomer 1 | Ethylene type | EG8200 | Du Pont Dow Elastomers L.L.C. | Octene | 10.5 | 0.872 |
| Elastomer 2 | Ethylene type | EG8180 | Du Pont Dow Elastomers L.L.C. | Octene | 1 | 0.863 |
| Elastomer 3 | Ethylene type | YA503 | Mitsui Chemicals, Inc. | Butene | 6.5 | 0.862 |
| Elastomer 4 | Ethylene type | A4085 | Mitsui Chemicals, Inc. | Butene | 6.5 | 0.886 |
| Elastomer 5 | Ethylene type | EP07P | JSR | Propylene | 0.7 | 0.86 |
| Elastomer 6 | Ethylene type | EP57P | JSR | Diene•propylene | 0.41 | 0.864 |
| Elastomer 7 | Styrene type | G1657 | Kraton Polymer | Styrene•diene•butene | 10 | 0.9 |

TABLE 6a

| Base material | Base PP | Parts by weight | Kind of Filler | Parts by weight | MFR (total) g/10 min | Bending modulus of elasticity MPa | IZOD impact strength kJ/m² |
|---|---|---|---|---|---|---|---|
| Composite PP-1 | PP-4 | 100 | Filler 1 | 5.3 | 30 | 1950 | 6.7 |
| Composite PP-2 | PP-4 | 100 | Filler 1 | 25 | 29 | 2850 | 5.2 |
| Composite PP-3 | PP-4 | 100 | Filler 1 | 49.3 | 27.5 | 3650 | 3.1 |
| Composite PP-4 | PP-4 | 100 | Filler 2 | 25 | 29.1 | 2710 | 5.3 |
| Composite PP-5 | PP-4 | 100 | Filler 3 | 25 | 29.8 | 2500 | 4.4 |
| Composite PP-6 | PP-3 | 100 | Filler 4 | 25 | 2.1 | 2700 | 7.0 |
| Composite PP-7 | PP-4 | 100 | Filler 5 | 25 | 23.1 | 3200 | 3.5 |
| Composite PP-8 | PP-4 | 100 | Filler 6 | 25 | 28.5 | 1580 | 3.0 |
| Composite PP-9 | PP-4 | 100 | Filler 7 | 25 | 15.2 | 3400 | 2.1 |
| Composite PP-10 | PP-6 | 100 | Filler 1 | 25 | 30 | 2400 | 8.6 |
| Composite PP-11 | PP-7 | 100 | Filler 1 | 25 | 75.4 | 2350 | 6.5 |
| Composite PP-12 | PP-1 | 100 | Filler 1 | 25 | 58.9 | 3710 | 1.3 |
| Composite PP-13 | PP-3 | 100 | Filler 1 | 25 | 1.8 | 3550 | 1.7 |

TABLE 7a

| Base material | Base PP | Parts by weight | Blending material | Parts by weight | Blending material | Parts by weight | MFR (total) g/10 min | Bending modulus of elasticity MPa | IZOD impact strength kJ/m² |
|---|---|---|---|---|---|---|---|---|---|
| Composite PP-14 | PP-9 | 100 | Elastomer 2 | 11.1 | — | — | 46.5 | 1150 | 7.6 |
| Composite PP-15 | PP-9 | 100 | Elastomer 2 | 42.9 | — | — | 21.7 | 7800 | 63 |
| Composite PP-16 | PP-9 | 100 | Elastomer 3 | 43.9 | — | — | 20.7 | 9400 | 60 |
| Composite PP-17 | PP-6 | 100 | Elastomer 1 | 25.0 | — | — | 23.0 | 8000 | 58 |
| Composite PP-18 | PP-1 | 100 | Elastomer 1 | 25.0 | — | — | 17.8 | 1000 | 4.9 |
| Composite PP-19 | PP-9 | 100 | Elastomer 2 | 16.7 | Filler 1 | 50.0 | 32.4 | 3250 | 4.5 |
| Composite PP-20 | PP-9 | 100 | Elastomer 1 | 50.0 | Filler 1 | 16.7 | 35.8 | 1300 | 65 |
| Composite PP-21 | PP-9 | 100 | Elastomer 1 | 66.7 | Filler 1 | 16.7 | 27.0 | 880 | 69 |
| Composite PP-22 | PP-9 | 100 | Elastomer 2 | 50.0 | Filler 1 | 16.7 | 22.0 | 1380 | 68 |
| Composite PP-23 | PP-9 | 100 | Elastomer 3 | 50.0 | Filler 1 | 16.7 | 34.6 | 1300 | 55 |
| Composite PP-24 | PP-9 | 100 | Elastomer 4 | 50.0 | Filler 1 | 16.7 | 32.5 | 1420 | 51.9 |
| Composite PP-25 | PP-9 | 100 | Elastorrer 5 | 50.0 | Filler 1 | 16.7 | 22.1 | 1270 | 48.1 |
| Composite PP-26 | PP-9 | 100 | Elastomer 6 | 50.0 | Filler 1 | 16.7 | 15.3 | 1220 | 17 |
| Composite PP-27 | PP-9 | 100 | Elastomer 7 | 50.0 | Filler 1 | 16.7 | 37.0 | 1230 | 83 |
| Composite PP-28 | PP-6 | 100 | Elastomer 3 | 21.6 | Filler 1 | 13.5 | 21.5 | 1270 | 65.5 |
| Composite PP-29 | PP-7 | 100 | Elastomer 3 | 21.6 | Filler 1 | 13.5 | 50.8 | 1170 | 52 |

TABLE 7a-continued

| Blending composition | | | | | | Bending | IZOD |
|---|---|---|---|---|---|---|---|
| Base material | Base PP | Parts by weight | Blending material | Parts by weight | Blending material | Parts by weight | MFR (total) g/10 min | modulus of elasticity MPa | impact strength kJ/m² |
| Composite PP-30 | PP-9 | 100 | Elastomer 2 | 50.0 | Filler 2 | 16.7 | 22.4 | 1280 | 66 |
| Composite PP-31 | PP-9 | 100 | Elastomer 2 | 50.0 | Filler 3 | 16.7 | 23.9 | 1210 | 62 |

Examples 1a to 30a

Various aqueous dispersions prepared in the above Dispersion Preparation Examples 1 to 10 were coated on base materials obtained from various resin compositions illustrated in Table 3a, Table 6a and Table 7a, and were subjected to coating film tests. The results are shown in the following Table 8a. According to the results of an adhesiveness test and a water resistance test, all of the test samples showed 100/100, and outer appearances of the coated films showed ⊚ (normal) or ○ (substantially normal) and practically satisfactory qualities. Also, the coated films had satisfactory gasohol resistance properties. In Table 8a, "Aqueous dispersion-1" means an aqueous dispersion obtained by "Dispersion Preparation Example 1".

Comparative Examples 1a to 3a

Aqueous dispersion-12 was coated on PP-6, composite PP-2 and composite PP-26 used as base materials, and was subjected to coating film tests. According to the result of an adhesiveness test, all of the coated films were peeled off in primary adhesion state, and the results of a water resistance test were also poor and outer appearances of the coated films showed occurrence of blisters and the coated films were not practically usable.

TABLE 8a

| | Paint component (A) | Dispersion stability | | Substrate (B) | Adhesiveness | Water resistance | Outer appearance of coated film | Gasohol resistance Minute |
|---|---|---|---|---|---|---|---|---|
| | | Dispersion state | Average particle size μm | | | | | |
| Ex. 1a | Aqueous dispersion-1 | Good | 0.25 | PP-1 | 100/100 | 100/100 | ⊚ | 100 |
| | | | | PP-2 | 100/100 | 100/100 | ⊚ | 100 |
| | | | | PP-3 | 100/100 | 100/100 | ⊚ | 100 |
| | | | | PP-4 | 100/100 | 100/100 | ⊚ | >120 |
| | | | | PP-5 | 100/100 | 100/100 | ⊚ | >120 |
| | | | | PP-6 | 100/100 | 100/100 | ⊚ | >120 |
| | | | | PP-7 | 100/100 | 100/100 | ⊚ | >120 |
| | | | | PP-8 | 100/100 | 100/100 | ⊚ | >120 |
| Ex. 2a | Aqueous dispersion-2 | Good | 0.10 | PP-6 | 100/100 | 100/100 | ⊚ | >120 |
| Ex. 3a | Aqueous dispersion-3 | Good | 0.30 | PP-6 | 100/100 | 100/100 | ⊚ | >120 |
| Ex. 4a | Aqueous dispersion-4 | Good | 0.30 | PP-6 | 100/100 | 100/100 | ⊚ | >120 |
| Ex. 5a | Aqueous dispersion-5 | Good | 0.25 | PP-6 | 100/100 | 100/100 | ⊚ | >120 |
| Ex. 6a | Aqueous dispersion-6 | Good | 0.15 | PP-6 | 100/100 | 100/100 | ○ | 120 |
| Ex. 7a | Aqueous dispersion-7 | Good | 0.35 | PP-6 | 100/100 | 100/100 | ⊚ | >120 |
| Ex. 8a | Aqueous dispersion-8 | Good | 0.35 | PP-6 | 100/100 | 100/100 | ⊚ | >120 |
| Ex. 9a | Aqueous dispersion-9 | Good | 0.10 | PP-6 | 100/100 | 100/100 | ○ | >120 |
| Ex. 10a | Aqueous dispersion-10 | Good | 0.30 | PP-6 | 100/100 | 100/100 | ⊚ | 100 |
| Comp. Ex. 1a | Aqueous dispersion-12 | Good | 0.10 | PP-6 | 70/100 | 10/100 | X: Occurrence of blister | Unmeasured |
| Ex. 11a | Aqueous dispersion-1 | Good | 0.25 | Composite PP-1 | 100/100 | 100/100 | ⊚ | 100 |
| | | | | Composite PP-2 | 100/100 | 100/100 | ⊚ | 100 |
| | | | | Composite PP-3 | 100/100 | 100/100 | ⊚ | 100 |

TABLE 8a-continued

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| | | | | Composite PP-4 | 100/100 | 100/100 | ⊚ | >120 |
| | | | | Composite PP-5 | 100/100 | 100/100 | ⊚ | >120 |
| | | | | Composite PP-6 | 100/100 | 100/100 | ⊚ | >120 |
| | | | | Composite PP-7 | 100/100 | 100/100 | ⊚ | >120 |
| | | | | Composite PP-8 | 100/100 | 100/100 | ⊚ | >120 |
| | | | | Composite PP-9 | 100/100 | 100/100 | ⊚ | >120 |
| | | | | Composite PP-10 | 100/100 | 100/100 | ⊚ | >120 |
| | | | | Composite PP-11 | 100/100 | 100/100 | ⊚ | >120 |
| | | | | Composite PP-12 | 100/100 | 100/100 | ⊚ | >120 |
| | | | | Composite PP-13 | 100/100 | 100/100 | ⊚ | >120 |
| Ex. 12a | Aqueous dispersion-2 | Good | 0.10 | Composite PP-6 | 100/100 | 100/100 | ⊚ | 110 |
| Ex. 13a | Aqueous dispersion-3 | Good | 0.30 | Composite PP-2 | 100/100 | 100/100 | ⊚ | 110 |
| Ex. 14a | Aqueous dispersion-4 | Good | 0.30 | Composite PP-2 | 100/100 | 100/100 | ⊚ | 100 |
| Ex. 15a | Aqueous dispersion-5 | Good | 0.25 | Composite PP-2 | 100/100 | 100/100 | ⊚ | 100 |
| Ex. 16a | Aqueous dispersion-6 | Good | 0.15 | Composite PP-2 | 100/100 | 100/100 | ○ | 100 |
| Ex. 17a | Aqueous dispersion-7 | Good | 0.35 | Composite PP-2 | 100/100 | 100/100 | ⊚ | 110 |
| Ex. 18a | Aqueous dispersion-8 | Good | 0.35 | Composite PP-2 | 100/100 | 100/100 | ⊚ | 100 |
| Ex. 19a | Aqueous dispersion-9 | Good | 0.10 | Composite PP-2 | 100/100 | 100/100 | ○ | >120 |
| Ex. 20a | Aqueous dispersion-10 | Good | 0.30 | Composite PP-2 | 100/100 | 100/100 | ⊚ | 90 |
| Comp. Ex. 2a | Aqueous dispersion-12 | Good | 0.10 | Composite PP-2 | 60/100 | 0/100 | X: Occurrence of blister | Unmeasured |
| Ex. 21a | Aqueous dispersion-1 | Good | 0.25 | Composite PP-14 | 100/100 | 100/100 | ⊚ | >120 |
| | | | | Composite PP-15 | 100/100 | 100/100 | ⊚ | >120 |
| | | | | Composite PP-16 | 100/100 | 100/100 | ⊚ | >120 |
| | | | | Composite PP-17 | 100/100 | 100/100 | ⊚ | >120 |
| | | | | Composite PP-18 | 100/100 | 100/100 | ⊚ | >120 |
| | | | | Composite PP-19 | 100/100 | 100/100 | ⊚ | >120 |
| | | | | Composite PP-20 | 100/100 | 100/100 | ⊚ | >120 |
| | | | | Composite PP-21 | 100/100 | 100/100 | ⊚ | >120 |
| | | | | Composite PP-22 | 100/100 | 100/100 | ⊚ | >120 |
| | | | | Composite PP-23 | 100/100 | 100/100 | ⊚ | >120 |
| | | | | Composite PP-24 | 100/100 | 100/100 | ⊚ | >120 |
| | | | | Composite PP-25 | 100/100 | 100/100 | ⊚ | >120 |
| | | | | Composite PP-26 | 100/100 | 100/100 | ⊚ | >120 |
| | | | | Composite PP-27 | 100/100 | 100/100 | ⊚ | >120 |
| | | | | Composite PP-28 | 100/100 | 100/100 | ⊚ | >120 |

TABLE 8a-continued

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| | | | | Composite PP-29 | 100/100 | 100/100 | ⊚ | >120 |
| | | | | Composite PP-30 | 100/100 | 100/100 | ⊚ | >120 |
| | | | | Composite PP-31 | 100/100 | 100/100 | ⊚ | >120 |
| Ex. 22a | Aqueous dispersion-2 | Good | 0.10 | Composite PP-19 | 100/100 | 100/100 | ⊚ | >120 |
| Ex. 23a | Aqueous dispersion-3 | Good | 0.30 | Composite PP-20 | 100/100 | 100/100 | ⊚ | >120 |
| Ex. 24a | Aqueous dispersion-4 | Good | 0.30 | Composite PP-20 | 100/100 | 100/100 | ⊚ | >120 |
| Ex. 25a | Aqueous dispersion-5 | Good | 0.25 | Composite PP-20 | 100/100 | 100/100 | ⊚ | >120 |
| Ex. 26a | Aqueous dispersion-6 | Good | 0.15 | Composite PP-20 | 100/100 | 100/100 | ○ | >120 |
| Ex. 27a | Aqueous dispersion-7 | Good | 0.35 | Composite PP-20 | 100/100 | 100/100 | ⊚ | >120 |
| Ex. 28a | Aqueous dispersion-8 | Good | 0.35 | Composite PP-20 | 100/100 | 100/100 | ⊚ | >120 |
| Ex. 29a | Aqueous dispersion-9 | Good | 0.10 | Composite PP-20 | 100/100 | 100/100 | ○ | >120 |
| Ex. 30a | Aqueous dispersion-10 | Good | 0.30 | Composite PP-20 | 100/100 | 100/100 | ⊚ | 100 |
| Comp. Ex. 3a | Aqueous dispersion-12 | Good | 0.10 | Composite PP-26 | 65/100 | 5/100 | X: Occurrence of blister | Unmeasured |

According to the present invention, since dispersed particles are sufficiently small, a satisfactory dispersion stability can be obtained, and consequently the present invention can provide a polypropylene aqueous dispersion capable of forming a satisfactory coating film having a good outer appearance (smoothness), a good adhesiveness to a polyolefin substrate and a good water resistance. Thus, the aqueous dispersion of the present invention can produce a satisfactory polypropylene type resin-coated product having an excellent coated film adhesiveness and having a satisfactory physical property balance excellent in stiffness and impact resistance.

TABLE 7b

| Substrate (B) | Blending composition PP kind | wt % | CB kind | wt % | MFR (total) g/10 min | Bending modulus of elasticity MPa | IZOD impact resistance kJ/m$^2$ | Glossiness % | Volume resistivity value Ωcm |
|---|---|---|---|---|---|---|---|---|---|
| PP substrate-1 | PP-1 | 95 | CB-1 | 5 | 40 | 1800 | 1.8 | 78 | $10^8$ |
| PP substrate-2 | PP-2 | 95 | CB-1 | 5 | 10 | 1700 | 2 | 67 | $10^8$ |
| PP substrate-3 | PP-10 | 95 | CB-1 | 5 | 5 | 1500 | 2.5 | 65 | $10^8$ |
| PP substrate-4 | PP-4 | 95 | CB-1 | 5 | 15 | 1150 | 9.8 | 60 | $10^6$ |
| PP substrate-5 | PP-5 | 95 | CB-1 | 5 | 14.5 | 1320 | 6.9 | 65 | $10^6$ |
| PP substrate-6 | PP-6 | 95 | CB-1 | 5 | 15 | 1030 | 14.6 | 55 | $10^6$ |
| PP substrate-7 | PP-7 | 95 | CB-1 | 5 | 50 | 960 | 13.2 | 51 | $10^6$ |
| PP substrate-8 | PP-11 | 95 | CB-1 | 5 | 70 | 1660 | 6.1 | 72 | $10^6$ |

TABLE 8b

| Substrate (B) | PP kind | wt % | CB kind | wt % | Filler kind | wt % | MFR (total) g/10 min | Bending modulus of elasticity MPa | IZOD impact resistance kJ/m² | Glossiness % | Volume resistivity value Ωcm |
|---|---|---|---|---|---|---|---|---|---|---|---|
| PP substrate-9 | PP-7 | 75 | CB-1 | 5 | Filler 1 | 20 | 48 | 2360 | 7.5 | 39 | $10^6$ |
| PP substrate-10 | PP-7 | 77 | CB-2 | 3 | Filler 1 | 20 | 55 | 2430 | 7.9 | 43 | $10^6$ |
| PP substrate-11 | PP-7 | 75 | CB-1 | 5 | Filler 2 | 20 | 47 | 2280 | 7.4 | 38 | $10^6$ |
| PP substrate-12 | PP-7 | 75 | CB-1 | 5 | Filler 3 | 20 | 50 | 2210 | 7.5 | 36 | $10^6$ |
| PP substrate-13 | PP-7 | 90 | CB-1 | 5 | Filler 4 | 5 | 42 | 1390 | 8.9 | 32 | $10^6$ |
| PP substrate-14 | PP-7 | 75 | CB-1 | 5 | Filler 5 | 20 | 48 | 2110 | 5.7 | 34 | $10^6$ |
| PP substrate-15 | PP-7 | 75 | CB-1 | 5 | Filler 6 | 20 | 48 | 1980 | 6.5 | 33 | $10^6$ |
| PP substrate-16 | PP-7 | 75 | CB-1 | 5 | Filler 7 | 20 | 46 | 3150 | 4.3 | 36 | $10^6$ |
| PP substrate-17 | PP-7 | 65 | CB-3 | 15 | Filler 1 | 20 | 55 | 1980 | 10.8 | 27 | $10^{11}$ |
| PP substrate-18 | PP-7 | 50 | CB-3 | 30 | Filler 1 | 20 | 30 | 1840 | 11.6 | 15 | $10^7$ |

TABLE 9b

| Substrate (B) | PP kind | wt % | CB kind | wt % | Filler kind | wt % | Elastomer kind | wt % |
|---|---|---|---|---|---|---|---|---|
| PP substrate-19 | PP-11 | 50 | CB-1 | 5 | Filler 1 | 20 | Elastomer 1 | 25 |
| PP substrate-20 | PP-11 | 50 | CB-1 | 5 | Filler 1 | 20 | Elastomer 2 | 25 |
| PP substrate-21 | PP-11 | 50 | CB-1 | 5 | Filler 1 | 20 | Elastomer 3 | 25 |
| PP substrate-22 | PP-11 | 50 | CB-1 | 5 | Filler 1 | 20 | Elastomer 4 | 25 |
| PP substrate-23 | PP-11 | 50 | CB-1 | 5 | Filler 1 | 20 | Elastomer 5 | 25 |
| PP substrate-24 | PP-11 | 50 | CB-1 | 5 | Filler 1 | 20 | Elastomer 6 | 25 |
| PP substrate-25 | PP-11 | 50 | CB-1 | 5 | Filler 1 | 20 | Elastomer 7 | 25 |

| Substrate (B) | MFR (total) g/10 min | Bending modulus of elasticity MPa | IZOD impact resistance kJ/m² | Glossiness % | Volume resistivity value Ωcm |
|---|---|---|---|---|---|
| PP substrate-19 | 18 | 1650 | 29 | 34 | $10^6$ |
| PP substrate-20 | 10 | 1560 | 65 | 30 | $10^6$ |
| PP substrate-21 | 12 | 1600 | 60 | 32 | $10^6$ |
| PP substrate-22 | 12 | 1590 | 58 | 33 | $10^6$ |
| PP substrate-23 | 8 | 1650 | 70 | 30 | $10^6$ |
| PP substrate-24 | 7 | 1630 | 70 | 30 | $10^6$ |
| PP substrate-25 | 12 | 1550 | 85 | 32 | $10^6$ |

Examples 1b to 30b

Various aqueous dispersions illustrated in the above Table 2a prepared by the above Dispersion Preparation Examples 1 to 10 were coated on substrates (B) obtained from various resin compositions illustrated in the above Tables 7b to 9b, and were subjected to coating film tests. The results are shown in the following Tables 10b to 12b. According to the results of an adhesiveness test and a water resistance test, all of the test pieces showed 100/100, and outer appearances of the coating films of the test pieces showed ⊚ (normal) or ○ (substantially normal) and had practically satisfactory qualities. Also, these test pieces had satisfactory gasohol resistance properties. In Tables 10b to 12b, "Aqueous dispersion-1" means an aqueous dispersion obtained by "Dispersion Preparation Example 1".

Comparative Examples 1b to 2b

Aqueous dispersion-1 was coated on PP substrate-17, and PP substrate-18 and was subjected to coating film tests in the same manner as in the above Example 1b. Since glossiness of these substrates was poor, the coated surfaces became satin-like immediately after coating, and outer appearances were not good. This is considered to be caused due to poor surface smoothness of the substrates employed, and products having a satisfactory coating appearance could not be obtained. However, since the Aqueous dispersion-1 had a satisfactory dispersibility, the results of an adhesiveness test, a water resistance test and a gasohol resistance test were satisfactory. The results are shown in the following Table 13b.

Comparative Examples 3b to 5b

Aqueous dispersion-12 was coated on PP substrate-6, PP substrate-10 and PP substrate-19, and was subjected to coating film tests. All of the results of an adhesiveness test were 65/100, and the results of a water resistance test were 5/100, and blisters occurred on the coated films. Thus, these coated films were not practically usable. The results are shown in the following Table 13b.

TABLE 10b

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| Ex. 1b | Aqueous dispersion-1 | Good | 0.25 | PP substrate-1 | 100/100 | 100/100 | ⊚ | 100 |
| | | | | PP substrate-2 | 100/100 | 100/100 | ⊚ | 100 |
| | | | | PP substrate-3 | 100/100 | 100/100 | ⊚ | 100 |
| | | | | PP substrate-4 | 100/100 | 100/100 | ⊚ | >120 |
| | | | | PP substrate-5 | 100/100 | 100/100 | ⊚ | >120 |
| | | | | PP substrate-6 | 100/100 | 100/100 | ⊚ | >120 |
| | | | | PP substrate-7 | 100/100 | 100/100 | ⊚ | >120 |
| | | | | PP substrate-8 | 100/100 | 100/100 | ⊚ | >120 |
| Ex. 2b | Aqueous dispersion-2 | Good | 0.10 | PP substrate-6 | 100/100 | 100/100 | ⊚ | >120 |
| Ex. 3b | Aqueous dispersion-3 | Good | 0.30 | PP substrate-6 | 100/100 | 100/100 | ⊚ | >120 |
| Ex. 4b | Aqueous dispersion-4 | Good | 0.30 | PP substrate-6 | 100/100 | 100/100 | ⊚ | >120 |
| Ex. 5b | Aqueous dispersion-5 | Good | 0.25 | PP substrate-6 | 100/100 | 100/100 | ⊚ | >120 |
| Ex. 6b | Aqueous dispersion-6 | Good | 0.15 | PP substrate-6 | 100/100 | 100/100 | ○ | 120 |
| Ex. 7b | Aqueous dispersion-7 | Good | 0.35 | PP substrate-6 | 100/100 | 100/100 | ⊚ | >120 |
| Ex. 8b | Aqueous dispersion-8 | Good | 0.35 | PP substrate-6 | 100/100 | 100/100 | ⊚ | >120 |
| Ex. 9b | Aqueous dispersion-9 | Good | 0.10 | PP substrate-6 | 100/100 | 100/100 | ○ | >120 |
| Ex. 10b | Aqueous dispersion-10 | Good | 0.30 | PP substrate-6 | 100/100 | 100/100 | ⊚ | 100 |

TABLE 11b

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| Ex. 11b | Aqueous dispersion-1 | Good | 0.25 | PP substrate-9 | 100/100 | 100/100 | ⊚ | 100 |
| | | | | PP substrate-10 | 100/100 | 100/100 | ⊚ | 100 |

TABLE 11b-continued

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| | | | | PP substrate-11 | 100/100 | 100/100 | ◎ | 100 |
| | | | | PP substrate-12 | 100/100 | 100/100 | ◎ | >120 |
| | | | | PP substrate-13 | 100/100 | 100/100 | ◎ | >120 |
| | | | | PP substrate-14 | 100/100 | 100/100 | ◎ | >120 |
| | | | | PP substrate-15 | 100/100 | 100/100 | ◎ | >120 |
| | | | | PP substrate-16 | 100/100 | 100/100 | ◎ | >120 |
| Ex. 12b | Aqueous dispersion-2 | Good | 0.10 | PP substrate-14 | 100/100 | 100/100 | ◎ | 110 |
| Ex. 13b | Aqueous dispersion-3 | Good | 0.30 | PP substrate-10 | 100/100 | 100/100 | ◎ | 110 |
| Ex. 14b | Aqueous dispersion-4 | Good | 0.30 | PP substrate-10 | 100/100 | 100/100 | ◎ | 100 |
| Ex. 15b | Aqueous dispersion-5 | Good | 0.25 | PP substrate-10 | 100/100 | 100/100 | ◎ | 100 |
| Ex. 16b | Aqueous dispersion-6 | Good | 0.15 | PP substrate-10 | 100/100 | 100/100 | ○ | 100 |
| Ex. 17b | Aqueous dispersion-7 | Good | 0.35 | PP substrate-10 | 100/100 | 100/100 | ◎ | 110 |
| Ex. 18b | Aqueous dispersion-8 | Good | 0.35 | PP substrate-10 | 100/100 | 100/100 | ◎ | 100 |
| Ex. 19b | Aqueous dispersion-9 | Good | 0.10 | PP substrate-10 | 100/100 | 100/100 | ○ | >120 |
| Ex. 20b | Aqueous dispersion-10 | Good | 0.30 | PP substrate-10 | 100/100 | 100/100 | ◎ | 90 |

TABLE 12b

| | Paint component (A) | Dispersion stability Dispersion state | Average particle size μm | Substrate (B) | Adhesiveness | Water resistance | Outer appearance of coated film | Gasohol resistance Minute |
|---|---|---|---|---|---|---|---|---|
| Ex. 21b | Aqueous dispersion-1 | Good | 0.25 | PP substrate-19 | 100/100 | 100/100 | ◎ | >120 |
| | | | | PP substrate-20 | 100/100 | 100/100 | ◎ | >120 |
| | | | | PP substrate-21 | 100/100 | 100/100 | ◎ | >120 |
| | | | | PP substrate-22 | 100/100 | 100/100 | ◎ | >120 |
| | | | | PP substrate-23 | 100/100 | 100/100 | ◎ | >120 |
| | | | | PP substrate-24 | 100/100 | 100/100 | ◎ | >120 |
| | | | | PP substrate-25 | 100/100 | 100/100 | ◎ | >120 |
| Ex. 22b | Aqueous dispersion-2 | Good | 0.10 | PP substrate-19 | 100/100 | 100/100 | ◎ | >120 |
| Ex. 23b | Aqueous dispersion-3 | Good | 0.30 | PP substrate-19 | 100/100 | 100/100 | ◎ | >120 |
| Ex. 24b | Aqueous dispersion-4 | Good | 0.30 | PP substrate-19 | 100/100 | 100/100 | ◎ | >120 |
| Ex. 25b | Aqueous dispersion-5 | Good | 0.25 | PP substrate-19 | 100/100 | 100/100 | ◎ | >120 |
| Ex. 26b | Aqueous dispersion-6 | Good | 0.15 | PP substrate-19 | 100/100 | 100/100 | ○ | >120 |
| Ex. 27b | Aqueous dispersion-7 | Good | 0.35 | PP substrate-19 | 100/100 | 100/100 | ◎ | >120 |

TABLE 12b-continued

| | Paint component (A) | Dispersion state | Dispersion stability Average particle size μm | Substrate (B) | Adhesiveness | Water resistance | Outer appearance of coated film | Gasohol resistance Minute |
|---|---|---|---|---|---|---|---|---|
| Ex. 28b | Aqueous dispersion-8 | Good | 0.35 | PP substrate-19 | 100/100 | 100/100 | ◉ | >120 |
| Ex. 29b | Aqueous dispersion-9 | Good | 0.10 | PP substrate-19 | 100/100 | 100/100 | ○ | >120 |
| Ex. 30b | Aqueous dispersion-10 | Good | 0.30 | PP substrate-19 | 100/100 | 100/100 | ◉ | 100 |

TABLE 13b

| | Paint component (A) | Dispersion state | Dispersion stability Average particle size μm | Substrate (B) | Adhesiveness | Water resistance | Outer appearance of coated film | Gasohol resistance Minute |
|---|---|---|---|---|---|---|---|---|
| Comp. Ex. 1b | Aqueous dispersion-1 | Good | 0.10 | PP substrate-17 | 100/100 | 100/100 | Satin-like coated film of poor quality | 100 |
| Comp. Ex. 2b | Aqueous dispersion-1 | Good | 0.10 | PP substrate-18 | 100/100 | 100/100 | Satin-like coated film of poor quality | 100 |
| Comp. Ex. 3b | Aqueous dispersion-12 | Good | 0.10 | PP substrate-6 | 65/100 | 5/100 | X Occurrence of blister | Unevaluated |
| Comp. Ex. 4b | Aqueous dispersion-12 | Good | 0.10 | PP substrate-10 | 65/100 | 5/100 | X Occurrence of blister | Unevaluated |
| Comp. Ex. 5b | Aqueous dispersion-12 | Good | 0.10 | PP substrate-19 | 65/100 | 5/100 | X Occurrence of blister | Unevaluated |

According to the present invention, since dispersed particles are sufficiently small, a satisfactory dispersion stability can be obtained, and consequently the present invention can provide a polypropylene aqueous dispersion capable of forming a satisfactory coating film having a good outer appearance (smoothness), a good adhesiveness to a polyolefin substrate and a good water resistance. Thus, the aqueous dispersion of the present invention can produce a satisfactory polypropylene type resin-coated product having an excellent coated film adhesiveness and having a satisfactory physical property balance excellent in stiffness and impact resistance.

Examples 1c to 6c and Comparative Examples 1c to 6c

Preparation of Polypropylene (Pp), Modification of polypropylene and preparation of aqueous emulsion were carried out in the same manner as in Preparation Example 1 of the above Example 1.

Also, in order to evaluate the aqueous emulsion as a primer for a paint, preparation of a test piece and a dispersion stability test, an adhesiveness test, a water resistance test and a gasohol resistance test of the emulsion were carried out in the same manner as in the above Example 1.

Evaluation of the emulsions as an electrostatic adhesive and as an ink was carried out in the following manner.

(Evaluation of an Aqueous Dispersion as an Electrostatic Adhesive)

A thickening agent (Yodosol KA-109 manufactured by Nippon NSC K.K.) was added to composite aqueous emulsions obtained in the following Examples and Comparative Examples to raise a viscosity to 20 poises (B type viscometer), and each of the emulsions thus prepared was coated as an aqueous dispersion type adhesive for filling bristles containing no organic solvent onto each of the above prepared polypropylene type test pieces by a bar coater (No. 160 manufactured by Eto Kikai Shoukai K.K., coating thickness: 240 μm), and a cotton cloth (used for JIS dye fastness test) was placed on each of the test pieces thus coated. After confirming that the total face got wet, the test piece was placed in a thermostat dryer and was dried at 80° C. for 30 minutes. The dried test piece was then taken out from the drier, and after two hours, the test piece was subjected to a 180° peeling test by a tensile tester at a tensile rate of 50 mm/min.

A test sample having a peeling strength of at least 1 kg/cm was evaluated to be an accepted product.

(Evaluation of an Aqueous Dispersion as an Ink)

Each of the composite aqueous emulsions obtained by the following Examples and Comparative Examples was diluted with a solvent to adjust a solid content, and each of the emulsions thus prepared was gravure-printed on an OPP (biaxially oriented polypropylene) film and a PET (polyethylene terephthalate) film by a gravure printing plate of 70 μm, and was sealed by a heat sealer (manufactured by Tester Sangyo K.K.) at room temperature under a pressure of 1 kg/cm$^2$G for 1 second, and a peeling strength was then measured by a tensile tester (manufactured by Orientec K.K.) at a tensile rate of 300 mm/min.

A test sample having a peeling strength of at least 200 g/cm was evaluated to be an accepted product.

Example 1c 100 g of a modified PP emulsion (resin solid content: 20 wt %, average particle size: 0.15μ) prepared by the above Dispersion Preparation Example 1 and 200 g of a polycarbonate polyurethane aqueous emulsion (Permuthane RU-40-350 (resin solid content: 40 wt %) manufactured by Stal Japan K.K.) were fully mixed to obtain a polyolefin type/polyurethane type composite aqueous emulsion composition.

Example 2c

In the above Example 1c, 90 g of an aqueous block isocyanate (Duranate X-1118 (resin solid content=30%) manufactured by Asahi Chemical Industry Co., Ltd.) was further mixed therewith to obtain a polyolefin type/polyurethane type composite aqueous emulsion composition.

Example 3c

A polyolefin type/acryl type polymer composite aqueous emulsion composition was obtained in the same manner as in the above Example 1c, except that 200 g of an acryl type polymer aqueous emulsion (Permuthane EX-60-128 (resin solid content: 33.3 wt %) manufactured by Stal Japan K.K.) was used to be mixed with the modified PP emulsion in place of Permuthane RU-40-350.

Example 4c

In the above Example 3c, 15 g of a polycarbodiimide type cross linking agent (Permuthane XR-5560 (resin solid content: 50.1 wt %) manufactured by Stal Japan K.K.) was further mixed in the system to obtain a polyolefin type/acryl type polymer composite aqueous emulsion composition containing a polycarbodiimide type cross linking agent.

Example 5c

A polyolefin type/epoxy type polymer composite aqueous emulsion composition was obtained in the same manner as in the above Example 1c, except that 200 g of an epoxy type polymer aqueous emulsion (EN-107-50 (resin solid content: 50.3 wt %) manufactured by Asahi Denka Kogyo K.K.) was used to be mixed with the modified PP emulsion in place of Permuthane RU-40-350.

Example 6c

A polyolefin type/epoxy type polymer composite aqueous emulsion composition was obtained in the same manner as in the above Example 1c, except that 200 g of an epoxy type polymer aqueous emulsion (EN-101-50 (resin solid content: 49.2 wt %) manufactured by Asahi Denka Kogyo K.K.) and 15 g of a polycarbodiimide type cross linking agent (Permuthane XR-5560 (resin solid content: 50.1 wt %) manufactured by Stal Japan K.K.) were used to be mixed with the modified PP emulsion.

Comparative Example 1c

A chlorinated polypropylene type/polyurethane type composite aqueous emulsion composition was obtained in the same manner as in the above Example 1c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Comparative Example 2c

A block isocyanate-containing chlorinated polypropylene type/polyurethane type composite aqueous emulsion composition was obtained in the same manner as in the above Example 2c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Comparative Example 3c

A chlorinated polypropylene type/acryl type polymer composite aqueous emulsion composition was obtained in the same manner as in the above Example 3c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Comparative Example 4c

A polycarbodiimide type cross linking agent-containing chlorinated polypropylene type/acryl type polymer composite aqueous emulsion composition was obtained in the same manner as in the above Example 4c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Comparative Example 5c

A chlorinated polypropylene type/epoxy type polymer composite aqueous emulsion composition was obtained in the same manner as in the above Example 5c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Comparative Example 6c

A polycarbodiimide type cross linking agent-containing chlorinated polypropylene type/acryl type polymer composite aqueous emulsion composition was obtained in the same manner as in the above Example 6c, except that 100 g of a chlorinated polypropylene type aqueous emulsion (Hardlen EH-202 (resin solid content: 20 wt %, average particle size: 0.53 μm) manufactured by Toyo Kasei Kogyo K.K.) was used in place of the modified PP emulsion prepared by the above Dispersion Preparation Example 1.

Each of the above obtained composite aqueous emulsion compositions was subjected to the above respective evaluation tests to evaluate emulsion stability, use as a paint primer, use as an electrostatic adhesive and use as an ink.

The results are shown in the following Table 1c.

TABLE 1c

| Test item | Dispersion stability test Dispersion state | Adhesiveness test Number of cross-cuts remained after peeling test | Water resistance test | | Adhesive use | Ink use Peeling test |
|---|---|---|---|---|---|---|
| | | | Outer appearance of coated film | Gasohol resistance (min) | | |
| Ex. 1c | Good | 100/100 | 100/100 Normal | 120 | Acceptable | Acceptable |
| Ex. 2c | Good | 100/100 | 100/100 Normal | 120 | Acceptable | Acceptable |
| Ex. 3c | Good | 100/100 | 100/100 Normal | 120 | Acceptable | Acceptable |
| Ex. 4c | Good | 100/100 | 100/100 Normal | 120 | Acceptable | Acceptable |
| Ex. 5c | Good | 100/100 | 100/100 Normal | 120 | Acceptable | Acceptable |
| Ex. 6c | Good | 100/100 | 100/100 Normal | 120 | Acceptable | Acceptable |
| Comp. Ex. 1c | Good | 15/100 | 11/100 Occurrence of blister | 23 | Unacceptable | Unacceptable |
| Comp. Ex. 2c | Good | 13/100 | 13/100 Occurrence of blister | 15 | Unacceptable | Unacceptable |
| Comp. Ex. 3c | Good | 25/100 | 21/100 Occurrence of blister | 26 | Unacceptable | Unacceptable |
| Comp. Ex. 4c | Good | 32/100 | 27/100 Occurrence of blister | 17 | Unacceptable | Unacceptable |
| Comp. Ex. 5c | Good | 16/100 | 16/100 Occurrence of blister | 18 | Unacceptable | Unacceptable |
| Comp. Ex. 6c | Good | 32/100 | 3/100 Occurrence of blister | 31 | Unacceptable | Unacceptable |

According to the present invention, a polypropylene type composite aqueous emulsion having a good dispersion stability can be provided, which is capable of forming a coating film having a good smoothness and a satisfactory adhesiveness to a polyolefin substrate and also having excellent water resistance and gasohol resistance.

The entire disclosures of Japanese Patent Application No. 2002-127539 filed on Apr. 26, 2002, Japanese Patent Application No. 2002-273960 filed on Sep. 19, 2002, Japanese Patent Application No. 2002-273972 filed on Sep. 19, 2002 and Japanese Patent Application No. 2002-283376 filed on Sep. 27, 2002 including specifications, claims and summaries are incorporated herein by reference in their entireties.

What is claimed is:

1. A process for producing a polypropylene type aqueous dispersion, said process comprises dispersing following component (a) in component (c) with component (b);
    (a) a polypropylene type polymer and/or a modified polypropylene type polymer, prepared by a single site catalyst 100 parts by weight,
    (b) a surfactant 1 to 100 parts by weight, and
    (c) water 100 to 1,000 parts by weight,
    wherein the component (a) has a main chain having the following features (1) and (2) and dispersion particles in the dispersion have an average particle size of at most 0.5 μm,
    Feature (1) when observing a peak derived from a carbon atom of a methyl group in a propylene unit chain part comprising a head-to-tail bond by $^{13}$C-NMR and fixing a chemical shift of a peak top at a peak attributable to pentad expressed by mmmm to 21.8 ppm, a ratio ($S_1/S$) of an area $S_1$ of a peak of a peak top at 21.8 ppm to a total area S of peaks at from 19.8 ppm to 22.1 ppm is at least 10% and at most 60%, and when an area of a peak (mmmr) of a peak top at 21.5 to 21.6 ppm is expressed as $S_2$, $4+2S_1/S_2>5$, and
    Feature (2) a content ratio (mol ratio) of propylene unit (A): other olefin unit (B) is from 100:0 to 90:10.

2. The process according to claim 1, wherein the surfactant of component (b) is at least one of anionic, cationic and amphoteric surfactants.

3. The process according to claim 1, wherein the surfactant of component (b) is a nonionic surfactant.

4. The process according to claim 1, wherein the surfactant of component (b) comprises at least two kinds of surfactants.

5. The process according to claim 1, which further contains a basic material as a component (d) in an amount of from 0.01 to 10 parts by weight to 100 parts by weight of the component (a).

6. The process according to claim 1, wherein the other olefin unit (B) is an ethylene unit and/or a butene unit.

7. The process according to claim 1, wherein the polypropylene type polymer and/or the modified polypropylene type polymer of component (a) have a weight average molecular weight (Mw) of from 10,000 to 300,000 measured by GPC.

8. The process according to claim 1, wherein the modified polypropylene type polymer of component (a) is a modified polypropylene type polymer modified by grafting with an unsaturated carboxylic acid and/or its derivative selected from the group consisting of a $C_3$-$C_{25}$ unsaturated carboxylic acid, its acid anhydride and its ester.

9. The process according to claim 4, wherein the surfactant of component (b) comprises a nonionic surfactant (b1) having a hydrophile-lipophile balance (HLB) value in a range of from 13.5 to 14.5 and a nonionic surfactant (b2) having an HLB value in a range of from 16.0 to 17.0, and their blending ratio (b1/b2) is from 1/9 to 9/1.

10. The process according to claim 1, which further contains a polymer as a component (e) other than a polypropylene type polymer and a modified polypropylene type polymer in addition to the above components (a), (b) and (c) in an amount of from 1 to 5,000 parts by weight to 100 parts by weight of the component (a).

11. The process according to claim 10, wherein the polymer of component (e) other than a polypropylene type polymer and a modified polypropylene type polymer is at least one member selected from the group consisting of a (meth)acrylic polymer, a urethane type polymer and an epoxy type polymer.

12. An aqueous dispersion obtained by the process according to claim 1.

13. A coating agent, a paint, an ink or an adhesive comprising a polypropylene type aqueous dispersion as defined in claim 12.

14. A polypropylene type resin-coated product obtained by coating a substrate comprising a crystalline polypropylene molded product with a paint as defined in claim 13.

15. The polypropylene type resin-coated molded product according to claim 14, wherein the crystalline polypropylene constituting the substrate is a propylene homopolymer or a propylene.ethylene block copolymer comprising a propylene homopolymer part and a propylene.ethylene copolymer part.

16. The polypropylene type resin-coated molded product according to claim 14, wherein the substrate is a molded product comprising a polypropylene type resin composition containing an elastomer component in an amount of from 1 to 90 parts by weight to 100 parts by weight of the crystalline polypropylene.

17. The polypropylene type resin-coated molded product according to claim 14, wherein the substrate is a molded product comprising a polypropylene type resin composition containing an inorganic filler in an amount of from 1 to 80 parts by weight to 100 parts by weight of the crystalline polypropylene.

18. The polypropylene type resin-coated molded product according to claim 14, wherein the substrate is a molded product having a surface glossiness (JIS-K7105, incident angle 60°) of at least 30%, which comprises an electroconductive polypropylene type resin composition containing an electroconductive carbon.

19. The polypropylene type resin-coated molded product according to claim 18, wherein the electroconductive carbon has a particle size of from 10 to 100 nm, a DBP oil absorption number of from 50 to 900 ml/g and a specific surface area of from 100 to 1,500 m$^2$/100 g.

20. The polypropylene type resin-coated molded product according to claim 18, wherein the electroconductive carbon is contained in an amount of from 0.1 to 25 parts by weight to 100 parts by weight of the crystalline polypropylene.

* * * * *